(12) United States Patent
Egenolf et al.

(10) Patent No.: US 12,346,312 B2
(45) Date of Patent: Jul. 1, 2025

(54) GENERATION OF OPTIMIZED LOGIC FROM A SCHEMA

(71) Applicant: Ab Initio Technology LLC, Lexington, MA (US)

(72) Inventors: Jonah Egenolf, Winchester, MA (US); Marshall A. Isman, Newton, MA (US); Ian Schechter, Sharon, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 18/345,852

(22) Filed: Jun. 30, 2023

(65) Prior Publication Data

US 2024/0126748 A1 Apr. 18, 2024

Related U.S. Application Data

(63) Continuation of application No. 17/558,097, filed on Dec. 21, 2021, now Pat. No. 11,734,264, which is a
(Continued)

(51) Int. Cl.
*G06F 8/34* (2018.01)
*G06F 8/36* (2018.01)
(Continued)

(52) U.S. Cl.
CPC ............ *G06F 16/2423* (2019.01); *G06F 8/34* (2013.01); *G06F 8/36* (2013.01); *G06F 8/38* (2013.01);
(Continued)

(58) Field of Classification Search
CPC .... G06F 16/2228; G06F 16/21; G06F 16/288; G06F 8/24; G06F 8/38; G06F 8/34;
(Continued)

(56) References Cited

U.S. PATENT DOCUMENTS

| 5,966,072 A | 10/1999 | Stanfill et al. |
| 7,461,077 B1 * | 12/2008 | Greenwood ........ G06F 16/2428 |
| | | 707/999.102 |

(Continued)

FOREIGN PATENT DOCUMENTS

| CN | 101361088 | 2/2009 |
| CN | 107135663 | 9/2017 |

(Continued)

OTHER PUBLICATIONS

Morse et al., AU 2009219299, May 7, 2015, 47 pgs <AU2009219299.pdf>.*

(Continued)

*Primary Examiner* — Tuan A Vu
(74) *Attorney, Agent, or Firm* — Fish & Richardson P.C.

(57) ABSTRACT

A method includes accessing a schema that specifies relationships among datasets, computations on the datasets, or transformations of the datasets, selecting a dataset from among the datasets, and identifying, from the schema, other datasets that are related to the selected dataset. Attributes of the datasets are identified, and logical data representing the identified attributes and relationships among the attributes is generated. The logical data is provided to a development environment, which provides access to portions of the logical data representing the identified attributes. A specification that specifies at least one of the identified attributes in performing an operation is received from the development environment. Based on the specification and the relationships among the identified attributes represented by the logical data, a computer program is generated to perform the operation by accessing, from storage, at least one dataset having the at least one of the attributes specified in the specification.

20 Claims, 36 Drawing Sheets

Related U.S. Application Data continuation of application No. 17/025,751, filed on Sep. 18, 2020, now Pat. No. 11,210,285.

(60) Provisional application No. 62/986,374, filed on Mar. 6, 2020.

(51) Int. Cl.

| | |
|---|---|
| *G06F 8/38* | (2018.01) |
| *G06F 16/21* | (2019.01) |
| *G06F 16/23* | (2019.01) |
| *G06F 16/242* | (2019.01) |
| *G06F 16/2452* | (2019.01) |
| *G06F 16/2453* | (2019.01) |
| *G06F 16/28* | (2019.01) |
| *G06F 16/81* | (2019.01) |
| *G06F 16/901* | (2019.01) |
| *G06Q 10/10* | (2023.01) |
| *G06Q 30/0242* | (2023.01) |

(52) U.S. Cl.
CPC ........ *G06F 16/211* (2019.01); *G06F 16/2365* (2019.01); *G06F 16/2428* (2019.01); *G06F 16/24524* (2019.01); *G06F 16/24526* (2019.01); *G06F 16/2453* (2019.01); *G06F 16/24544* (2019.01); *G06F 16/24545* (2019.01); *G06F 16/288* (2019.01); *G06F 16/81* (2019.01); *G06F 16/9027* (2019.01); *G06Q 10/10* (2013.01); *G06Q 30/0243* (2013.01)

(58) Field of Classification Search
CPC .. G06F 8/36; G06F 16/2423; G06F 16/24545; G06F 16/24526; G06F 16/24544; G06F 16/25524; G06F 15/211; G06F 16/2428; G06F 16/9027; G06F 16/81; G06F 16/2453; G06F 16/24524; G06F 16/258
See application file for complete search history.

(56) References Cited

U.S. PATENT DOCUMENTS

| | | | | |
|---|---|---|---|---|
| 8,069,129 | B2 | 11/2011 | Gould et al. | |
| 11,210,285 | B2 | 12/2021 | Egenolf et al. | |
| 11,734,264 | B2 | 8/2023 | Egenolf et al. | |
| 2002/0030703 | A1* | 3/2002 | Robertson | G06F 16/9027 707/E17.012 |
| 2004/0015783 | A1* | 1/2004 | Lennon | G06F 16/258 715/255 |
| 2007/0016601 | A1* | 1/2007 | Cameron | G06F 16/81 |
| 2007/0226196 | A1 | 9/2007 | Adya et al. | |
| 2008/0313235 | A1 | 12/2008 | Matsubara | |
| 2009/0132995 | A1 | 5/2009 | Iborra | |
| 2010/0198844 | A1 | 8/2010 | Ribbe et al. | |
| 2012/0102029 | A1 | 4/2012 | Larson et al. | |
| 2013/0151572 | A1* | 6/2013 | Brocato | G06F 16/2428 707/805 |
| 2015/0213109 | A1 | 7/2015 | Kassko | |
| 2019/0130048 | A1 | 5/2019 | Egenolf et al. | |
| 2019/0370407 | A1 | 12/2019 | Dickie | |
| 2021/0279043 | A1 | 9/2021 | Egenolf et al. | |
| 2022/0147529 | A1 | 5/2022 | Egenolf et al. | |

FOREIGN PATENT DOCUMENTS

| | | |
|---|---|---|
| CN | 108701257 | 10/2018 |
| JP | 2013-541784 | 12/2014 |

OTHER PUBLICATIONS

U.S. Appl. No. 62/966,768, filed Jan. 28, 2020, Schechter et al.
Dataedo.com [online], "Logical vs Physical Data Dictionary," Jun. 10, 2016, retrieved on Sep. 18, 2020, retrieved from URL<https://dataedo.com/blog/logical-vs-physical-data-dictionary>, 7 pages.
GoodData.com [online], "Optimizing Data Models for Better Performance," available on or before Oct. 30, 2019, retrieved on Oct. 30, 2019, retrieved from URL<https://help.gooddata.com/doc/en/building-on-gooddata-platform/data-modeling-in-gooddata/data-modeling-using-the-cloudconnect-tool/data-modeling-tutorials-for-cloudconnect-and-apis/optimizing-data-models-for-better-performance>, 7 pages.
Google.com [online], "Google Search Results: Logical Data Model," search performed on Feb. 4, 2020, retrieved on Feb. 4, 2020, 2 pages.
IBM.com [online], "InfoSphere Data Architect 9.1.0: Transforming a physical data model into a logical data model," Jan. 25, 2013, retrieved on Oct. 30, 2019, retrieved from URL<https://www.ibm.com/support/knowledgecenter/SS9UM9_9.1.0/com.ibm.datatools.transform.ui.doc/topics/ctransform_phys.html>, 3 pages.
Informatica.com [online], "Informatica Data Services 10.2: Getting Started Guide," last updated Jul. 19, 2018, retrieved on Apr. 17, 2020, retrieved from URL<https://docs.informatica.com/content/dam/source/GUID-2/GUID-263F4541-2132-4C49-8F44-C81D848A2EA1/25/en/DS_102_GettingStartedGuide_en.pdf>, 88 pages.
International Preliminary Report on Patentability in International Appln. No. PCT/US2021/020871, mailed on Sep. 15, 2022, 8 pages.
Office Action in Canada Appln. No. 3170453, mailed on Oct. 19, 2023, 5 pages.
Office Action in Chinese Appln. No. 202180019193.3, mailed on Oct. 23, 2023, 6 pages (with English translation).
SAS.com [online], "SAS Data Views: A Virtual View of Data," 1997, retrieved on Sep. 18, 2020, retrieved from URL<https://support.sas.com/resources/papers/proceedings/proceedings/sugi22/ADVTUTOR/PAPER36.PDF>, 5 pages.
ScienceDirect.com [online], "Logical Data Model—An Overview," available no later than Feb. 4, 2020, retrieved on Feb. 4, 2020, retrieved from URL<https://www.sciencedirect.com/topics/computer-science/logical-data-model>, 10 pages.
Visual Studio 2019: "how to: Create and configure datasets in Visual Studio", Microsoft Docs: Nov. 21, 2018, pp. 1-9 <VisualStudio howto.pdf >.
Office Action in Japanese Appln. No. 2022-553152, mailed on May 13, 2024, 7 pages (with Machine translation).
Office Action in Canadian Appln. No. 3170453, mailed on Nov. 5, 2024, 5 pages.
[No Author Listed], "Oracle9i Developer Suite" Oracle Developer Suite Tech White Paper, Dec. 2001, XP002369521, pp. 1-51.
Office Action in Australian Appln. No. 2021230348, mailed on Mar. 21, 2025, 4 pages.
Office Action in European Appln. No. 21716874.9, mailed on Mar. 4, 2025, 10 pages.

* cited by examiner

FIG. 5H

| Rule Definition | Rule Case ▼ | Record # ▲ | Test Record(s) |
|---|---|---|---|
| Rule Case | TRIGGERS | | OUTPUT |
| 1 | Last Reload | | Platinum |
| 2 | (Today – Last Reload) > 365 | | Gold |
| 3 | (Today – Last Reload) > 180 | | Silver |
| 4 | (Today – Last Reload) > 90 | | Bronze |
| 5 | (Today – Last Reload) > 30 | | No Offer |
| ... | else | | ... |

Inputs:
- ▼ Logical Data
  - Offer Status
  - Offer Accepted
  - Minutes
    - Added Minutes
    - Used Minutes
    - Remaining Minutes
  - Customers
    - Name
  - Reload Date
    - Last Reload
- ▲ Other Data Sources

DEVELOPMENT ENVIRONMENT → MODIFIED SPECIFICATION → GRAPH GENERATOR

LOGICAL DATA

GENERATION OF OPTIMIZED LOGIC FROM A SCHEMA

PRIORITY

This application is a continuation of U.S. patent application Ser. No. 17/558,097, filed on Dec. 21, 2021, which is a continuation of U.S. patent application Ser. No. 17/025,751, filed on Sep. 18, 2020, which claims priority to and the benefit of U.S. Provisional Patent Application No. 62/986,374, filed Mar. 6, 2020, the entire content of which is incorporated herein by reference.

BACKGROUND

This disclosure relates to generating logic from a schema, such as a database schema. Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, titled "Executing Computations Expressed as Graphs," the entire content of which in incorporated herein by reference. In some cases, the computations associated with a vertex is described in human-readable form referred to as "business rules."

One technique for generating data flow graphs uses a business rule editor. An example of a business rule editor is disclosed in U.S. Pat. No. 8,069,129, titled "Editing and Compiling Business Rules," the entire content of which is incorporated herein by reference.

SUMMARY

In general, in a first aspect, a method implemented by a data processing system for providing a development environment and storage that stores datasets having one or more attributes, and with the development environment providing access to the one or more attributes of the datasets, includes: accessing a schema that specifies relationships among datasets represented in the schema, one or more computations on one or more of the datasets, or one or more transformations of one or more of the datasets, identifying, from among the datasets, a plurality of the datasets in storage, by: selecting a dataset from among the datasets, and identifying, from the schema, one or more other datasets that are related to the selected dataset, identifying attributes of the plurality of the datasets, generating logical data representing identified attributes of the plurality of the datasets and further representing one or more relationships among the attributes, providing, to a development environment, the logical data, providing, by the development environment, access to one or more portions of the logical data representing the identified attributes of the plurality of the datasets, receiving, from the development environment, a specification that specifies at least one of the identified attributes in performing an operation, and based on the specification and on the one or more relationships among the identified attributes represented by the logical data, generating a computer program that is configured to perform the operation by accessing, from storage, at least one dataset from the plurality, with the at least one dataset accessed having the at least one of the attributes specified in the specification.

In general, in a second aspect, combinable with the first aspect, a development environment provides access to the one or more portions of the logical data without accessing the plurality of datasets from storage.

In general, in a third aspect, combinable with the first or second aspects, the method includes identifying a dataset from the plurality of datasets including the at least one of the attributes specified in the specification and accessing, from storage, the identified dataset.

In general, in a fourth aspect, combinable with any of the first through third aspects, the method includes executing the computer program using the at least one dataset accessed from storage.

In general, in a fifth aspect, combinable with any of the first through fourth aspects, the method includes optimizing the computer program to produce an optimized computer program that is configured to perform the operation by accessing, from storage, only those datasets in the plurality of datasets having the at least one of the attributes specified in the specification.

In general, in a sixth aspect, combinable with any of the first through fifth aspects, the one or more attributes include field names of the plurality of the datasets.

In general, in a seventh aspect, combinable with any of the first through sixth aspects, the one or more attributes include information for accessing the plurality of the datasets in storage.

In general, in an eighth aspect, combinable with any of the first through seventh aspects, the method includes identifying, from the schema, one or more parameters for joining the selected dataset and the one or more other datasets.

In general, in a ninth aspect, combinable with any of the first through eight aspects, the one or more parameters include a key for joining the selected dataset and at least one of the one or more other datasets.

In general, in a tenth aspect, combinable with any of the first through ninth aspects, the method includes receiving, from a client device, selection data specifying the selected dataset.

In general, in an eleventh aspect, combinable with any of the first through tenth aspects, the selected dataset comprises a root node of the logical data, and wherein at least one of the one or more other datasets are joined to the selected dataset.

In general, in a twelfth aspect, combinable with any of the first through eleventh aspects, the one or more computations on one or more of the datasets or one or more transformations of one or more of the datasets define a virtual field for at least one of the plurality of the datasets.

In general, in a thirteenth aspect, combinable with any of the first through twelfth aspects, the method includes generating, based on the specification and on the one or more relationships among the identified attributes represented by the logical data, an executable dataflow graph that is configured to perform the operation, wherein the executable dataflow graph includes at least one of the one or more attributes as an input.

In general, in a fourteenth aspect, combinable with any of the first through thirteenth aspects, the method includes removing from the computer program an operation to access, from storage, at least one dataset in the plurality of datasets that does not include the at least one of the attributes specified in the specification.

In general, in a fifteenth aspect, combinable with any of the first through fourteenth aspects, the computer program is configured to access, from storage, at least some data from the plurality by a select statement, wherein the select statement is minimized to select only the at least one of the attributes specified in the specification.

In general, in a sixteenth aspect, combinable with any of the first through fifteenth aspects, the development environment reads the logical data as a data source.

In general, in a seventeenth aspect, combinable with any of the first through sixteenth aspects, the computer program is configured to access, from storage, only those datasets having the at least one of the attributes specified in the specification In general, in an eighteenth aspect, combinable with any of the first through seventeenth aspects, a system for providing a development environment and storage that stores datasets having one or more attributes, and with the development environment providing access to the one or more attributes of the datasets, includes one or more processors and one or more storage devices storing instructions that are operable, when executed by the one or more processors, to cause the one or more processors to perform operations including: accessing a schema that specifies relationships among datasets represented in the schema, one or more computations on one or more of the datasets, or one or more transformations of one or more of the datasets, identifying, from among the datasets, a plurality of the datasets in storage, by: selecting a dataset from among the datasets, and identifying, from the schema, one or more other datasets that are related to the selected dataset, identifying attributes of the plurality of the datasets, generating logical data representing identified attributes of the plurality of the datasets and further representing one or more relationships among the attributes, providing, to a development environment, the logical data, providing, by the development environment, access to one or more portions of the logical data representing the identified attributes the plurality of the datasets, receiving, from the development environment, a specification that specifies at least one of the identified attributes in performing an operation and based on the specification and on the one or more relationships among the identified attributes represented by the logical data, generating a computer program that is configured to perform the operation by accessing, from storage, at least one dataset from the plurality, with the at least one dataset accessed having the at least one of the attributes specified in the specification.

In general, in a nineteenth aspect, combinable with any of the first through eighteenth aspects, a non-transitory computer-readable storage medium storing instructions for causing a computing system to access a schema that specifies relationships among datasets represented in the schema, one or more computations on one or more of the datasets, or one or more transformations of one or more of the datasets, identify, from among the datasets, a plurality of the datasets in storage, by: selecting a dataset from among the datasets and identifying, from the schema, one or more other datasets that are related to the selected dataset, identify attributes of the plurality of the datasets, generate logical data representing identified attributes of the plurality of the datasets and further representing one or more relationships among the attributes, provide, to a development environment, the logical data, provide, by the development environment, access to one or more portions of the logical data representing the identified attributes the plurality of the datasets, receive, from the development environment, a specification that specifies at least one of the identified attributes in performing an operation, and based on the specification and on the one or more relationships among the identified attributes represented by the logical data, generate a computer program that is configured to perform the operation by accessing, from storage, at least one dataset from the plurality, with the at least one dataset accessed having the at least one of the attributes specified in the specification.

One or more of the above implementations may provide one or more of the following advantages. The techniques described here use information about datasets and relationships among datasets to generate logical data that contains information about attributes of the datasets. By providing the logical data as a data source in a development environment, the logical data can provide logical access to the datasets without the cost of accessing the physical datasets themselves. In this manner, consumption of computational resources associated with accessing the physical datasets from database storage can be reduced. Apart from that, computational logic can be specified through the development environment using the attributes of the data sets without having to access to actual data sets, which allows to protect the data sets from unwanted access. That is, the data sets are kept secure while still allowing to specify computational logic, and compile applications therefrom, involving the data sets. In addition, the techniques described here can improve the productivity of a user of the development environment, as users are empowered to flexibly develop computational logic using the attributes in the logical data without the overhead and processing time required when accessing and processing physical datasets.

Once the computational logic is developed, the techniques described here allow the logic to be processed in a highly optimized manner. For example, a user, when developing the computational logic, may in principle consider or have access to numerous datasets that turned out to be unnecessary. Using the information provided by the logical data, an application, such as a dataflow graph, can be generated that minimally loads and joins only the subset of data needed in the processing to create the desired outputs. In doing so, the techniques described here increase the speed of generation and execution of the computational logic while reducing the computational resources necessary to process the logic.

The details of one or more implementations are set forth in the accompanying drawings and the description below. Other features, objects, and advantages of the technology described here will be apparent from the description and drawings, and from the claims.

DESCRIPTION OF DRAWINGS

FIGS. 5D to 5I are block diagrams of a system for generating a computer program.

FIGS. 5J to 5Q are block diagrams of a system for testing a computer program.

DETAILED DESCRIPTION

Described herein is a system for generating logical data that represents physical datasets stored in a storage system or memory. The logical data represents these physical datasets by including attributes of the physical datasets, by including pointers specifying an address of the storage location of these physical datasets, or by specifying other information that represents how to access the physical datasets, or combinations of them, among others. In this example, the logical data or portions of the logical data are accessible in a development environment to enable development of a specification that specifies which datasets (or attributes of the datasets) are used and accessed. Generally, a specification specifies an operation (e.g., computational logic) to be performed on the datasets or attributes of the datasets. The specification is compiled into or otherwise used to create a computer program (e.g., an executable dataflow graph) that is capable of execution on a computing system. In some examples, the computer program includes executable machine code. Because the logical data is accessible in the development environment without having to physically access the datasets or their attributes, the logical data provides logical access without physical cost.

For purposes of convenience and without limitation, visual representations of some of the features described herein may be referred to as the feature itself. For example, a visual representation of a dataflow graph may be referred to as a dataflow graph. A visual representation of logical data may be referred to as logical data. A visual representation of a database schema may be referred to as a database schema. A visual representation of a component may be referred to as a component, and so forth.

Figure 1:
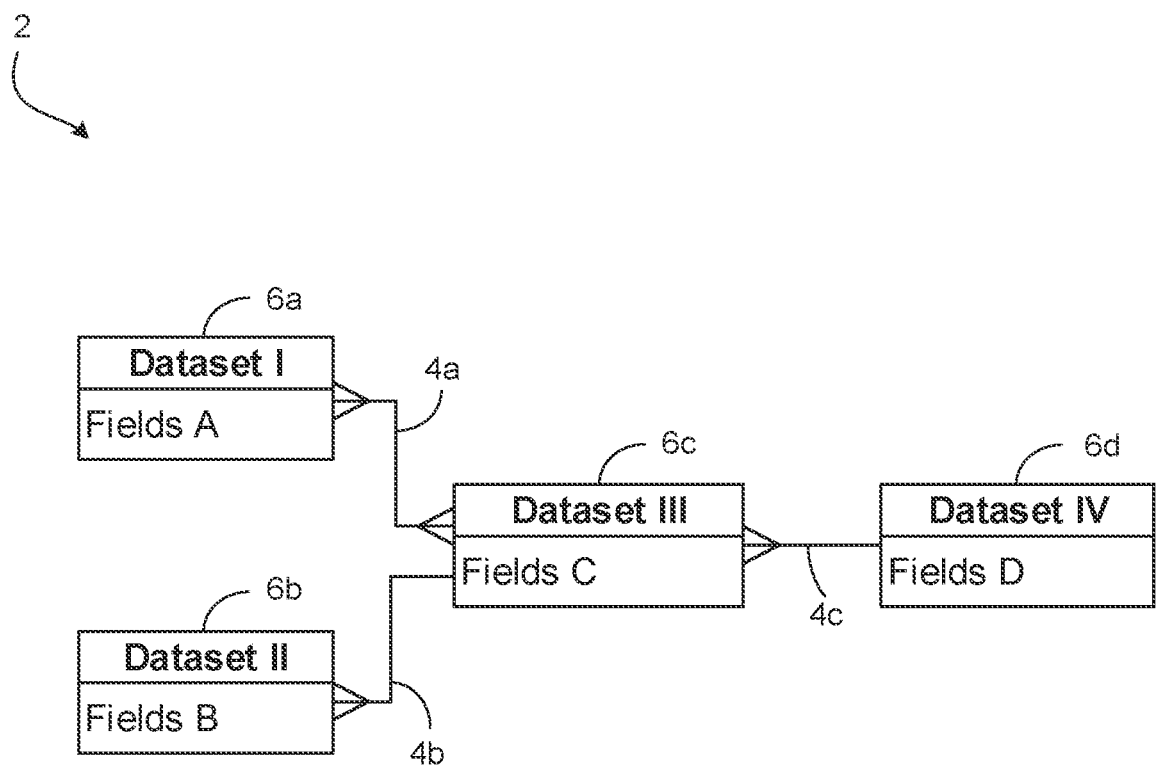
FIG. 1 is a block diagram of a schema.

Referring to FIG. 1, a schema 2 is shown that specifies relationships 4a, 4b, 4c, such as a hierarchical relationship, among datasets 6a, 6b, 6c, 6d stored in a storage system. In some examples, the schema 2 is a database schema that describes the database's structure in a formal language supported by the database management system (DBMS). The schema 2 can be generated based on information about the datasets 6a, 6b, 6c, 6d stored in the storage system and the relationships 4a, 4b, 4c among those datasets. In some examples, the information about each of the stored datasets includes a name of the dataset, access parameters for the dataset (e.g., a filename, a location), a record format for the dataset, data types included in the dataset, or combinations of them, among other information. In some examples, the information about the relationships among the datasets includes information about how the datasets can be joined, such as information about a type of relationship between datasets (e.g., one-to-one, one-to-many, such as relationships 4b and 4c, many-to-many, such as relationship 4a) or keys (e.g., primary keys, foreign keys) for joining data in the datasets, or both, among other information.

The information used to generate the schema 2 can be specified by a user (e.g., a technical user), automatically retrieved from the storage system (e.g., by one or more computing systems coupled to the storage system), or both. For instance, in some examples, one or more computing systems communicatively coupled to the storage system can import metadata or other information about the datasets 6a, 6b, 6c, 6d to generate the schema 2 using data discovery, semantic discovery, or other machine learning techniques. In some examples, processing information, such as computations on one or more of the datasets 6a, 6b, 6c, 6d or transformations of one or more of the datasets 6a, 6b, 6c, 6d, are specified (e.g., by a technical user) and included the schema 2. For example, the schema 2 includes instructions for performing the computations or operations (or instructions for invoking a computer program, such as an executable dataflow graph, for performing the operations). These computations or transformations can modify existing fields within the datasets 6a, 6b, 6c, 6d, create new fields within the datasets (sometimes referred to as virtual or calculated fields), or create new datasets entirely. In some examples, values for the modified or newly created fields or datasets are not populated until runtime (e.g., when executed by a computer program that uses the fields or datasets), as described below.

Figure 2A:
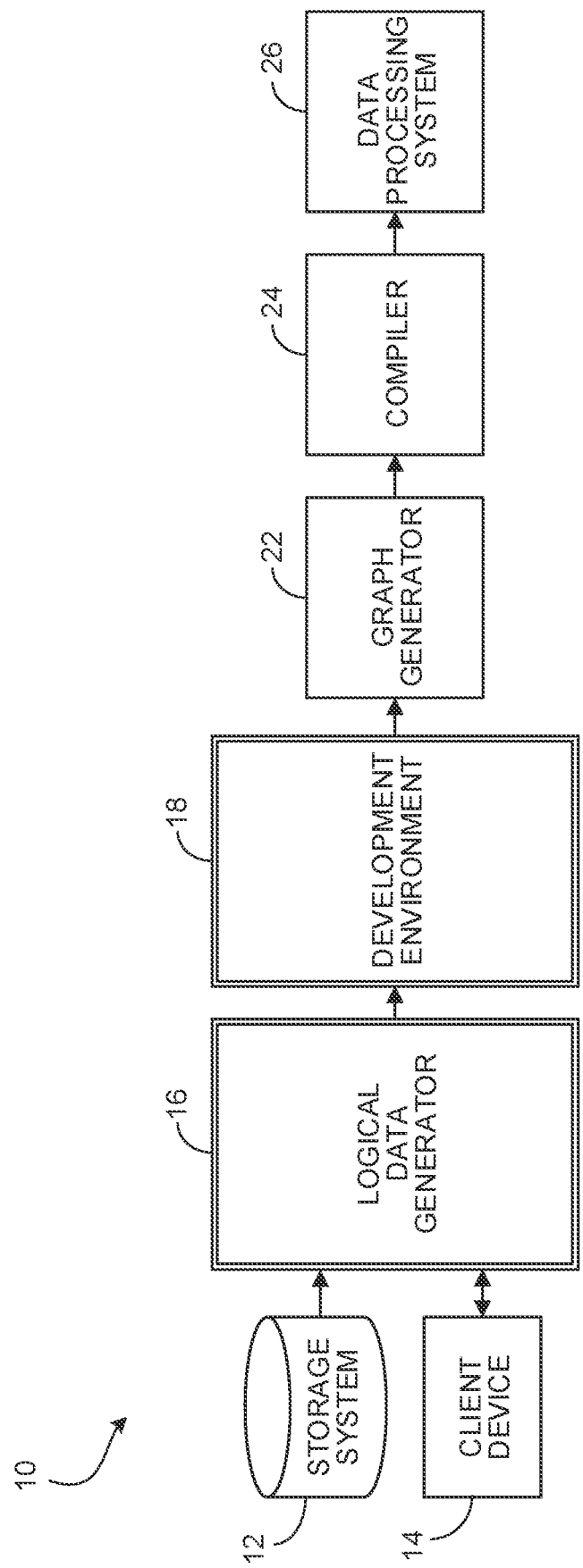
FIG. 2A is a block diagram of a system for producing logical data and generating a computer program using the logical data.

FIG. 2A shows an environment 10 with a storage system 12 and a client device 14. In this example, the environment 10 also includes logical data generator 16. The logical data generator 16 is configured to generate logical data which includes, for example, information about attributes of actual physical datasets (or logical datasets based on physical datasets). In this example, the logical data provides logical access to the physical datasets that may be stored, for example, in the storage system 12, without requiring physical access to the datasets from the storage system 12. In this example, logical access refers to a list or other specification of attributes of the physical datasets that are themselves stored in the storage system 12. In another example, logical data may include a pointer or other information identifying an address or location from which the physical datasets represented in the logical data may be accessed from the storage system 12, or instructions or parameters for accessing the physical datasets, or both.

In this example the storage system 12 is configured for communication with the logical data generator 16 to provide the logical data generator with the information for use in generation of logical data, such as information specifying the location of the physical datasets, information specifying attributes of the physical datasets, information specifying a relationship among the physical datasets, or the physical datasets themselves, or combinations of them, among other information. The client device 14 is also configured for communication with the logical data generator 16 so that the client device 14 may send to the logical data generator 16 information for generating the logical data, such as information specifying which physical datasets or attributes of the physical datasets to include (or omit) from the logical data, information specifying a root node of the logical data, or combinations of them, among other information.

The environment 10 also includes a development environment 18, which provides a graphical user interface or other user interface for a user (e.g., a user of the client device 14, which may be communicatively coupled to the development environment 18) to specify which datasets (or attributes of the datasets) represented in the logical data the user wants to access or use in generating a computer program, such as a dataflow graph. The development environment 18 is coupled with a graph generator 22, which is configured to generate a dataflow graph from the information received from the development environment 18. The information received from development environment 18 is often referred to as a specification, as this information specifies the functionality of a computer program (e.g., an executable dataflow graph) and which datasets (or attributes) are to be accessed during execution or compilation of the specification into the application itself.

The environment 10 also includes a compiler 24, which is configured to compile a specification and/or a dataflow graph into a computer program that is executable (e.g., in machine code) by a data processing system 26. In this example, the development environment 18 transmits the specification to the graph generator 22, which generates the dataflow graph. In turn, graph generator 22 transmits the dataflow graph to the compiler 24, which compiles the dataflow graph into a computer program (e.g., executable dataflow graph). The compiler 24 transmits the computer program to the data processing system 26 for execution and/or storage of the computer program. In this example, the computer program is configured to access from the storage system 12 at least one of the plurality of datasets for which attributes were included in the logical data or specified in the specification, or both.

Figure 2B:
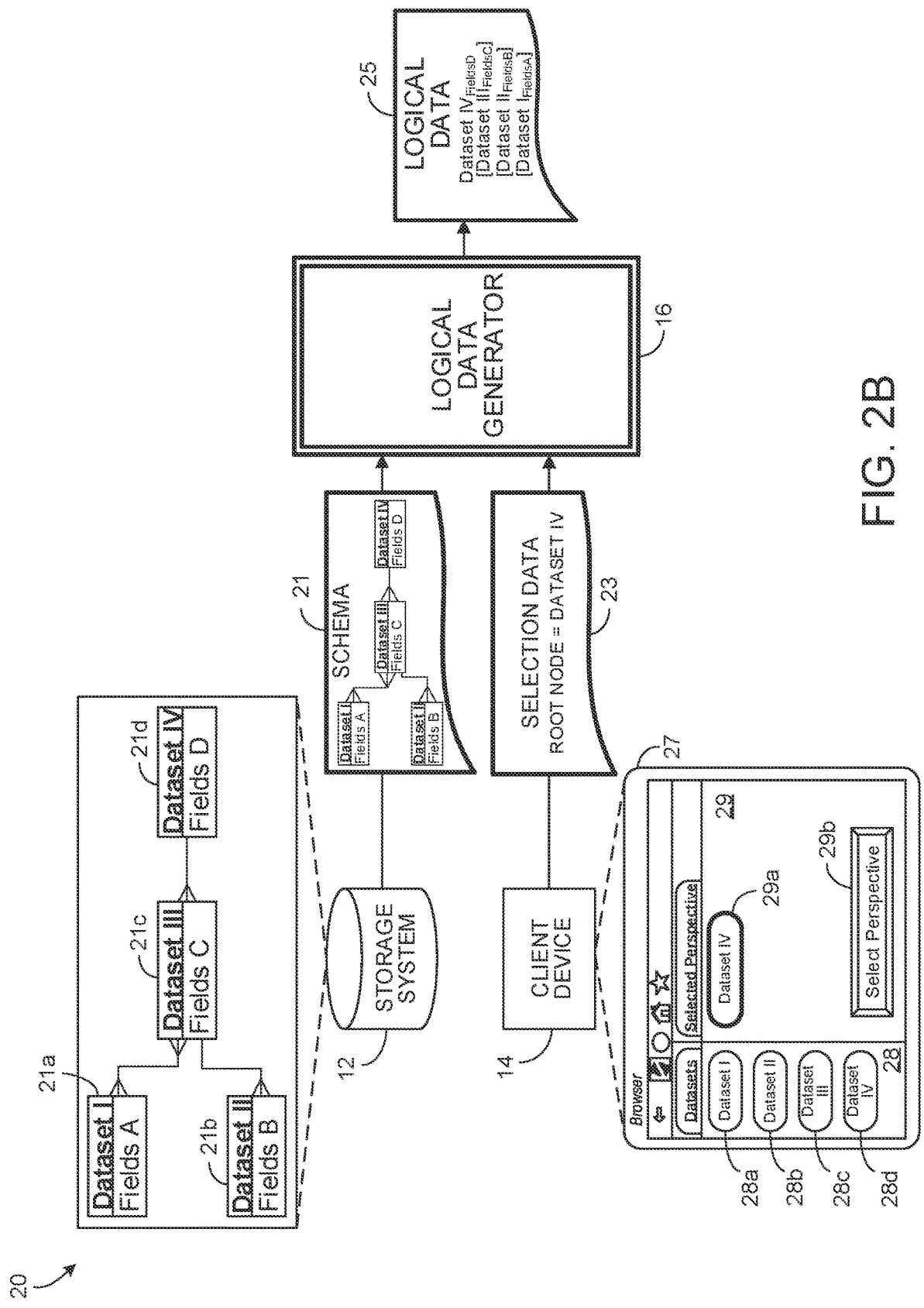
FIG. 2B is a block diagram of a system for producing logical data.

Referring to FIG. 2B, an environment 20 shows additional details of the environment 10. In this example, the storage system 12 transmits a schema 21 to the logical data generator 16. The database schema 21 specifies a relationship, such as a hierarchical relationship, among the datasets 21a, 21b, 21c, 21d stored in the storage system 12. In an example, the schema 21 is a database schema. The schema 21 can be the same or similar to the schema 2 described with reference to FIG. 1.

The client device 14 also sends selection data 23 to the logical data generator 16. The selection data 23 specifies a root node, e.g., a dataset that is the parent node in defining the logical data. In this example, the root node is a perspective that defines an initial dataset that is the root node in the logical data. In this example, a perspective is an extract of information and specifies a chosen starting point in the schema. The perspective includes a chosen starting point in the schema and represents a root logical entity of interest. To generate the selection data 23, the client device 14 displays a graphical user interface 27. The graphical user interface 27 includes a datasets portion 28 and a selected perspective portion 29 that is updated with an icon 29a representing that dataset 21d is selected as the root node of logical data. The datasets portion 28 displays visual representations 28a, 28b, 28c, 28d, of datasets 21a, 21b, 21c, 21d, respectively. The selected perspective portion 29 includes selectable portion 29b, which may be a button. Upon selection of selectable portion 29b a user can select one of the visual representations 28a, 28b, 28c, 28d as the root node of logical data. In this example, a user selects visual representation 28d to specify that the dataset 21d is the root node of the logical data. Upon selection of visual representation 28d and interaction with the selectable portion 292b, the selected perspective portion 29 is updated to display icon 28a, which specifies that the dataset 21d is the root node of logical data. The selection data 23 specifies that the root node is the dataset 21d.

Once the root logical entity of interest is specified for the logical data, the logical data is expanded to include information for other datasets that are related to that root logical entity of interest. As described herein, that other information may include attributes, fields, sources, instructions, parameters or pointers to the root logical entity of interest and related datasets, and so forth. In this example, the logical data can be materialized into a wide record with entries for the fields of the root logical entity of interest and fields for other datasets related to the root logical entity of interest. Generally, a wide record includes a group of related data held within the same structure. The logical data can also be materialized into a wide record of other attributes, such as pointers to the physical locations in memory of the logical entity of interest and the other related datasets.

Using the schema 21 and the selection data 23, the logical data generator 16 generates the logical data 25. For example, the logical data generator 16 receives the selection data 23 specifying that dataset 21d is the root node and includes in the logical data 25 information about the attributes or available fields for the dataset 21d. In some examples, the information includes a vector of available attributes or fields for the dataset 21d. Using the schema 21, the logical data generator 16 identifies other datasets that are related to the dataset 21d. For instance, in this example, the logical data generator 16 determines that datasets 21a, 21b, 21c are related to dataset 21d and therefore includes information about the attributes or available fields for datasets 21a, 21b, and 21c in the logical data 25. In this example, the logical data 25 includes vectors specifying the attributes or available fields for each of datasets 21a, 21b, and 21c. These vectors of attributes or available fields specify, instruct how to access, or otherwise represent the attributes or field names, without actually accessing the fields or the data within the fields themselves. Because of this, the logical data 25 provides logical access to the datasets 21a, 21b, 21c, and 21d, without the physical cost of actually accessing these datasets from the storage system 12.

Figure 2C:
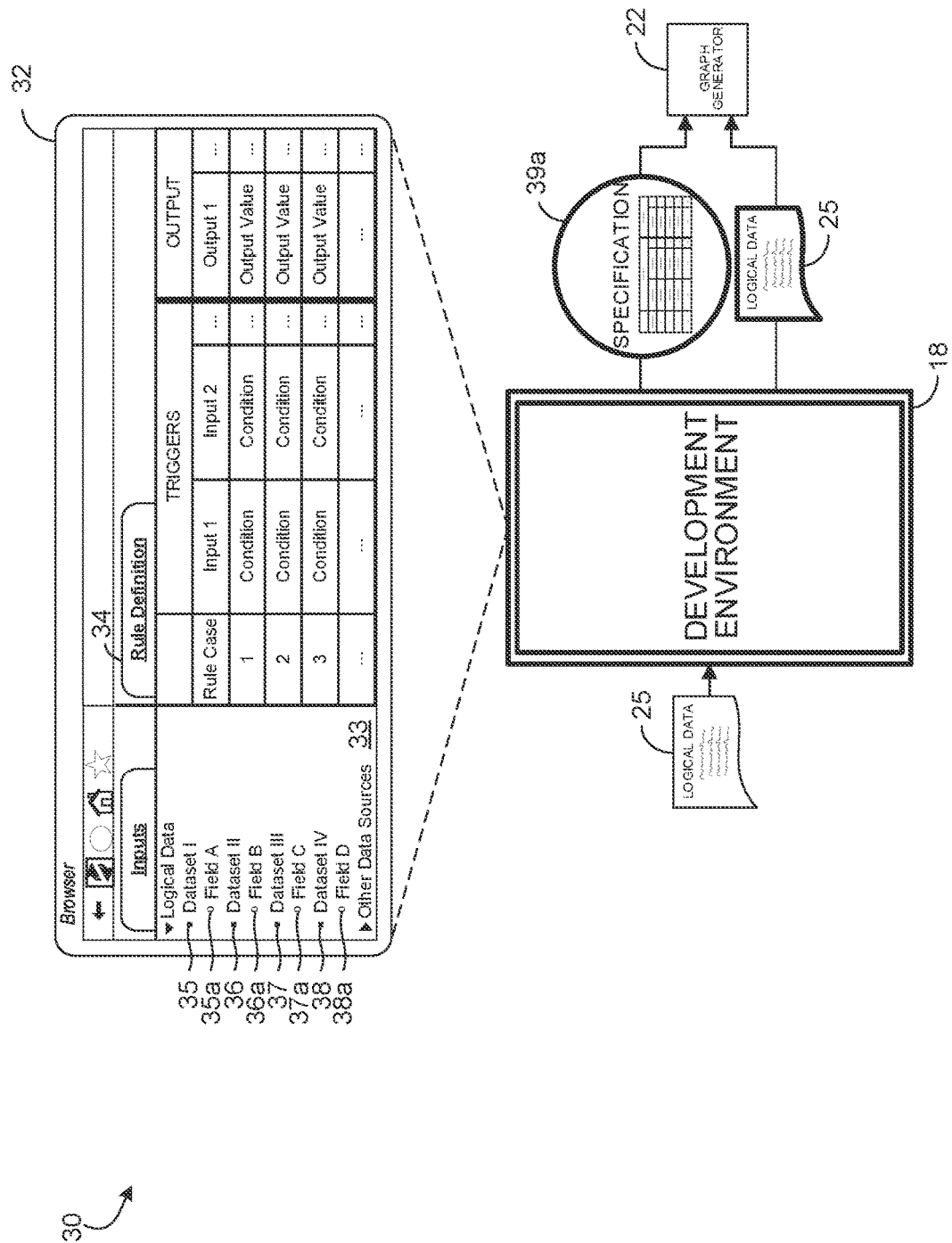
FIGS. 2C and 2D are block diagrams of development environments.

Referring to FIG. 2C, an environment 30 shows the development environment 18 receiving the logical data 25. For example, the development environment 18 receives the logical data 25 from the logical data generator 16 or from storage (e.g., the storage system 12). In this example, a business rules editor interface 32 is generated by the development environment 18 for defining business rules and other logical rules. In general, the editor interface 32 may graphically identify cells that contain expressions. This will help the user understand the difference between an expression that will be evaluated to true or false on its own and an expression that returns a value that is compared against the column variable. When the user is typing, the user can indicate that a particular cell is to be an expression cell by, for example, typing an asterisk at the beginning of the expression. In this example, the editor interface 32 includes an input portion 33 and a rule definition portion 34. The input portion 33 provides a visual representation of those attributes (e.g., fields) and datasets that are represented in the logical data 25 as well as other data sources (which may or may not correspond to logical data). For instance, the input portion 33 includes a visual representation 35 that represents dataset 21a (shown in FIG. 2B). The input portion 33 also includes a visual representation 35a representing 'Field A' in the dataset 21a. In this example, the visual representation 35a is visually depicted as being a field in the dataset 21a by being indented from visual representation 35. The input portion 33 also includes visual representations 36 and 36a that represents the dataset 21b and 'Field B' in the dataset 21b, respectively. The input portion 33 also includes visual representations 37 and 37a that represent the dataset 21c and 'Field C' in the dataset 21c, respectively. The input portion 33 also includes visual representations 38 and 38a that represents the dataset 21d and 'Field D' in the dataset 21d, respectively. In this example, the visual representations in the input portion 33 represent those datasets and fields that are available to a user in defining a business rule. The available datasets and fields represented in the input portion 33 are identified from the logical data 25, thereby providing a user with access to the datasets and fields without actually having to access those datasets (or fields) from physical memory.

The rule definition portion 34 includes a series of rule cases. In this example, the rule definition portion 34 includes a spreadsheet format. Trigger columns in the spreadsheet correspond to available data values, and rows correspond to rule cases, e.g., sets of criteria that relate the available data values. A rule case applies to a given record if the data values of that record meets the triggering criteria for each trigger column in which the rule case has criteria. If a rule case applies, an output is generated based on an output column. A rule case that has all of its input relationships satisfied may be referred to as "triggered." The output column corresponds to a potential output variable, and the value in the corresponding cell of the applicable row determines the output, if any, for that variable. The cell could contain a value that is assigned to the variable or it could contain an expression that must be evaluated to generate the output value, as discussed below. There may be more than one output column, though only one is shown in FIG. 2C.

Upon completion of defining a rule by specifying inputs for the cells in the rule definition portion 34, the development environment 18 generates a rule specification 39a that specifies the rule cases and which fields will need to be accessed to implement a rule. However, at this stage in defining the rule the logical data 25 provides a user with logical access to those fields without physical access. For example, the user was provided with logical access by being able to view the available fields from the various datasets stored in storage system 12 in the input portion 33. The development environment 18 transmits the rule specification 39a to the graph generator 22. The development environment 18 also transmits the logical data 25 to the graph generator 22.

Figure 2D:
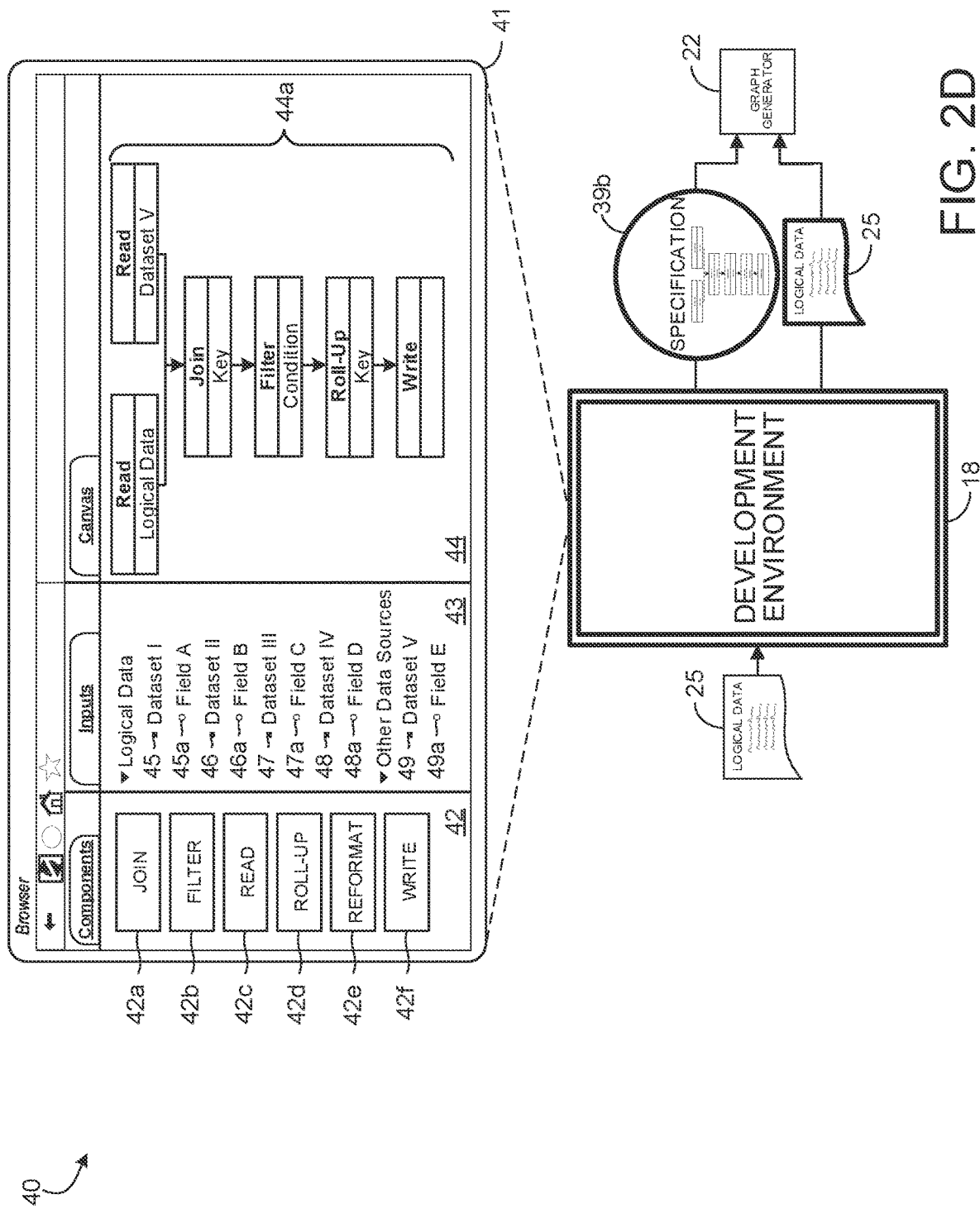

Referring to FIG. 2D, an environment 40 shows another example of the development environment 18. In this example, the development environment 18 renders a graphical user interface 41 with a components portion 42, an input portion 43, and a canvas section 44. The components portion 42 includes visual representations 42a through 42f that represent various operations that are available for defining computational logic. The input portion 43 displays visual representations 45, 45a, 46, 46a, 47, 47a, 48b, 48a, of datasets and attributes (e.g., fields) represented in the logical data 25. The inputs portion 43 also displays visual representations 49 and 49a of datasets and fields represented in other data sources (e.g., data sources other than the logical data 25). That is, the visual representations in the input portion 43 represent those datasets and fields that are available for defining computational logic.

The canvas portion 44 is used for defining computation logic in the form of a dataflow graph, visually depicted as visualization 44a (and hereinafter referred to as "dataflow graph 44a," for purposes of convenience and without limitation). The dataflow graph represented by the visualization 44a includes a data structure with nodes. Each of the nodes include at least one operation placeholder field and at least one data placeholder field which are populated with the operations and data (e.g., logical data, other data sources such as 'Dataset V') specified by the user in the canvas portion 44. In this example, the dataflow graph 44a is generated by dragging and dropping one or more of the visual representations 42a through 42f from the components portion 42 onto the canvas portion 44. Each of the visual representations 42a-42f represent an operation to be performed by or on a data structure. Once the visual representations are placed on the canvas portion 44 they become icons on the canvas portion 44. The development environment 18 uses the computational logic visually represented by the dataflow graph 44a to generate the specification 39b. The specification 39b specifies the computational logic visually depicted in the canvas portion 44. The development environment 18 transmits the specification 39b and the logical data 25 to the graph generator 22. The graph generator 22 can use the specification 39b and the logical data 25 to populate the operation and data placeholder fields for each node of the dataflow graph 44a, as detailed below.

Figure 2E:
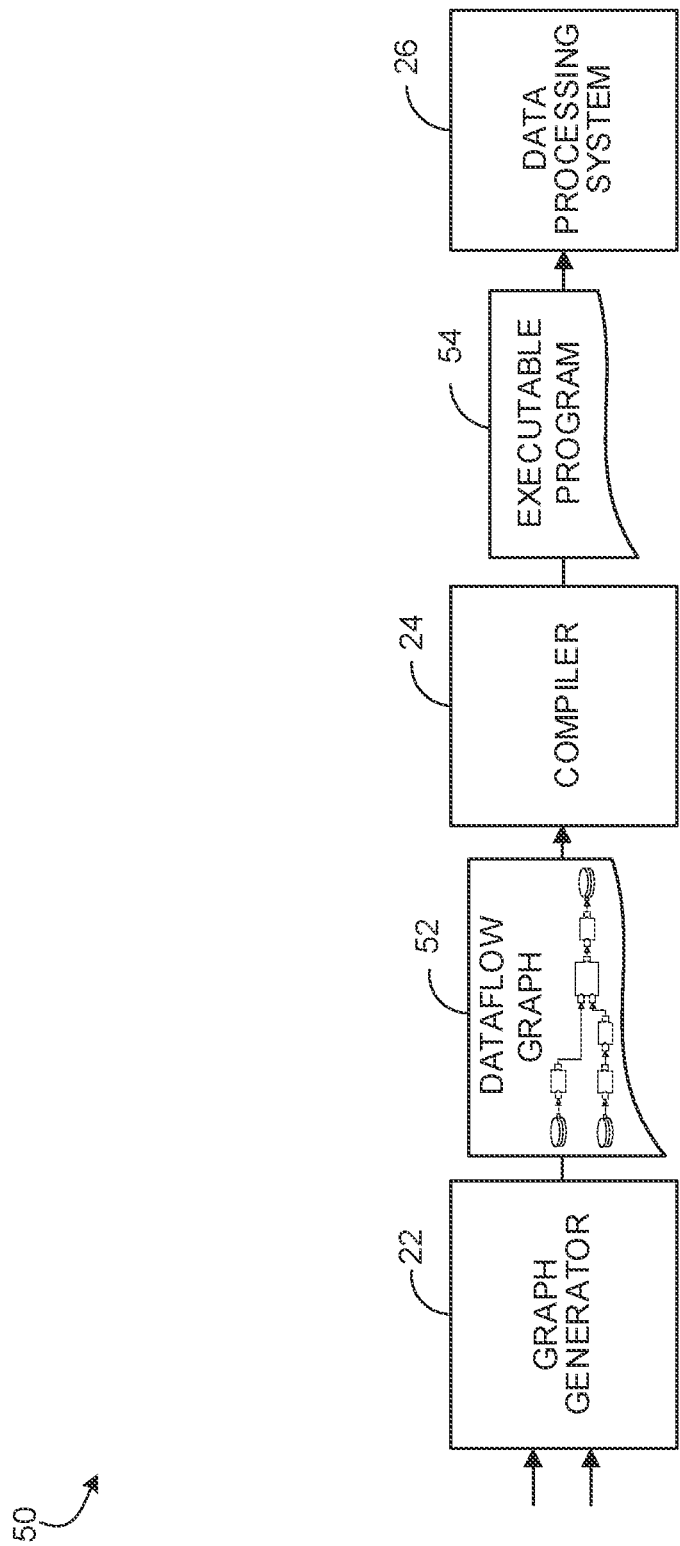
FIG. 2E is a block diagram of a system for executing a computer program.

Referring to FIG. 2E, an environment 50 shows additional details of the environment 10. In this example, the graph generator 22 generates a dataflow graph 52 from the information received from the development environment 18 (e.g., the specification and the logical data). The compiler 24 received the dataflow graph 52 and compiles it into an executable program 54 (e.g., a computer program, such as an executable dataflow graph). The compiler 24 transmits the executable program 54 to the data processing system 26 for execution and/or storage of the computer program. In this example, the computer program is configured to access from the storage system 12 at least one of the plurality of datasets for which attributes were included in the logical data or specified in the specification, or both.

Figure 3:
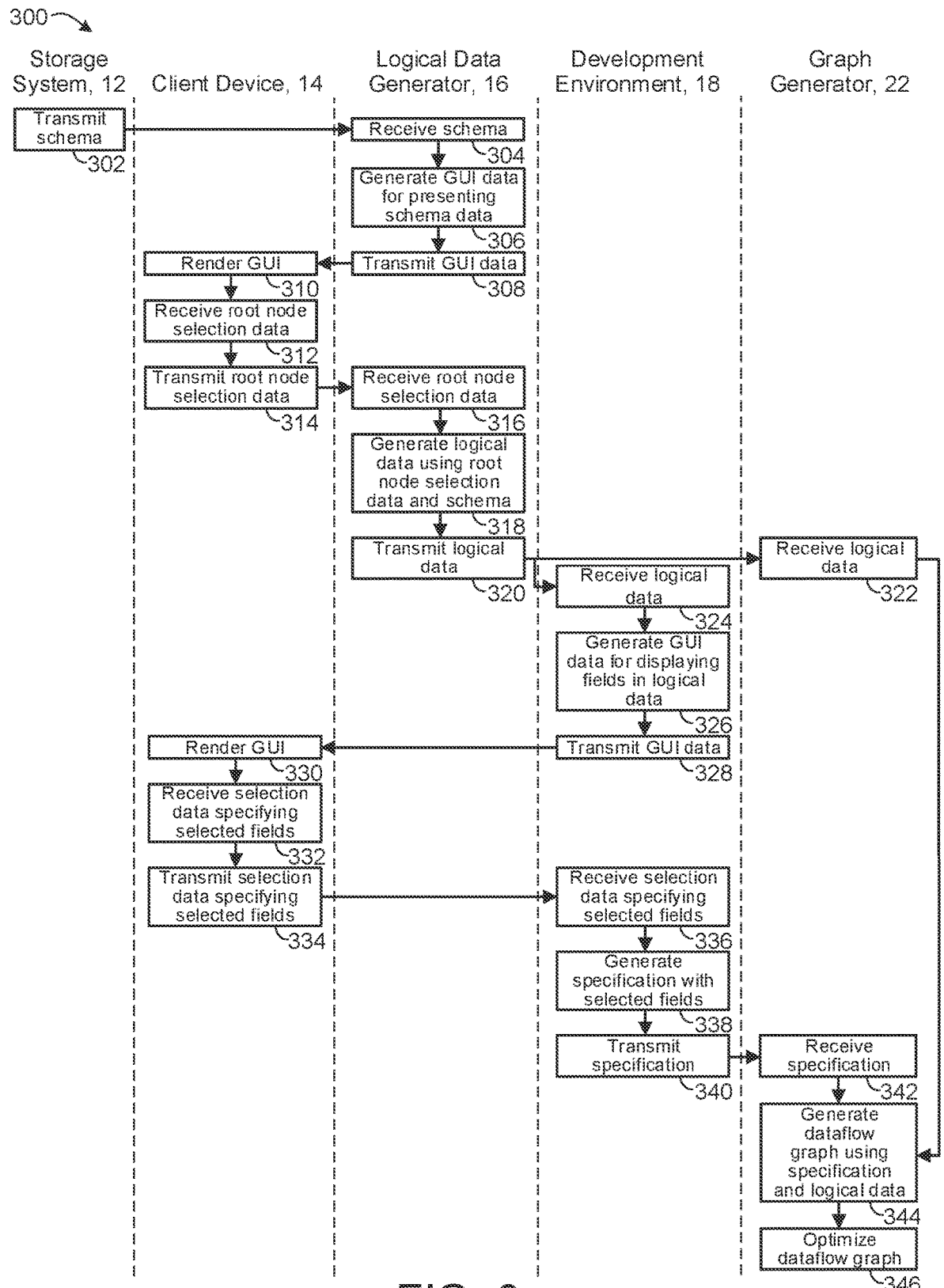
FIG. 3 is a diagram of a process for producing logical data and generating a computer program using the logical data.

Referring to FIG. 3, a swim lane diagram 300 illustrates a process for generating logical data and using that logical data to generate an optimized dataflow graph. In operation, storage system 12 transmits (302) a schema to the logical data generator 16. The logical data generator 16 receives (304) the schema. The logical data generator 16 generates (306) graphical user interface (GUI) data for presenting data representing the schema. The logical data generator 16 transmits (308) the GUI data to the client device 14. The client device 14 renders (310) the GUI data such that it is displayed to a user. The client device 14 receives (312) root node selection data (e.g., from the user interacting with the GUI rendered on the client device). The root node selection data includes data specifying a dataset that is selected to be a root node of logical data. The client device 14 transmits (314) the root node selection data to the logical data generate 16. The logical data generator 16 receives (316) the root node selection data. The logical data generator 16 then generate (318) logical data using the received root node selection data and the schema. The logical data generator 16 transmits (320) the logical data to the development environment 18 and the graph generator 22. In some examples, the logical data generator 16 transmits the logical data to the development environment 18, which then passes the logical data to the graph generate 22.

Each of the development environment 18 and the graph generator 22 receive (322, 324) the logical data. The development environment 18 generates (326) GUI data for displaying fields or other attributes of the logical data. The development environment 18 transmits (328) the GUI data to the client device 14. The GUI data represents the attributes, such as the field attributes, or other attributes that are included in the logical data, thereby providing logical access without physical cost. The client device 14 renders (330) the received GUI data and receives (332) selection data specifying selected fields, datasets, or other attributes. For purposes of clarity, the selected fields or datasets as described herein refer to information selected from the logical data itself. In some examples, the selection data also specifies operations or logic to be performed on the selected fields. The client device 14 transmits (334) the selection data specifying the selected files to the development environment 18. The development environment 18 receives (336) the selection data specifying the selected fields and generates (338) a specification with the selected fields (and operations to be performed on the selected fields). The development environment 18 transmits (340) the specification to the graph generator 22.

The graph generator 22 receives (342) the specification (102). The graph generator 22 generates (344) a dataflow graph using the specification and the logical data. Generally, a dataflow graph (or a persistent computer program) is generated from a specification as follows: A specification specifies a plurality of modules to be implemented by a computer program for processing one or more values of the one or more fields in structured data item (e.g., a data record). These plurality of modules may include rules, instructions, components of a dataflow graph and so forth. The system described herein transforms the specification into the computer program that implements the plurality of modules, where the transforming includes: for each of one or more first modules of the plurality of modules: identifying one or more second modules of the plurality of modules that each receive input that is at least partly based on an output of the first module; and formatting an output data format of the first module such that the first module outputs only one or more values of one or more fields of the structured data item that are each (i) accessible to the first module, and (ii) specified as input into at least one of the one or more second modules at least partly based on the output of the first module; and saving, in persistent memory, the computer program, with the saved computer program specifying the formatted output data format for each of the one or more first modules, as described in U.S. Published Patent Application No. 2019/0130048A1, titled "Transforming a Specification into a Persistent Computer Program," the entire content of which is incorporated herein by reference. The system also includes various rules specifying that the contents of each module are included in the computer program and/or translated into instructions that is in an appropriate format for the computer program. In this example, the graph generator 22 initially generates a dataflow graph with data sources represented in the logical data. The graph generator 22 also adds a data sink to the dataflow graph, as a dataflow graph needs a data sink. The graph generator 22 then adds to the dataflow graph various components that the graph generator 22 is configured to automatically add to increase computational efficiency of a dataflow graph, such as sort components. The graph generator 22 is also configured to add join components to appropriately join together the data from the various data sources. Instructions, parameters, or other information for accessing or joining the data sources can be included in the logical data. Finally, the graph generator 22 adds in a transform component that includes the computational logic specified in the specification. The transform component itself may include various components or sub-components representing another dataflow graph, when the specification is transformed into a dataflow graph as described above.

In an example, the graph generator 22 optimizes (346) the dataflow graph to generate an optimized dataflow graph. Generally, the graph generator 22 executes an optimizer that optimizes the dataflow graph by analyzing the specification to identify which fields, and associated data sources, the speciation identifies as being accessed. The optimizer then identifies those data sources for which no fields are being referenced in the specification and the optimizer removes from the dataflow graph those data sources for which no fields are references in the specification. In some examples, the optimizer minimizes select statements (e.g., database select statements issued in a language of the database) such that only those datasets and fields referenced in the specification are retrieved. In some examples, the optimizer does this by applying a series of optimization rules, as described in U.S. Published Patent Application No. 2019/0370407A1, titled "Systems and Methods for Dataflow Graph Optimization," the entire content of which is incorporated herein by reference. In doing so, the optimizer can create a dataflow graph that minimally loads and joins only a subset of data for which the logical data provides logical access to create a desired output. The optimizer may also perform other optimizations, such as rearranging an order of components in a dataflow graph to improve computational efficiency. For example, it may be more computationally efficient for a filter component to come before a join component, so that a join component is not joining together data that is ultimately filtered out. As such, the optimizer may move a filter component to come before a join component.

Figure 4A:
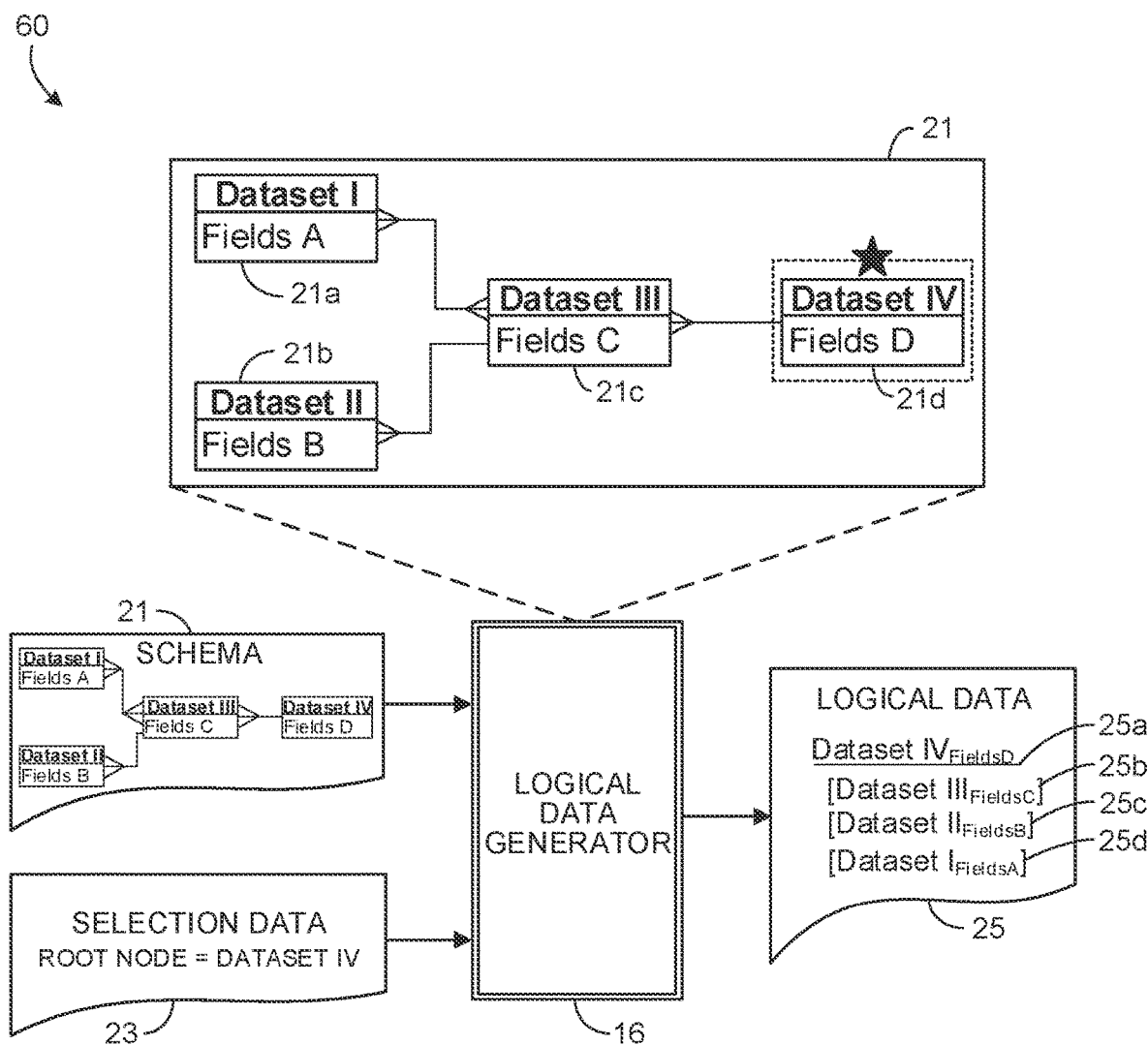
FIGS. 4A to 4C are block diagrams of systems for producing logical data.

Referring to FIG. 4A, an environment 60 illustrates the logical data generator 16 using the selection data 23 to identify dataset 21d as the root node of the logical data. This is shown by dataset 21d being starred and outlined in FIG. 4A. The logical data generator 16 also uses the schema 21 to identify other datasets that are related to the dataset 21d. The other related datasets include datasets 21a, 21b, and 21c. Using dataset 21d as the root node, the logical data generator 16 generates the logical data 25. As previously described, the logical data 25 includes an entry 25a that specifies that the dataset 21d is the perspective or root node of the logical data 25. The entry 25a includes fields and/or attributes of the dataset 21d. Attributes of a dataset (e.g., the dataset 21d) can include names of the fields in the dataset or other information that represents the fields in the dataset. By including the names of the fields in the dataset 21d among other information, the logical data 25 provides access to the fields in the dataset 21d without having to physically access the dataset 21d in storage. The logical data 25 also includes entries 25b, 25c, and 25d, for datasets 21c, 21b, and 21a, respectively. In this example, entries 25b, 25c, 25d are ordered in accordance with their relationship to dataset 21d. In this example, dataset 21d is the root node and dataset 21c is a child node. As such, entry 25b which represents dataset 21c is ordered directly beneath entry 25a in the logical data 25. Additionally, the datasets 21a, 21b are children of dataset 21c. As such, the entries 25c, 25d are ordered beneath the entry 25b to represent the relationship among datasets 21a, 21b, and 21c. Each of the entries 25b, 25c, and 25d include attributes and/or fields of the respective dataset. As previously described, these attributes and/or fields may be a name of a field or other identifying information that allows the logical data 25 to provide logical access to datasets 21a, 21b, 21c, and 21d without the physical cost of actually accessing those datasets from storage. The logical data 25 is able to provide logical access because it includes information that can be used to identify attributes or fields of the datasets 21a, 21b, 21c, and 21d and/or can be used to access those datasets, as appropriate.

Figure 4B:
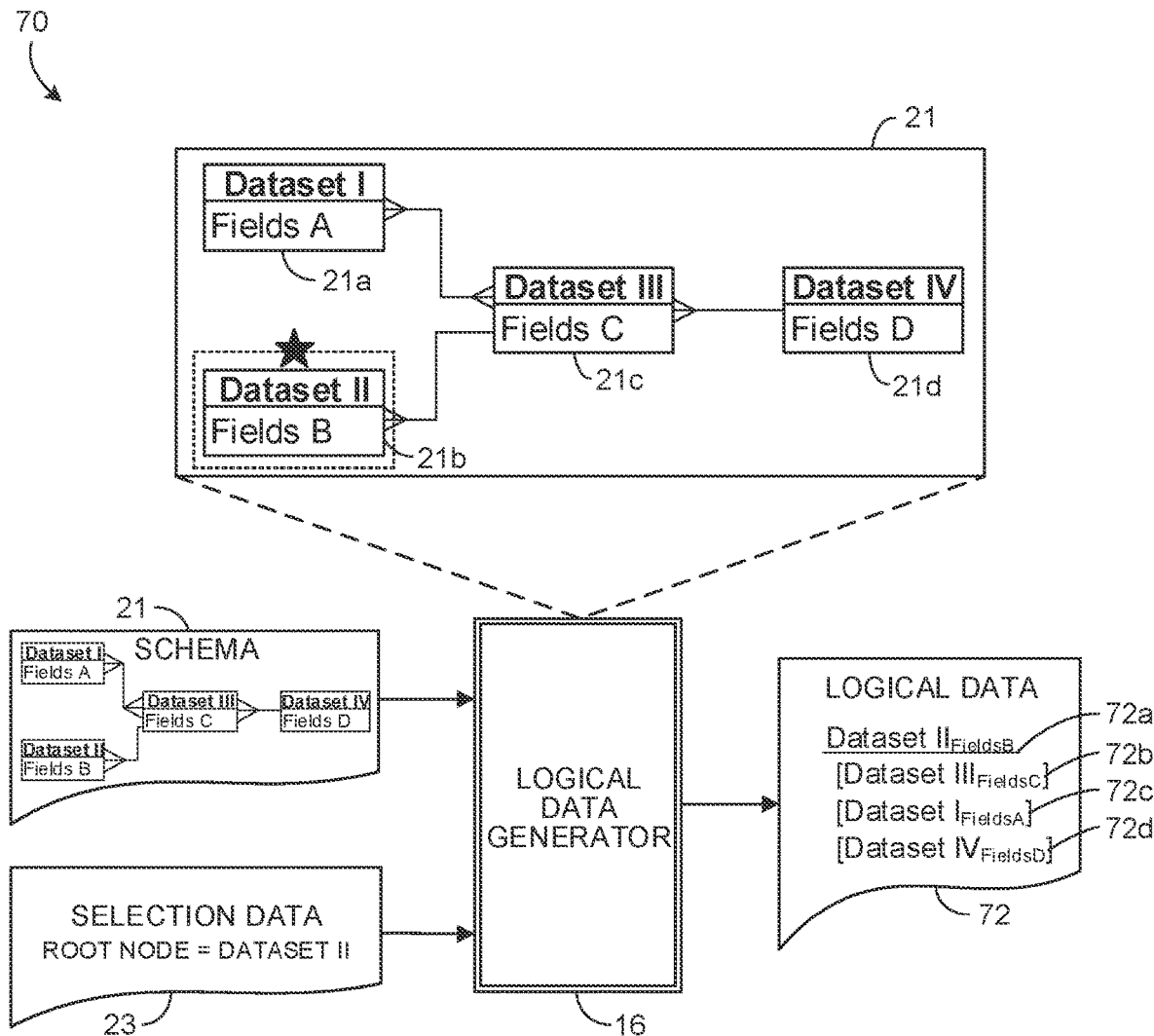

Referring to FIG. 4B, an environment 70 shows a variation of the environment 60 (FIG. 4A) in which dataset 21b is selected as the root node as indicated by the dashed and starred outline. The dataset 21b is selected as a root node, for example, when a user selects visual representation 28b in FIG. 2B. When dataset 21b is selected as the root node the logical data generator 16 generates logical data 72 in which dataset 21b is specified as the root node and the ordering of the other datasets in the logical data have changed relative to the ordering of the datasets in logical data 25, as shown in FIG. 4A. In this example, the logical data 72 includes an entry 72a representing dataset 21b. In this example dataset 21b is a child of dataset 21c, and an entry 72b is included in the logical data 72 which represents dataset 21c. Dataset 21a is a child of dataset 21c, and an entry 72c is included in the logical data 72 which represents dataset 21a. Dataset 21c is a child of dataset 21d, and an entry 72d is included in the logical data 72 which represents dataset 21d. As described above with reference to FIG. 4A, each of the entries 72a, 72b, 72c, and 72d include information regarding attributes or fields for each of the respective datasets and/or other information specifying characteristics of the datasets or how to access the datasets.

Figure 4C:
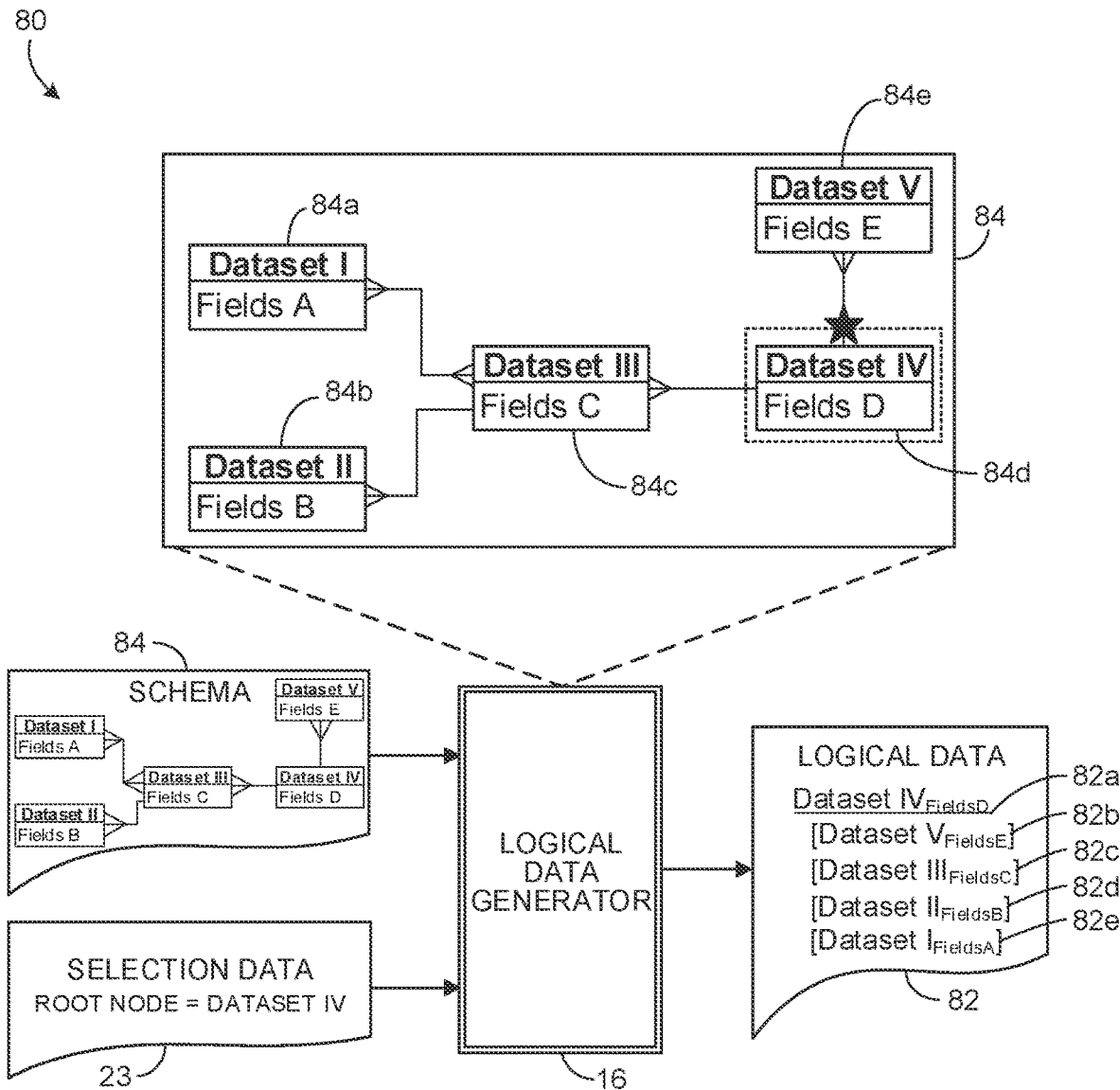

Referring to FIG. 4C, an environment 80 illustrates generation of logical data 82 for a database schema 84. In this example, the logical data generator 16 receives the database schema 84 and also receives selection data 23 that specifies that dataset 84d in the schema 84 is the root node (as indicated by the dashed and starred outline). In this example, the schema 84 includes datasets 84a, 84b, 84c, 84d, and 84e. In an example, the schema 84 includes instructions for performing computations on dataset 84d (e.g., fields or values of fields of dataset 84d) or otherwise transforming dataset 84d to produce dataset 84e. For example, the schema 84 can include instructions for performing one or more operations, or instructions to invoke an executable program (e.g., a dataflow graph) that includes dataset 84d (or portions thereof) as an input and produces dataset 84e (or portions thereof) as an output. In some examples, these computations, transformations, or other operations are defined directly in the schema 84, such as by including instructions specifying the operations in the schema 84. In some examples, the schema 84 can include a link, pointer, or other information for accessing the instructions that perform the operations. In some examples, these operations are previously executed, and the dataset 84e produced by operations is a physical dataset stored in a storage system. In some examples, the dataset 84e includes virtual data, such as one or more calculated or virtual attributes, virtual fields, or other virtual elements that are populated at runtime (e.g., when the dataset 84e is used in a computer program, such as a dataflow graph).

Because the dataset 84d is the root node, the logical data generator 16 generates the logical data 82 with entries 82a through 82e. Entry 82a represents the dataset 84d, which is the root node. Entry 82a can include attributes of the dataset 84d. As previously described herein attributes include names of fields, pointers to fields, and so forth. Because datasets 84c and 84e are children of dataset 84d, the next entries in the logical data 82 are entry 82b representing dataset 84e and entry 82c representing dataset 84c. Each of entries 82b and 82e includes field attributes. Because dataset 84a and 84b are children of dataset 84c, the next entries in the logical data 82 are entry 82d representing dataset 84b and entry 82e representing dataset 84a. Each of entries 82d and 82e include field attributes.

Figure 5A:
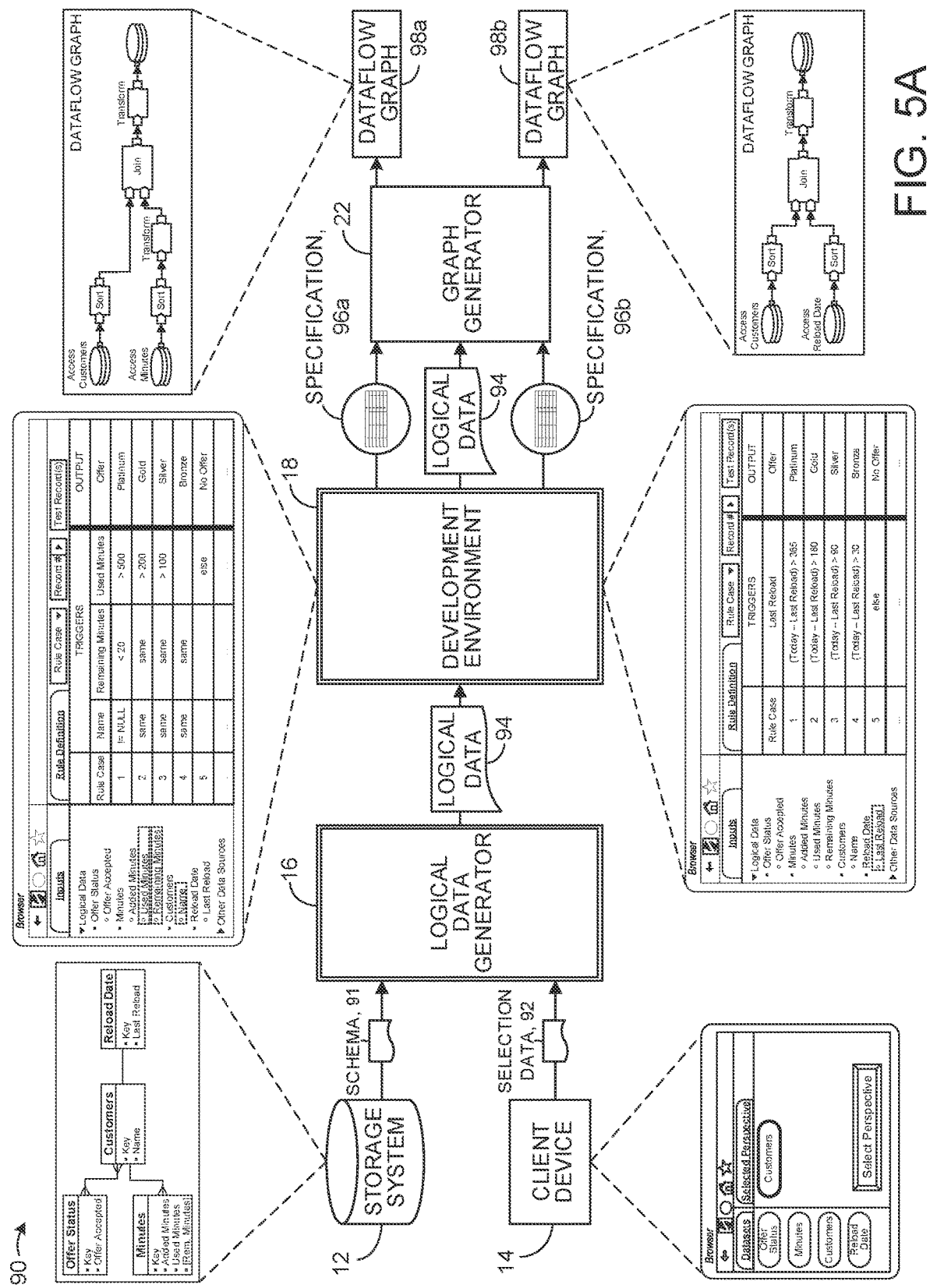
FIG. 5A is a block diagram of a system for producing logical data and generating a computer program using the logical data.

Referring to FIG. 5A, an environment 90 shows an overview of a real-world example of generating logical data and using the logical data to generate an optimized dataflow graph. In this example, the logical generator 16 receives a schema 91 from the storage system. The logical data generator 16 also receives selection data 92 indicating a selected root node from the client device 14. Using the schema 91 and the selection data 92, the logical data generator 16 generates logical data 94 in accordance with the techniques described herein. The logical data generator 16 transmits the logical data 94 to the development environment 18. Using the logical data 94, the development environment 18 generates a graphical user interface or other user interface that makes the information, such as the attributes or fields, included in the logical data 94 viewable or accessible by a user interacting with the development environment 18 (e.g., using the client device 14) without accessing the underlying physical datasets in storage. The user uses the development environment 18 to select at least one of the attributes in the logical data 94, as well as one or more operations for perform on or using the selected attributes. Based on this information, the development environment 18 produces a specification 96a specifying which of the attributes and/or fields of the logical data 94 are to be included in generating a dataflow graph. The graph generator 22 receives the logical data 94 and the specification 96a and produces a dataflow graph 98a that is optimized to access only those physical datasets associated with attributes specified in the specification 96a (or otherwise needed to perform the operations in the specification 96a).

The same or different user may use the development environment 18 to select one or more different attributes of the logical data 94 or one or more different operations to perform on the selected attributes, or both. For example, the user may change the selected attributes or operations specified in the specification 96a in response to an error identified in the processing of the dataflow graph 98a, or may select different attributes and operations to produce a new dataflow graph entirely. Using this information, the development environment produces a specification 96b that is different than the specification 96a. The graph generator 22 receives the logical data 94 and the specification 96b and produces a dataflow graph 98b that is optimized differently than the dataflow graph 98a to access only those physical datasets associated with attributes specified in the specification 96b. In this manner, the logical data 94 enables logical access to all of the datasets and attributes included therein without the physical cost of doing so. This provides tremendous flexibility to the end user (e.g., the user of the development environment 18) who can view and select from among all of the physical data included in the logical data 94 (without the cost of physically accessing such data), and obtain a highly optimized dataflow graph tailored to access only the physical data necessary to carry out their specifications.

Figure 5B:
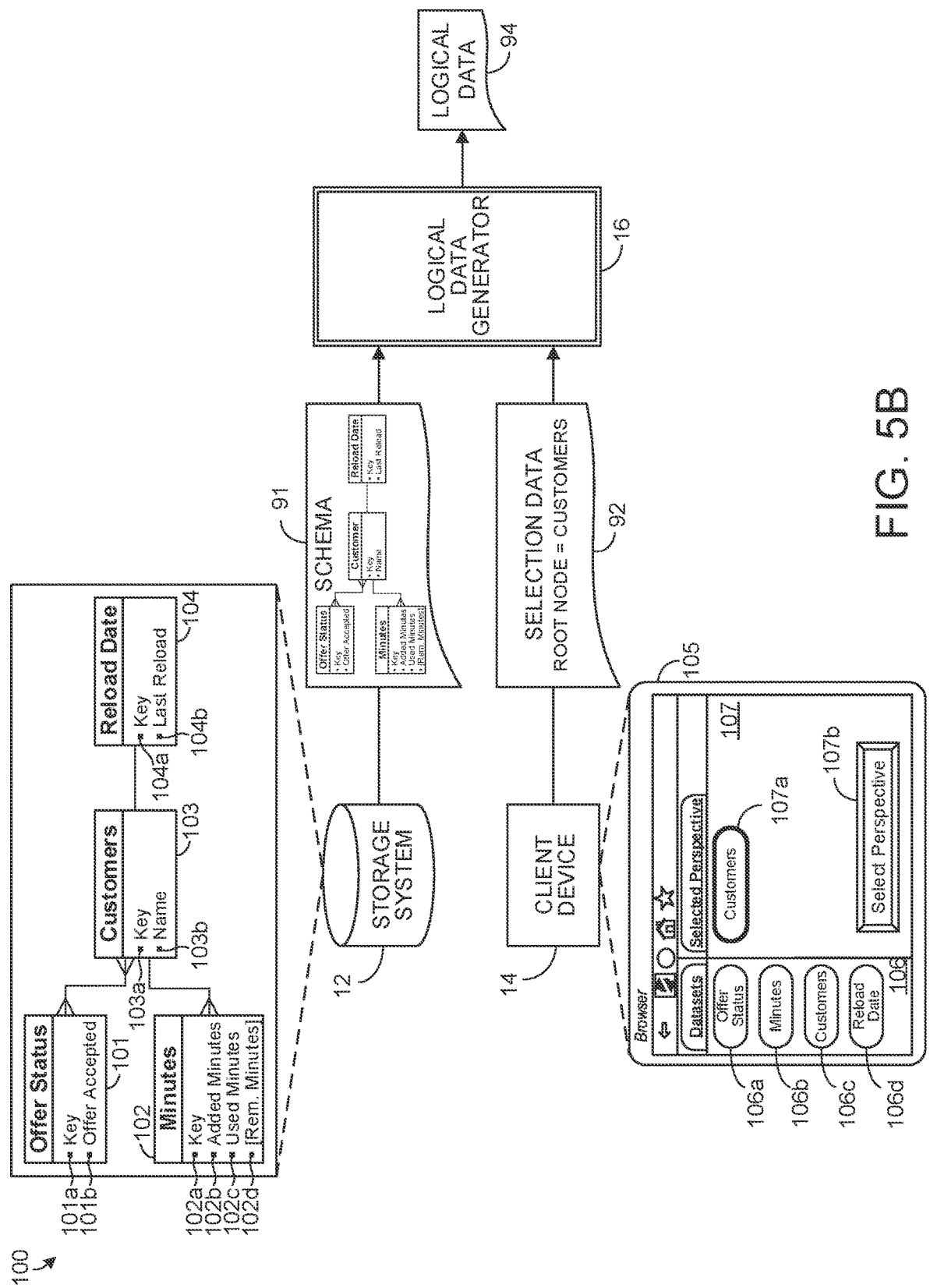
FIGS. 5B and 5C are block diagrams of systems for producing logical data.

Referring to FIG. 5B, an environment 100 shows additional details of the environment 90. In this example, storage system 12 stores the schema 91 with datasets 101, 102, 103, 104. An 'Offer Status' dataset 101 includes a 'Key' field 101a and an 'Offer Accepted' field 101b. The field 101a can include, for example, a primary key, a foreign key, or both (which may be defined in separate fields). A 'Minutes' dataset 102 includes fields 102a, 102b, 102c, and 102d. A 'Customers' dataset 103 includes fields 103a and 103b. A 'Reload Date' dataset 104 includes fields 104a and 104b. In this example, the 'Remaining Minutes' field 102d is a virtual or calculated field defined in, for example, the schema 91 as described above. For example, the schema 91 may specify one or more operations or other instructions that generates the field 102d from one or more other fields in the dataset 102 or another dataset. In particular, the schema 91 may define the field 102*d* as the difference between the fields 102*b* and 102*c*. In this example, square brackets are used to indicate that the field 102*d* is a virtual or calculated field. In this example, the datasets 101, 102, 103, 104 are related to each other through the values of their keys. That is, each of datasets 101, 102, 103, 104 have values for keys that match each other and can be used to join data from one dataset with another.

The logical data generator 16 receives the schema 91 from the storage system 12. The client device 14 displays the graphical user interface 105 (e.g., based on GUI data that specifies which datasets are included in the schema 91 received from the logical data generator 16 (not shown)). The GUI 105 includes a datasets portion 106 and a selected perspective portion 107. The datasets portion 106 includes visual representations 106*a*, 106*b*, 106*c*, 106*d* of datasets 101, 102, 103, 104, respectively. The selected perspective portion 107 includes a button 107*a*, selection of which allows the viewer to select one of visual representations 106*a*-106*d*. In this example, the user selects visual representation 106*c*, representing dataset 103. Upon this selection, the selected perspective portion 107 is updated with an icon 107*b* specifying that the dataset 107 has been selected as the root node for logical data to be generated by the logical data generator 16. The client device 14 generates selection data 92 that specifies that the dataset 103 is selected as the root node. The client device 14 transmits the selection data 92 to the logical data generator 16. The logical data generator 16 uses the schema 91 and the selection data 92 to produce logical data 94.

Figure 5C:
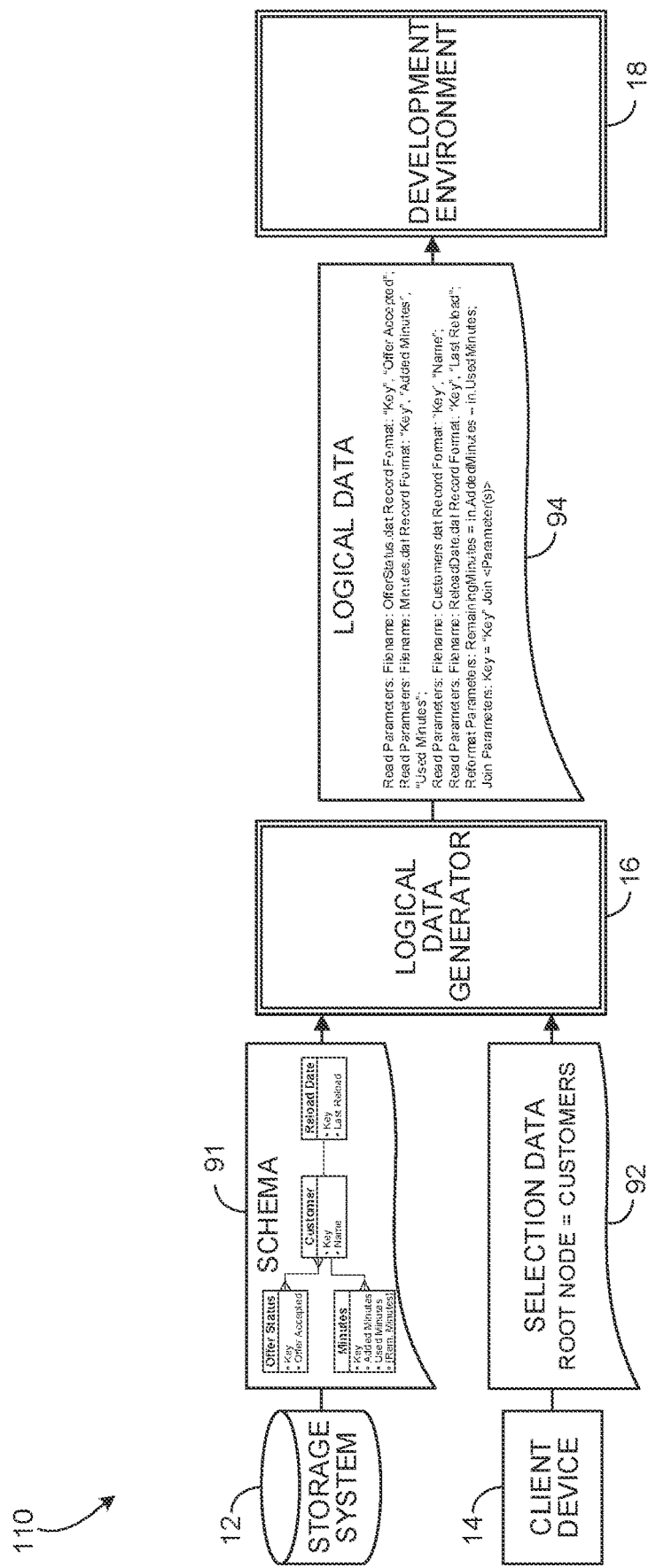

Referring to FIG. 5C, an environment 110 shows an illustration of generating logical data 94 from the schema 91 and the selection data 92. In this example, the logical data 94 includes a series of instructions, parameters, or other information specifying how to access the datasets 101, 102, 103, 104 and their respective fields, as shown in FIG. 5B. In some examples, the logical data 94 includes instructions, parameters, or other information specifying how to generate or otherwise access virtual or calculated fields, such as the field 102*d*. In some examples, the logical data is materialized into a wide record containing the attributes, fields, or other features of the underlying datasets. The logical data generator 16 transmits the logical data 94 to the development environment 18.

Figure 5D:
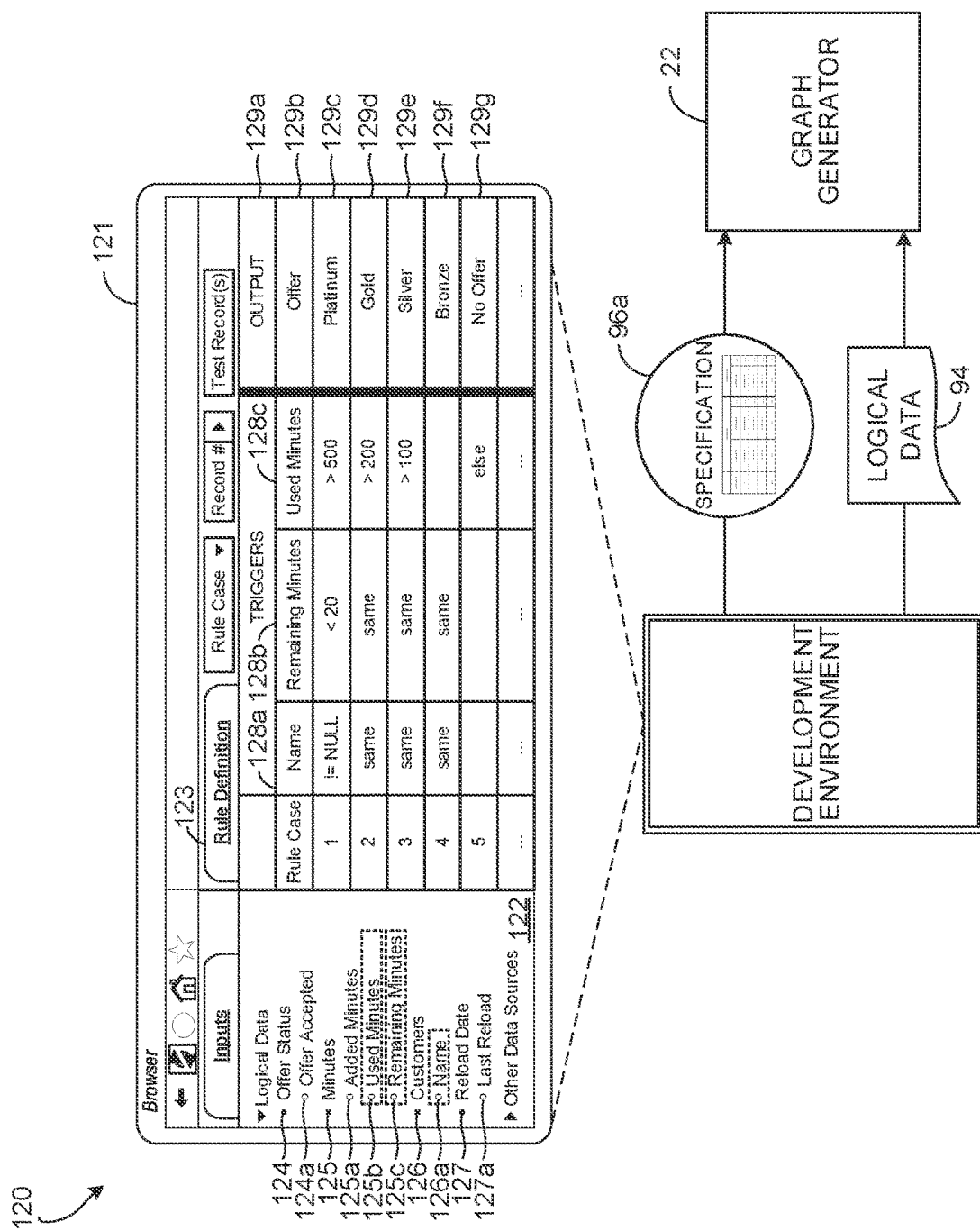

Referring to FIG. 5D, an environment 120 shows an example of a business rules editor interface 121 generated by the development environment 18 for defining business rules and other logical rules. In general, the editor interface 121 may graphically identify cells that contain expressions. This will help the user understand the difference between an expression that will be evaluated to true or false on its own and an expression that returns a value that is compared against the column variable. When the user is typing, the user can indicate that a particular cell is to be an expression cell by, for example, typing an asterisk at the beginning of the expression. In this example, the editor interface 121 includes an input portion 122 and a rule definition portion 123. The input portion 122 provides a visual representation of those fields and datasets that are represented in the logical data 94 (shown in an expanded view as indicated by the downward facing arrow) as well as other data sources (shown in a collapsed view as indicated by the rightward facing arrow). For instance, the input portion 122 includes a visual representation 124 that represents dataset 101 (shown in FIG. 5B). The input portion 122 also includes a visual representation 124*a* representing the 'Offer Accepted' field 101*b* in the dataset 101. In this example, the visual representation 124*a* is visually depicted as being a field in the dataset 101 by being indented from visual representation 124. The input portion 122 also includes visual representations 125 and 125*a*, 125*b*, and 125*c* that represents the dataset 102 and the fields 102*b*, 102*c*, and 102*d*, respectively. The input portion 122 also includes visual representations 126 and 126*a* that represent the dataset 103 and the field 86*b*, respectively. The input portion 122 also includes visual representations 127 and 127*a* that represents the dataset 104 and the field 104*b*, respectively. In this example, the visual representations in the input portion 122 represent those datasets and fields that are available to a user in defining a business rule. The available datasets and fields represented in the input portion 122 are identified from the logical data 94, thereby providing a user with access to the datasets and fields without actually having to access those datasets (or fields) from physical memory.

The rule definition portion 123 includes a series of rule cases. In this example, the rule definition portion 106 includes a spreadsheet format. Trigger columns 128*a*, 128*b*, and 128*c* in the spreadsheet correspond to available data values, and rows 129*c*-129*g* correspond to rule cases, e.g., sets of criteria that relate the available data values. A rule case applies to a given record if the data values of that record meets the triggering criteria for each trigger column in which the rule case has criteria. If a rule case applies, an output is generated based on an output column 129*a*. A rule case that has all of its input relationships satisfied may be referred to as "triggered." The output column 129*a* corresponds to a potential output variable, and the value in the corresponding cell of the applicable row determines the output, if any, for that variable. The cell could contain a value that is assigned to the variable or it could contain an expression that must be evaluated to generate the output value, as discussed below. There may be more than one output column, though only one is shown in FIG. 5D.

In particular, the row 129*a* specifies the relative input and output of a rule. The row 129*b* specifies the fields to be used in defining a rule and what the output will be. In this example, the row 129*b* includes cells 128*a*, 128*b*, and 128*c*. The cell 128*a* is added to the rule definition portion 123 upon user selection of the visual representation 126*a*, as visually depicted by the dotted line around the visual representation 126*a* in the input portion 122. As a result of this selection, the cell 128*a* specifies that the 'Name' field 103*be* (shown in FIG. 5B) is used as an input in defining the rules specified in the rule definition portion 123. The cell 128*b* specifies that the 'Remaining Minutes' field 102*d* (shown in FIG. 5B) is also used as an input in defining the rules shown in the rule definition 123. In this example, upon selection of the visual representation 125*c*, the cell 128*b* is updated to represent that the 'Remaining Minutes' field 102*d* is used as an input into the rule. Similarly, the cell 128*c* specifies that the 'Used Minutes' field 102*c* (shown in FIG. 5B) is also used as an input in defining the rules shown in the rule definition 123 after selection of the visual representation 125*b* representing the 'Used Minutes' field 102*c*. The cells 128*a*, 128*b*, and 128*c* illustrate that a user is able to access attributes of fields (such as names of the fields) from the dataset stored in the storage system 12 without having to physically access those datasets (or fields) themselves. The rule definition portion 123 also includes rows 129*c*, 129*d*, 129*e*, 129*f*, and 129*g* that specify various rule cases and outputs when various criteria for the rule cases are met.

Upon completion of defining a rule by specifying inputs for the cells in the rule definition portion 123, the development environment 18 generates a rule specification 96*a* that specifies the rule cases and which fields will need to be accessed to implement a rule. In this example, the rule specification 96a specifies that the 'Name' field 103b, the 'Remaining Minutes' field 102d, and the 'Used Minutes' field 102c (each shown in FIG. 5B) are used as inputs for the rule. That is, the values of those fields are used as inputs for the rule. As such, upon execution of the rule itself those fields will need to be physically accessed when executing the rule. However, at this stage in defining the rule the logical data 94 provides a user with logical access to those fields without physical access. For example, the user was provided with logical access by being able to view the available fields from the various datasets stored in storage system 12 in the input portion 122. The development environment 18 transmits the rule specification 96a to the graph generator 22. The development environment 18 also transmits the logical data 94 to the graph generator 22.

Figure 5E:
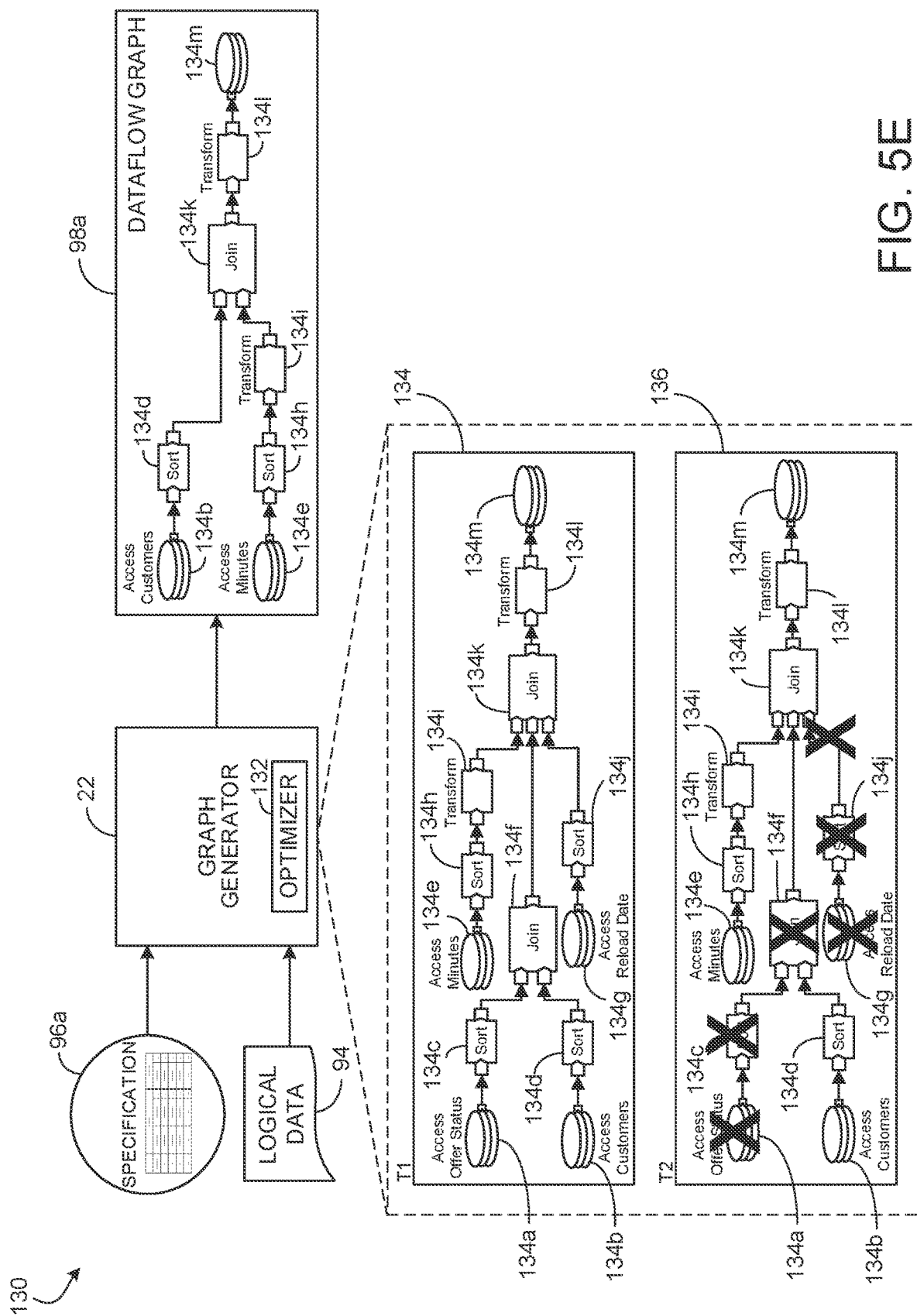

Referring to FIG. 5E, an environment 130 shows an example of generating and optimizing a dataflow graph from the rule specification 96a and the logical data 94. The graph generator 22 receives the rule specification 96a and the logical data 94. The graph generator 22 applies an optimizer 132 to both the rule specification 96a and the logical data 94 in generating an optimized dataflow graph 98a. In this example, the graph generator 22 uses the rule specification 96a and the logical data 94 to generate a dataflow graph 134. In this example, the dataflow graph 134 includes components 134a through 134m. The graph generator 22 then applies the optimizer 132 to the dataflow graph 134. Generally, the optimizer 132 reduces redundancies in a dataflow graph (e.g., the dataflow graph 134) and eliminates data sources that are not being used by the dataflow graph. That is, if the rule specification 96a does not specify that a rule accesses a field from a particular data source (e.g., a dataset), then the optimizer 132 will remove that data source from the dataflow graph. In some examples, the optimizer 132 does this by minimizing select statements (e.g., when the source data is stored in a relational database) such that only those datasets and fields specified in the rule specification 96a and included in the logical data 94 are accessed.

Initially, the graph generator 22 generates the dataflow graph 134 with the datasets and fields included in the logical data 94 as data sources based on, for example, the instructions, parameters, or other information for accessing the datasets specified in the logical data 94. In this example, the components 134a through 134m in the dataflow graph 134 are based on the data sources (e.g., datasets) represented in the logical data 94. In some examples, the graph generator 22 may also rely on built-in functionality that specifies how to transform the information contained in the specification 96a or the logical data 94, or both, into the dataflow graph 134. For example, the built-in functionality can include functionality to insert various operations, such as sort, partition, or join operations, among others, into the dataflow graph based on, for example, information from the specification 96a or the logical data 94, or both.

The dataflow graph 134 can also include one or more transform components. In general, a transform component receives input records from one or more data sources, e.g., an input dataset, and produces an output record based on computation logic. To produce a transform component, the graph generator 22 can receive a specification of logic (e.g., a rule set from the specification 96a, or instructions, parameters, or other information from the logical data 94) to be applied to an input. The graph generator 22 can then generate and implement the transform as graph-based computations having data processing components connected by linking elements representing data flows. In this example, the dataflow graph 134 includes a transform component 134l that includes logic to perform the rules specified in rule specification 96a. In this example, the dataflow graph 134 also includes a transform component 134i that includes logic for generating the calculated field 102d. In this example, the generated transform is a component (e.g., the component 134l) in the dataflow graph 134. The graph generator 22 may also update the transform, for example, when the rule set is edited. For example, when the rule set is edited, the editor (e.g., the development environment 18) may provide the entire rule set to the graph generator 22 or it may provide only the new or modified rules or rule cases. The graph generator 22 may generate an entirely new transform to replace the original transform, or it may provide a new component containing the transform, depending on the capability and needs of the system using the transform.

The graph generator 22 applies the optimizer 132 to the dataflow graph 134 to generate a dataflow graph 136. The optimizer 132 removes from the dataflow graph 134 components 134a, 134c, 134f, 134g, 134j, as shown by the crossed out portions of the dataflow graph 136. The optimizer 132 determines to remove these components because these components are related to datasets that are not referenced or used by the rule specification 96a. That is, the rule specification 96a does not include references to any fields included in the removed datasets. Note that, in some examples, the dataset serving as the root node (e.g., dataset 103 or component 134b in this example) may not be optimized out regardless of whether it is used by the rule specification 96a. The final result of the optimization is the dataflow graph 98a which is been optimized to remove all of the datasets that are not required to execute the rules specified by rule specification 96a, as well as other components (e.g., sorts, joins, etc.) instantiated to access those datasets.

Figure 5F:
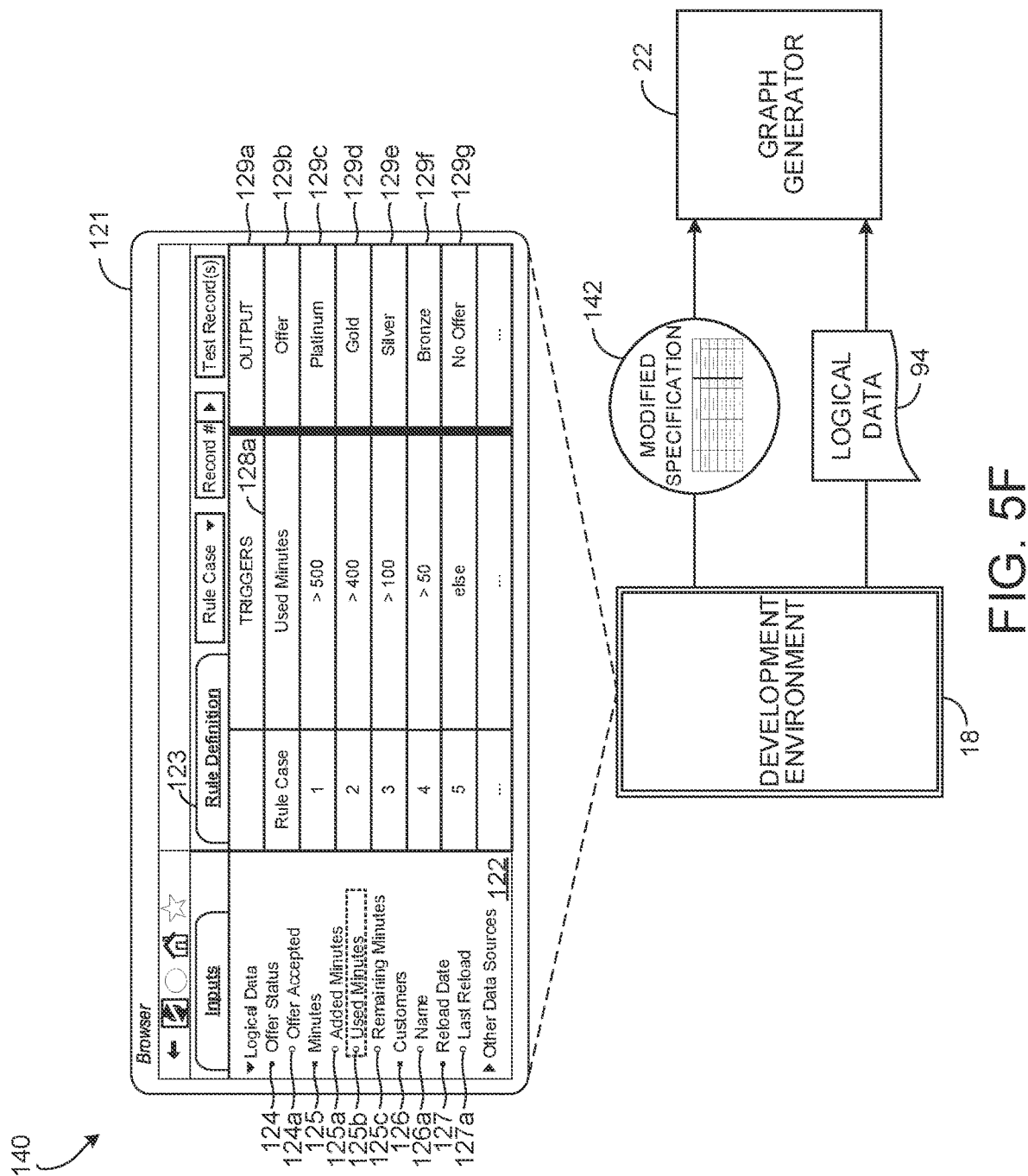

Referring to FIG. 5F, an environment 140 shows another example of the business rules editor interface 121 generated by the development environment 18 for defining business rules and other logical rules. In the environment 140, the rule definition 123 has been changed relative to that in environment 120 shown in FIG. 5D. Specifically, the trigger cells 128b and 128c have been removed, and the cell 128a has been modified to specify that the 'Used Minutes' field 102c (shown in FIG. 5B) is the only input in defining the rules shown in the rule definition 123 after selection of the visual representation 125b representing the 'Used Minutes' field 102c. The rule cases in rows 129d, 129e, 129f, and 129g have also been updated. Accordingly, the development environment 18 generates a rule specification 142 that is modified version of the rule specification 96a shown in FIG. 5D. In this example, the rule specification 142 specifies that the 'Used Minutes' field 102c is used as the sole input for the rule. The development environment 18 transmits the rule specification 142 to the graph generator 22. The development environment 18 also transmits the logical data 94 to the graph generator 22.

Figure 5G:
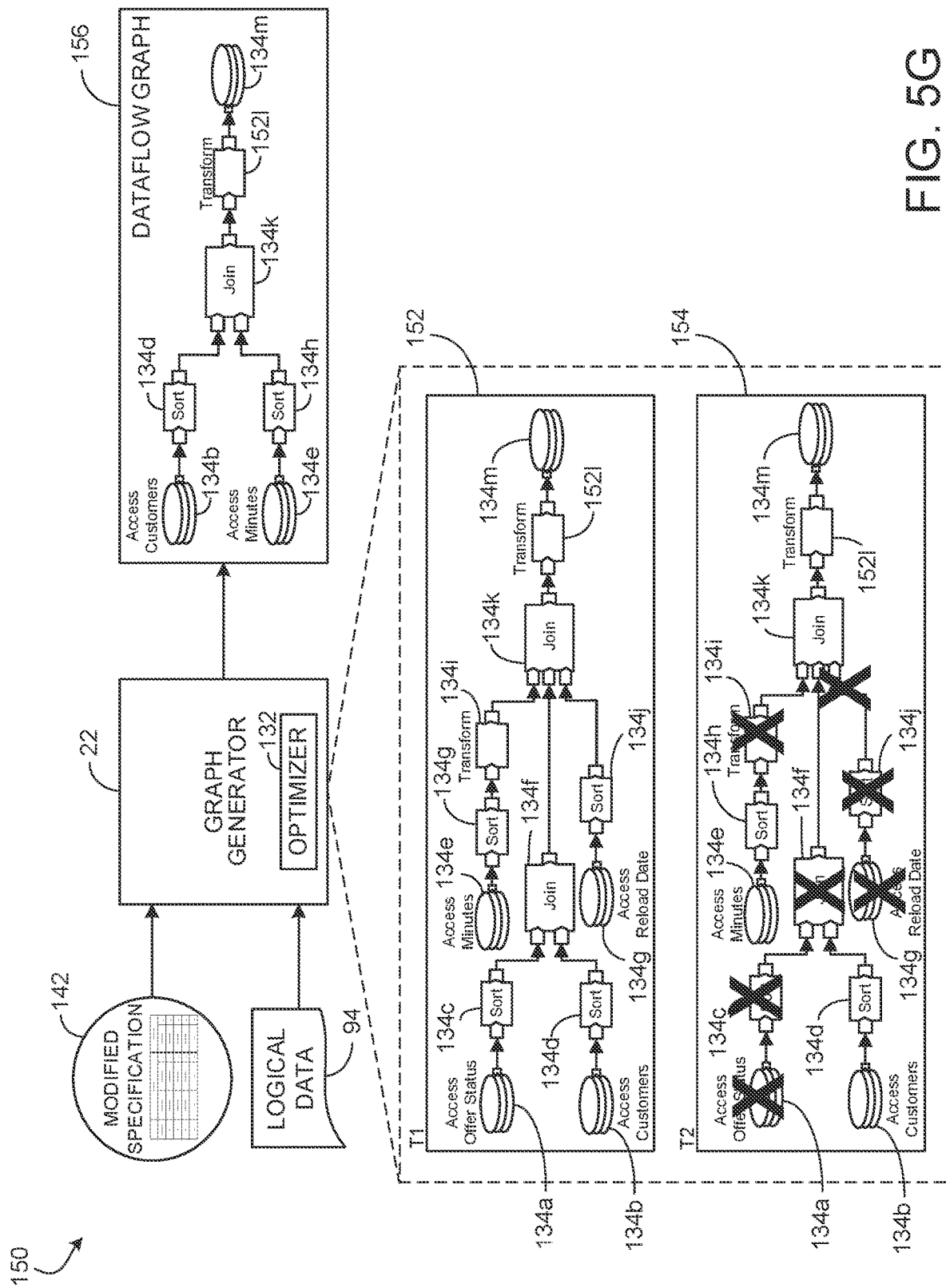

Referring to FIG. 5G, an environment 150 shows an example of generating and optimizing a dataflow graph from the modified specification 142 and the logical data 94. Initially, the graph generator 22 generates a dataflow graph 152 that is similar to the dataflow graph 134 shown in FIG. 5E, except for a transform component 152l that includes logic to perform the rules specified in the modified specification 142. In this example, the transform component 152l is different from the transform component 134l (shown in FIG. 5E) because the rules specified in the modified specification 142 and implemented by the component 152*l* are different than those specified in the specification 96*a* and implemented by the component 134*l*. The graph generator 22 applies the optimizer 132 to the dataflow graph 152 to generate a dataflow graph 154. In doing so, the optimizer 132 removes from the dataflow graph 154 components 134*a*, 134*c*, 134*f*, 134*g*, 134*j*, and 134*i*, as shown by the crossed out portions of the dataflow graph 154. The optimizer 132 determines to remove these components because these components are related to datasets that are not referenced or used by the rule specification 142. Note that, although the dataset serving as the root node (e.g., dataset 103 or component 134*b* in this example) is not referenced in the specification 140, it is not optimized out. The final result of the optimization is the dataflow graph 156 which is been optimized to remove all of the datasets that are not required to execute the rules specified by rule specification 142, as well as other components (e.g., sorts, joins, etc.) instantiated to access those datasets. The dataflow graph 156 is different from the dataflow graph 98*a* despite using the same logical data 94 source due to the different attributes relied on in the specifications 96*a*, 142 of the respective graphs.

Referring to FIG. 5H, an environment 160 shows yet another example of the business rules editor interface 121 generated by the development environment 18 for defining business rules and other logical rules. In the environment 140, the rule definition 123 has been changed relative to that in environments 120 and 140 shown in FIGS. 5D and 5F, respectively. Now, the cell 128*a* specifies that the 'Last Reload' field 103*b* (shown in FIG. 5B) is the only input in defining the rules shown in the rule definition 123 after selection of the visual representation 127*a* representing the 'Last Reload' field 103*b*. The rule cases in rows 129*c*, 129*d*, 129*e*, 129*f*, and 129*g* have also been changed. Accordingly, the development environment 18 generates a rule specification 96*b* (as originally shown in FIG. 5A) that is different from each of the rule specifications 96*a*, 142. In this example, the rule specification 96*b* specifies that the 'Last Reload' field 103*b* is used as the sole input for the rule. The development environment 18 transmits the rule specification 96*b* to the graph generator 22. The development environment 18 also transmits the logical data 94 to the graph generator 22.

Figure 5I:
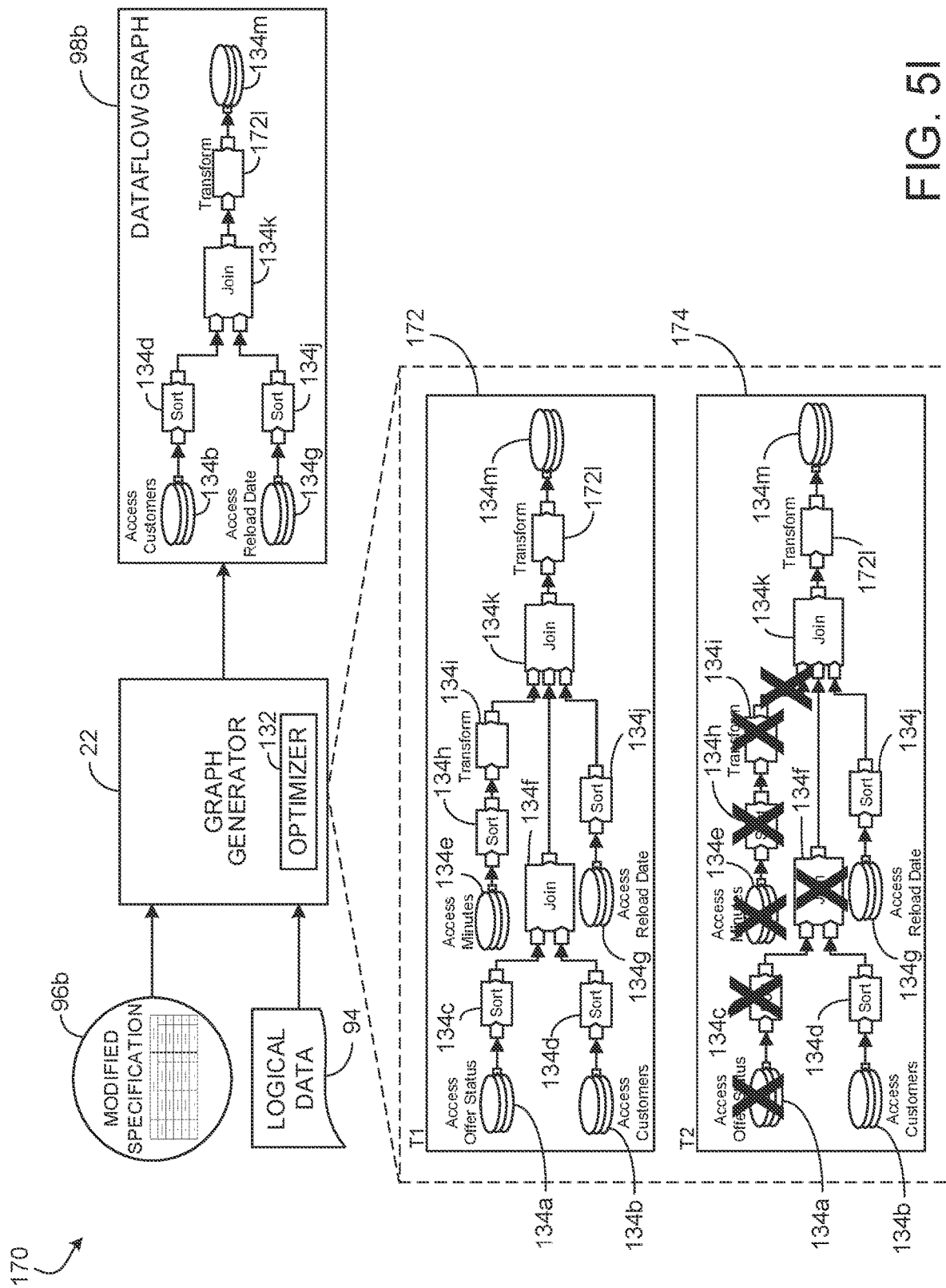

Referring to FIG. 5I, an environment 170 shows an example of generating and optimizing a dataflow graph from the specification 96*b* and the logical data 94. Initially, the graph generator 22 generates a dataflow graph 172 that is similar to the dataflow graphs 134 and 152 shown in FIGS. 5E and 5G, respectively, except for a transform component 172*l* that includes logic to perform the rules specified in the modified specification 96*b* (which are different from each of the transform components 134*l* and 152*l* in this example). The graph generator 22 applies the optimizer 132 to the dataflow graph 172 to generate a dataflow graph 174. In doing so, the optimizer 132 removes from the dataflow graph 154 components 134*a*, 134*c*, 134*f*, 134*e*, 134*h*, and 134*i*, as shown by the crossed out portions of the dataflow graph 174. The optimizer 132 determines to remove these components because these components are related to datasets that are not referenced or used by the rule specification 96*b*. Note that, although the dataset serving as the root node (e.g., dataset 103 or component 134*b* in this example) is not referenced in the specification 140, it is not optimized out. The final result of the optimization is the dataflow graph 98*b* (as originally shown in FIG. 5A) which is been optimized to remove all of the datasets that are not required to execute the rules specified by rule specification 96*b*, as well as other components (e.g., sorts, joins, etc.) instantiated to access those datasets. The dataflow graph 98*b* is different from the dataflow graphs 98*a* and 156 despite using the same logical data 94 source due to the different attributes relied on in the specifications of the respective graphs.

Figure 5J:
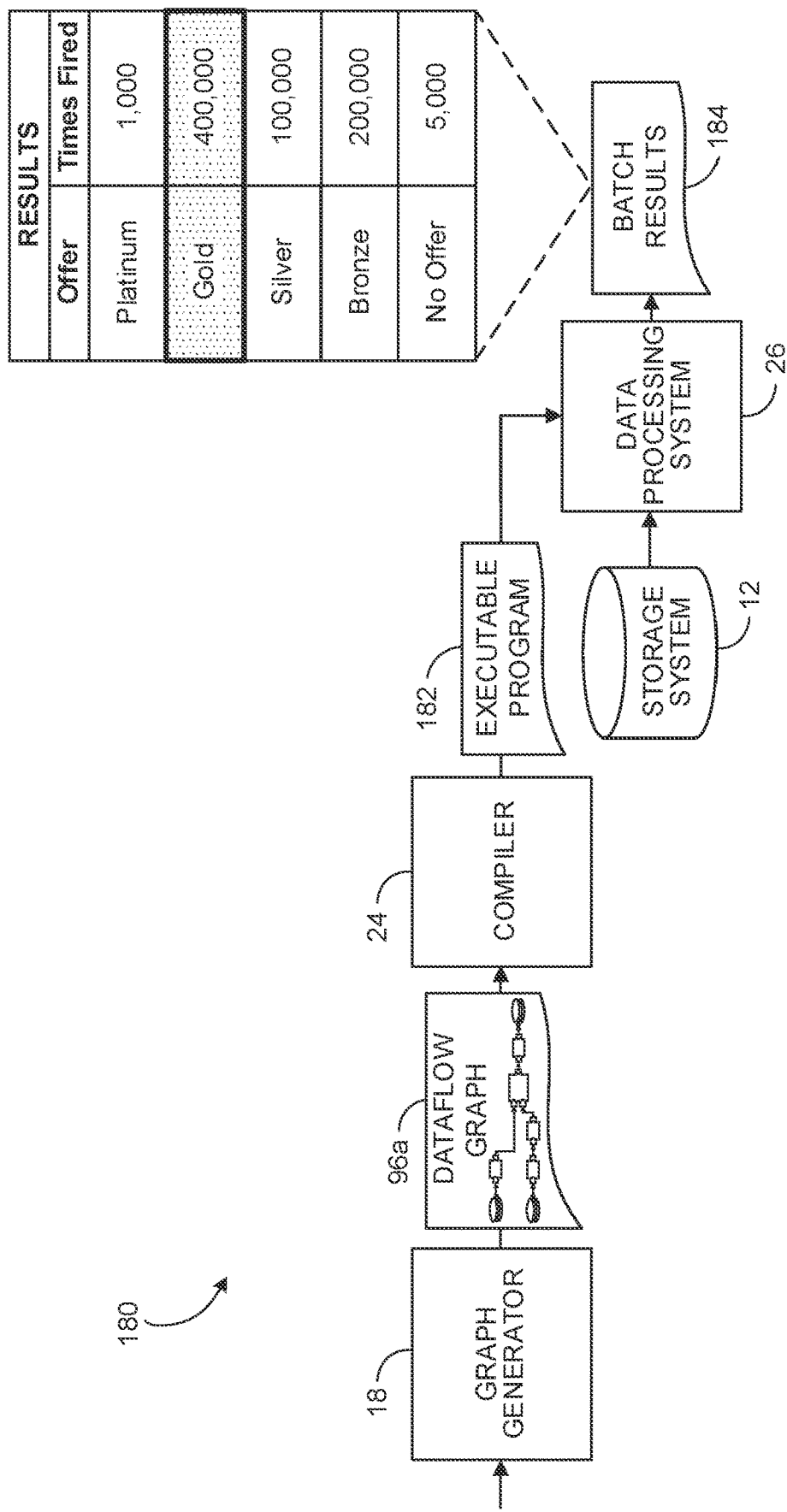

Referring to FIG. 5J, an environment 180 shows the results of execution of the dataflow graph 96*a*. The graph generation system 18 transmits the dataflow graph 96*a* to the compiler 24. The compiler 24 compiles the dataflow graph 96*a* into an executable program 182, as follows:

A dataflow graph expresses a computation as a plurality of vertices representing computational processes, each vertex having an associated access method, and a plurality of links, each connecting at least two vertices to each other and representing a flow of data between the connected vertices. The dataflow graph is executed by (1) accepting the dataflow graph into a computing system as user input; (2) preparing the dataflow graph for execution by performing, on the computing system, graph transformation steps until each vertex is in a runnable state, and each link is associated with at least one communication method compatible with the access methods of the vertices connected by the link; (3) launching each link by creating, by means of the computing system, a combination of communication channels and/or data stores, as appropriate to the link's communication method; and (4) launching each process by invoking execution of the process on the computing system.

Generally, a dataflow graph is prepared for execution as follows:

A driver program (or, simply, a "driver", for short) provides a means for depicting a dataflow graph, based on input from a user received through a user interface. One or more dataflow graph data structures representing a visual representation of the dataflow graph are generated by the driver. A driver accesses a dataflow graph initially depicted by a user and prepares that dataflow graph for execution by applying graph transformations. In performing these transformations, the dataflow graph data structures defining the initial dataflow graph are traversed, in known fashion, to fetch each vertex and any associated links. In some examples, five dataflow graph transformations are used on the fetched data structures to prepare the dataflow graph for execution, as described below.

While a dataflow graph is still not in executable form, the five dataflow graph transformations described below may be selected and applied in any order and as often as required (including not at all) until an executable dataflow graph is obtained. The five dataflow graph transformations include (1) inserting a file adapter, (2) inserting a communication adapter, (3) setting a file vertex's state to Complete, (4) setting a process vertex's state to Runnable or Unrunnable, and (5) setting a data link's communication method. Each of these transformations and the conditions under which each may be performed will now be described.

Inserting a File Adapter

In this transformation, the driver replaces a link with a file adapter (that is, with a link, a file vertex, and another link). That is, as each dataflow graph data structure representing a link is fetched or accessed during a traverse of the dataflow graph data structures, a new data structure may be created that modifies, expands on, or substitutes for the original data structure.

For a source (destination) file adapter, the file vertex's host is the same as the source (destination) vertex's host, and the file vertex's file is a new file located in the source (destination) vertex's working directory. This transformation may be performed if:

(1) the source is either a file vertex or a process vertex which is not in the Done state; and (2) the destination is either a file vertex in the Incomplete state or a process vertex which is not in the Done state.

Inserting a Communication Adapter

In this transformation, the driver replaces a link with a communication adapter (that is, with a link, a process vertex, and another link). The process vertex runs a copy program, which copies data from its input to its output, and which can read from/write to any of the communication channels or data stores supported by the underlying substrate. For a source (destination) communication adapter, the process vertex's host is the same as the source (destination) vertex's host, and the working directory is the same as the source (destination) vertex's working directory. The process vertex is created in the Enabled state. This transformation may be performed if:

(1) the source is either a process vertex in a state other than Done, or a file vertex; and (2) the destination is either a process vertex in a state other than Done, or a file vertex in the Incomplete state.

Setting a File Vertex's State to Complete

In this transformation, a file vertex's state is set to Complete. This transformation may be performed if the file vertex's state is Incomplete and all inputs to the file vertex are process vertices in the Done state.

Setting a Process Vertex's State to Runnable or Unrunnable

In this transformation, a process vertex's state is set either to Runnable or to Unrunnable. This transformation may be performed if the process vertex's state is Enabled.

Setting a Data Link's Communication Method

In this transformation, a communication method is set for a data link. This transformation may be performed if the data link's communication method is Unbound.

A dataflow graph that has the following three properties is executable:

(1) All process vertices are in one of the following states: Done, Runnable, Unrunnable, or Disabled.

(2) All data links satisfy all of the following criteria:

1) If either the source or destination of a data link is a Runnable process vertex, then the communication method for the data link must be bound to a particular communication method.

2) If the communication method of a data link is anything other than File, then both its source and destination must be process vertices, and if one process vertex is Runnable, then both process vertices must be Runnable.

3) If the communication method of a data link is File, then its source or destination must be a file vertex. If the destination is a Runnable process vertex, then the source must be a Complete file vertex. If the source is a Runnable file vertex, then the destination must be an Incomplete file vertex.

(3) All links bound to a communication method satisfy the constraints inherent in the communication method:

1) The communication method must be compatible with the access methods for its source and destination ports (this may be determined by consulting the program template). In the case of the extended substrate that has been described, all communication methods are compatible with SOC access; all but Shared Memory are compatible with File Descriptor access; NamedPipe and File are compatible with NamedPipe access; and only files are compatible with File access.

2) Some communication methods require that the nodes of the source and destination vertices be identical. For the extended substrate that has been described, this is true for all communication methods other than TCP/IP.

The dataflow graph transformations may be applied in any order (e.g., the dataflow graph data structures may be traversed repeatedly until all transformations are complete) until an executable graph is obtained. In some examples, dataflow graph transformations are applied in the following order: (1) insert file adapters; (2) replace file-to-file links; (3) identify Complete file vertices; (4) identify Unrunnable process vertices; (5) identify Runnable process vertices; (6) set the remaining Enabled vertices to Unrunnable; (7) insert more file adapters where conditions are met; (8) choose communication methods; and (9) insert communication adapters. The steps of this example will now be described in more detail:

(1) Insert File Adapters

To insert file adapters, the following steps are performed for all links in the dataflow graph. If the source port of a link has a data access method requiring the use of a file and the destination is not a file on the same node, then insert a source file adapter. If the destination port of a link has a data access method requiring the use of a file and the source is not a file on the same node, then insert a destination file adapter. If the destination of a link is a process vertex in the Disabled state and the source is a process vertex in the Enabled state, then insert a destination file adapter.

(2) Replace File-to-File Links

To replace file-to-file links, the following steps are performed for all links in the dataflow graph. If the source and the destination are both file vertices, then insert a source communication adapter. (If, in addition, the source and destination are on different nodes, then also insert a destination communication adapter; not shown).

(3) Identify Complete File Vertices

To identify Complete file vertices, the following steps are performed for all file vertices in the dataflow graph. If all upstream vertices are process vertices in the Done state, then set its state to Complete.

(4) Identify Unrunnable Process Vertices

To identify Unrunnable process vertices, the following steps are performed for all links in the dataflow graph. An "Unrunnability" test is performed as follows: if the source of a link is an Incomplete file vertex and its destination is a process vertex in the Enabled state, set the state of the process vertex to Unrunnable; if the source is a process vertex in any state other than Enabled, and the destination is a process vertex in the Enabled state, then mark the destination process vertex as Unrunnable. Repeat this testing until no more vertices may be marked as Unrunnable.

(5) Identify Runnable Process Vertices

To identify Runnable process vertices, the following steps are performed for all process vertices in the dataflow graph. A "Runnability" test is performed as follows: if a vertex is in the Enabled state, and all upstream vertices are either Complete file vertices or Runnable process vertices, then set the state of the vertex to Runnable. Repeat this testing until no more vertices may be marked as Runnable.

(6) Set the Remaining Enabled Vertices to Unrunnable

To set the remaining Enabled vertices to Unrunnable, the following steps are performed for all process vertices in the graph. If a vertex is in the Enabled state, then set its state to Unrunnable.

(7) Insert More File Adapters

To insert more file adapters, the following steps are performed for all links in the dataflow graph. If the source of a link is a Runnable process vertex and the destination is an Unrunnable process vertex, then insert a source file adapter.

(8) Choose Communication Methods

To choose communication methods, the following steps are performed for all links in the dataflow graph. This step only applies to links which are attached, at either end, to a runnable process, and which are not bound to a communication method. If a link's source (destination) is a file vertex, and its destination (source) is a process vertex on the same node, then set the link's communication method to File. Otherwise, choose one of the available communication methods, such that all of the constraints of that method are satisfied. For speed, communication methods may be considered in the order Shared Memory, NamedPipe, and TCP/IP. In some examples, the first method that satisfies the constraints set forth above is selected. In the reference substrate, the following rules may be used: First, if a link is attached to a port which accepts SOC connections, then the link will use Shared Memory if the source and destination are on the same node, or TCP/IP if they are on different nodes. Otherwise, if the source and destination are on the same node, a NamedPipe method will be used. In all other cases, no single communication method suffices, and the system will restore to a communication adapter (below).

(9) Insert Communication Adapters

If no single communication method is selected in the preceding step of choosing a communication method and all have been tried, continue by inserting a source communication adapter and trying to choose communication methods for the two links of the adapter. If this fails, try replacing the newly inserted source communication adapter with a destination communication adapter. If this fails, insert both a source and a destination communication adapter, and choose communication methods for three links in the resulting double adapter. In the reference substrate, communication adapters are only required if the source and the destination are on different nodes, and the link is connected to either a file vertex or a process vertex not accepting the SOC connection method. In this case, adapters may be chosen as follows:

If the source is a file vertex, then insert a source communication adapter. The two links in the source communication adapter will use, in turn, the File and the TCP/IP communication methods.

If the source is a port not accepting the SOC communication method, then insert a source communication adapter. The two links in the source communication adapter will use, in turn, the TCP/IP and File communication methods.

If the destination is a file vertex, then insert a destination communication adapter.

The two links in the adapter will use, in turn, the TCP/IP and File communication methods.

If the destination is a port not accepting the SOC communication method, then insert a destination communication adapter. The two links in the adapter will use, in turn, the TCP/IP and NamedPipe communication methods.

Phase C: Launching Data Links

Data links are created in the Unlaunched state and must be launched. To launch links, links are scanned to find links that are Unlaunched, bound to communication methods, and have Runnable sources or destinations. For all such links, identifiers are generated that may be used by the various communication methods. For the extended substrate described above, identifiers are created as follows: All links have two identifiers: the stream object identifier and the communication channel/file identifier. The stream object identifier is used by the SOC mechanism, and is identical to the name of the link. The channel/file identifier is used to identify the file, named pipe, shared memory region, or TCP/IP connection employed by the link. Additionally, in cases where the process vertex requires the NamedPipe or File communication methods, the channel/file identifier will be made available so that the process vertex, when launched, will be able to attach to the channel/file using the UNIX file system.

After the identifiers are generated, the substrate is called to create a channel or stream object. If the communication method is NamedPipe, the substrate is also called to create the named pipe.

Once the executable program 182 is generated, the compiler 24 transmits executable program 182 to the data processing system 26. The data processing system 26 receives records from the storage system 12 and executes the executable program 136 in a batch mode to produce, for example, batch results 184. The batch results 184 show the number of times that a particular rule case "fired" (e.g., how many times the rule was triggered by the processed data records). In this example, the "Gold" offer triggered an inordinate amount of times relative to the other rules. Accordingly, a user may want to test the rules he or she created in order to determine whether changes can be made to, for example, decrease the number of time the gold offer is triggered.

Figure 5K:
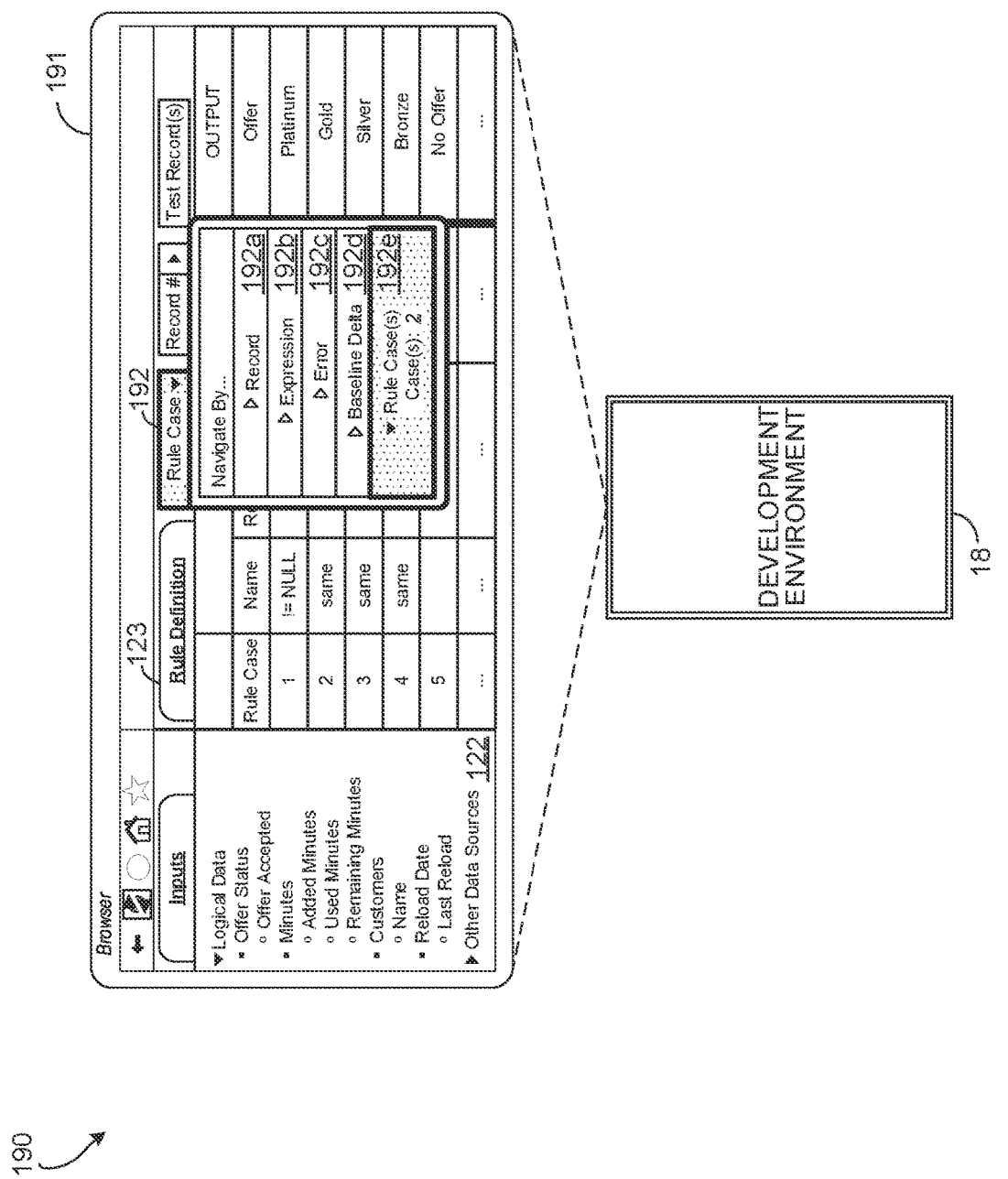
Figure 5L:
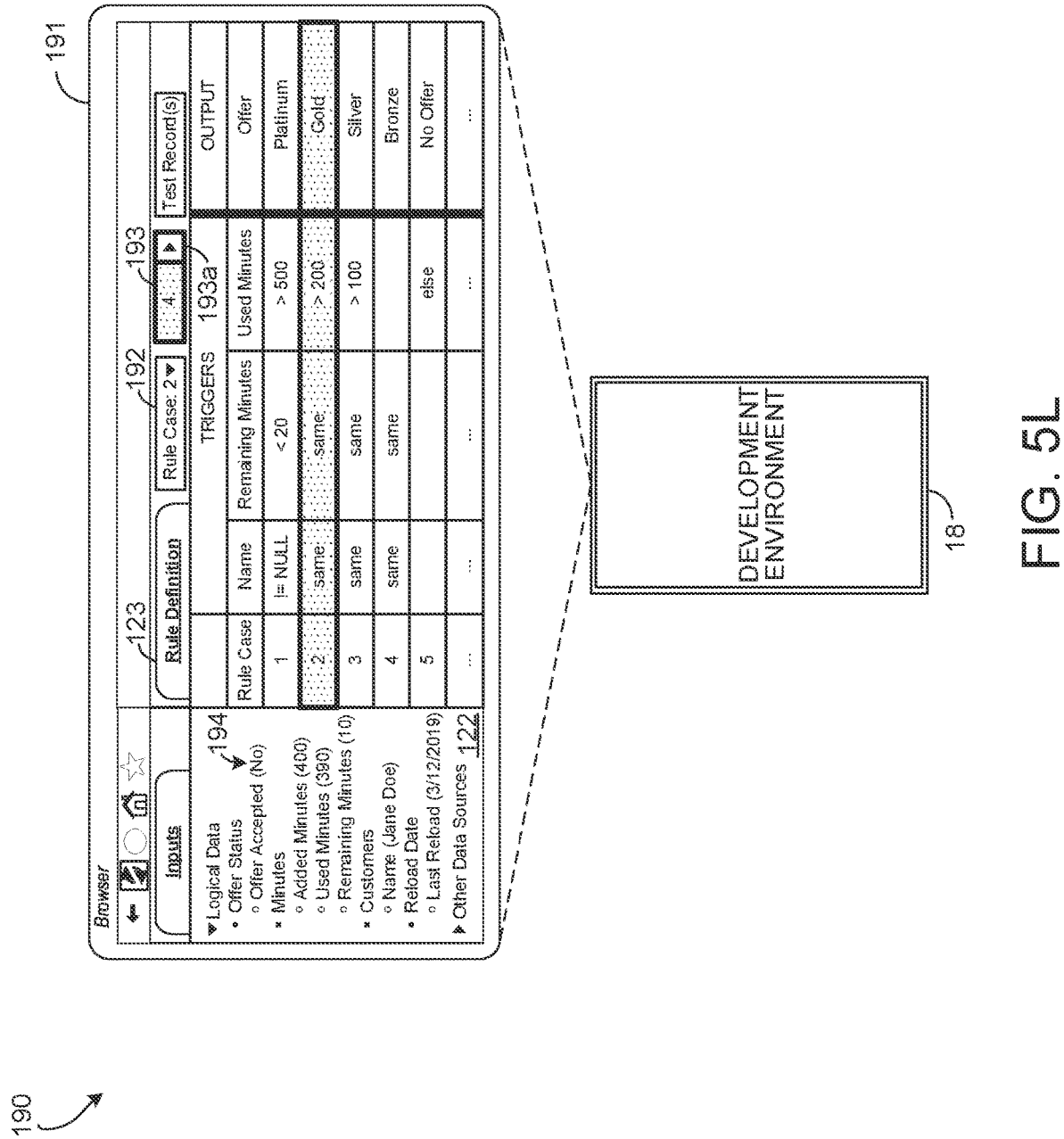
Figure 5M:
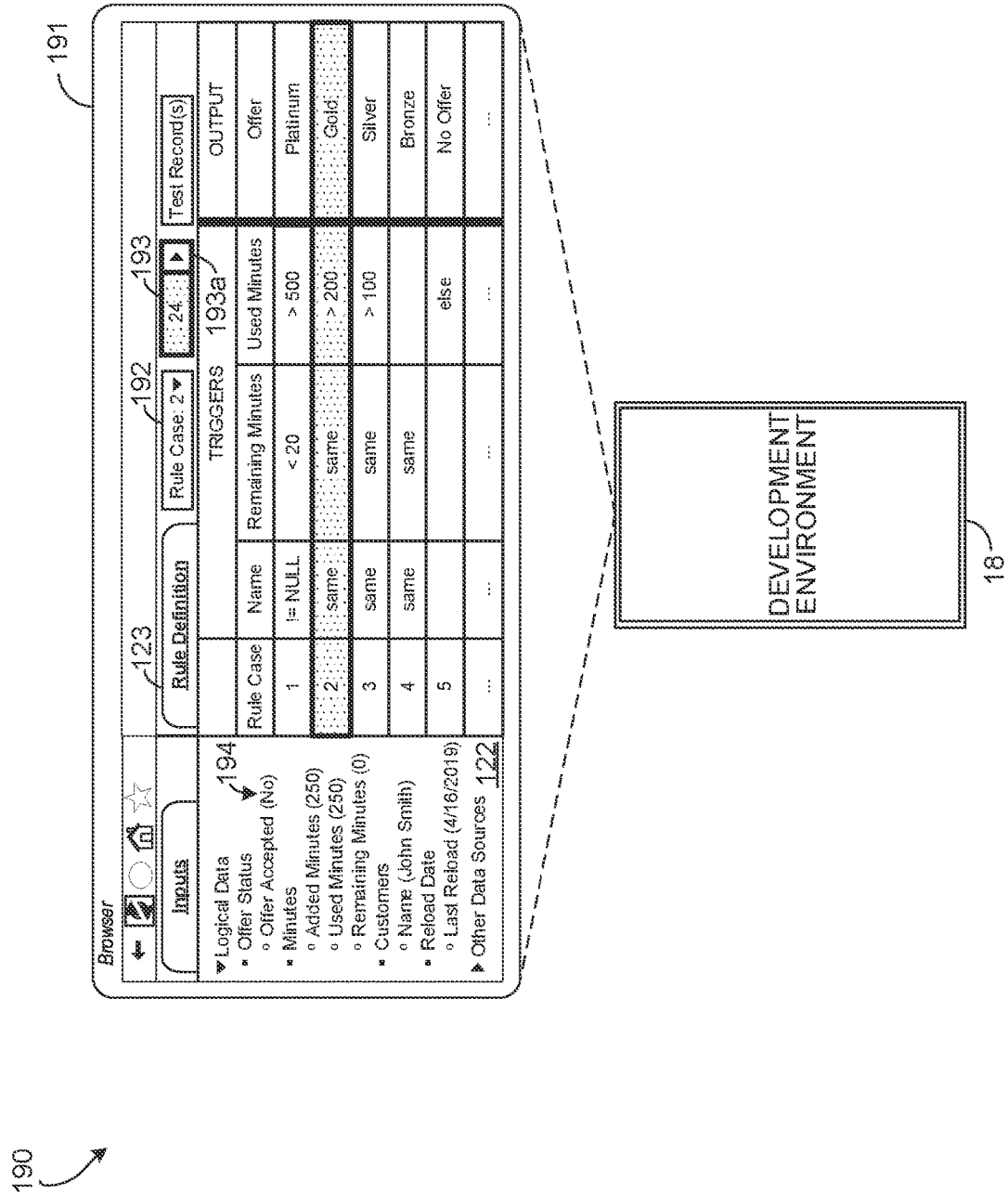

Referring to FIG. 5K, an environment 190 shows an example of a business rules editor and testing interface 191 generated by the development environment 18 for defining and testing business rules and other logical rules. In this example, the interface 191 allows for a variety of testing categories 192, including testing by record 192*a*, testing by expression 192*b*, testing by error 192*c*, testing by baseline delta 192*d*, and testing by rule case 192*e*. In this example, a user of the development environment 18 has selected to test by rule case 192*e* and has specified case 2 (corresponding the golf offer). From here, the user can step through records 193 that triggered the specified rule case (i.e., rule case 2) by interacting with a button 193*a* as shown in FIG. 5L. In this example, record 4 has triggered rule case 2, as indicated by the bold outline with shaded fill in the rule definition portion 123 of the interface 191. Because the dataflow graph has been executed (and thus the physical data has been accessed), the fields shown in the input portion 122 are populated with the data values 194 for the current record (record 4 in FIG. 5L). As can be seen from these values, record 4 is well within the defined rules for triggering case 2. Interacting with the button 193*a* steps forward to the next record that triggered case 2, as shown in FIG. 5M. It can be seen from the data values 194 that record 24 is significantly closer to the 'Used Minutes' threshold for rule case 2.

Figure 5N:
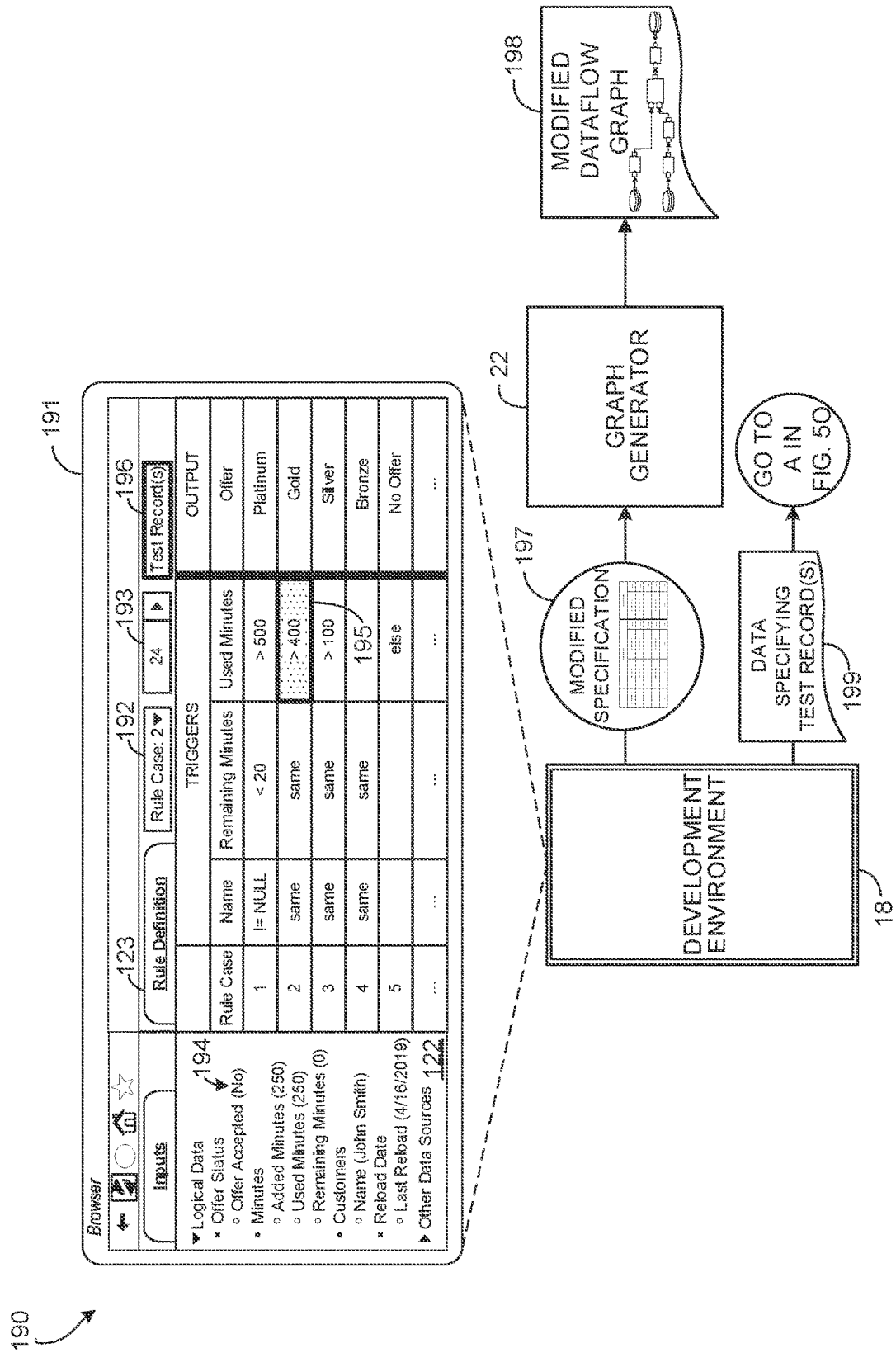
Figure 50:
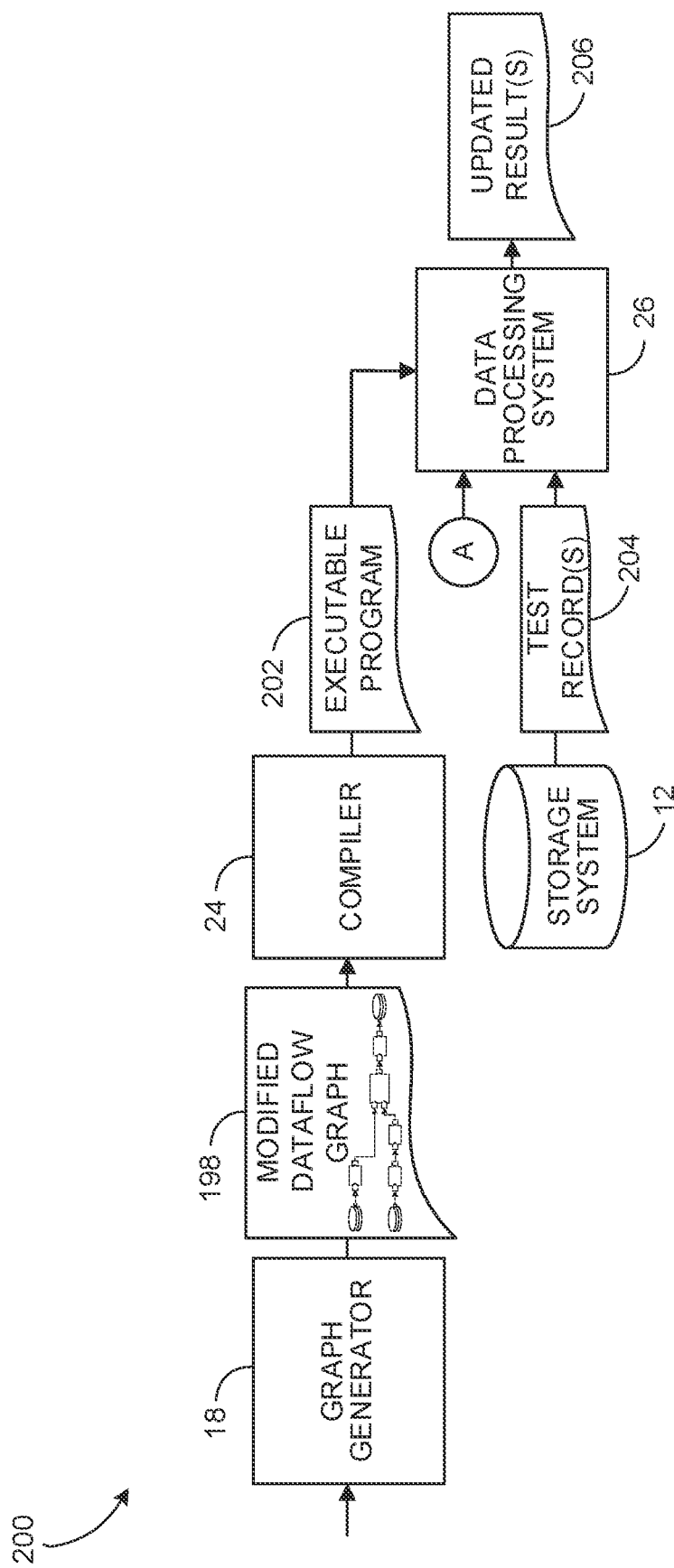

Accordingly, to reduce the number of gold offers, the user may increase the 'Used Minutes' threshold as shown in FIG. 5N. In this example, the user has changed the trigger value for 'Used Minutes' in rule case 2 to '>400', as shown in bolded and shaded cell 195. Before executing another batch test to see the overall results of the change, the user may wish test the rule change on an individual or small number of records to ensure the rule is working as expected. To do so, the user can input the record(s) to be tested into window 193 and interact with the 'Test Record(s)' button 196. In this example, the user has selected to test record 24. In response to selection of the 'Test Record(s)' button 196, the development environment 18 generates a modified specification 197 and transmits the specification 197 to the graph generator 22. The development environment 18 can transmit the entire specification 197 or just the modified portion. Using the modified specification 197 and the logical data (not shown), the graph generator 22 produced a modified dataflow graph 198. The dataflow graph 198 is sent to the compiler for compilation and subsequent execution. The development environment 18 also transmits data 199 specifying the records to be tested to the data processing system 26 for execution.

Figure 5P:
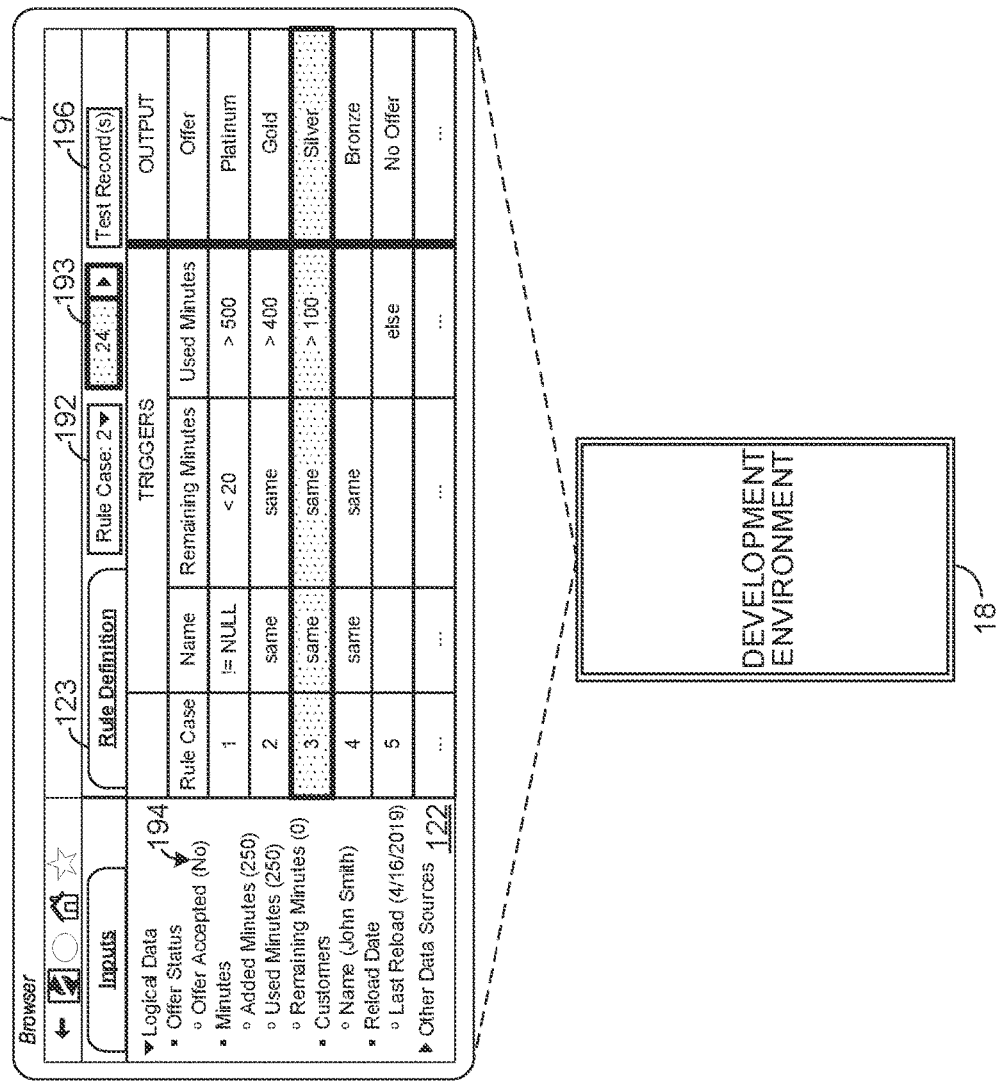

Referring to FIG. 5O, an environment 200 shows the execution of the dataflow graph 198 on the specified test records 204. In this example, the compiler 24 receives the dataflow graph 198 and compiles it to produce an executable program 202, which is transmitted to the data processing system 26. The data processing system 26 receives the data 199 specifying the records to be tested and retrieves the specified test records 204 (e.g., record 24 in this example) from the storage system 12. The data processing system 26 then executes the executable program 202 using the test records 204 to produce updated results 206, that is, the results of processing the specified records with the updated executable dataflow graph. These results are presented to the user who executed the test in the interface 191, as shown in FIG. 5P. As can be seen in FIG. 5P, record 24 now triggers case 3 (representing a silver offer) rather than case 2 (representing a gold offer) under the modified rules.

Figure 5Q:
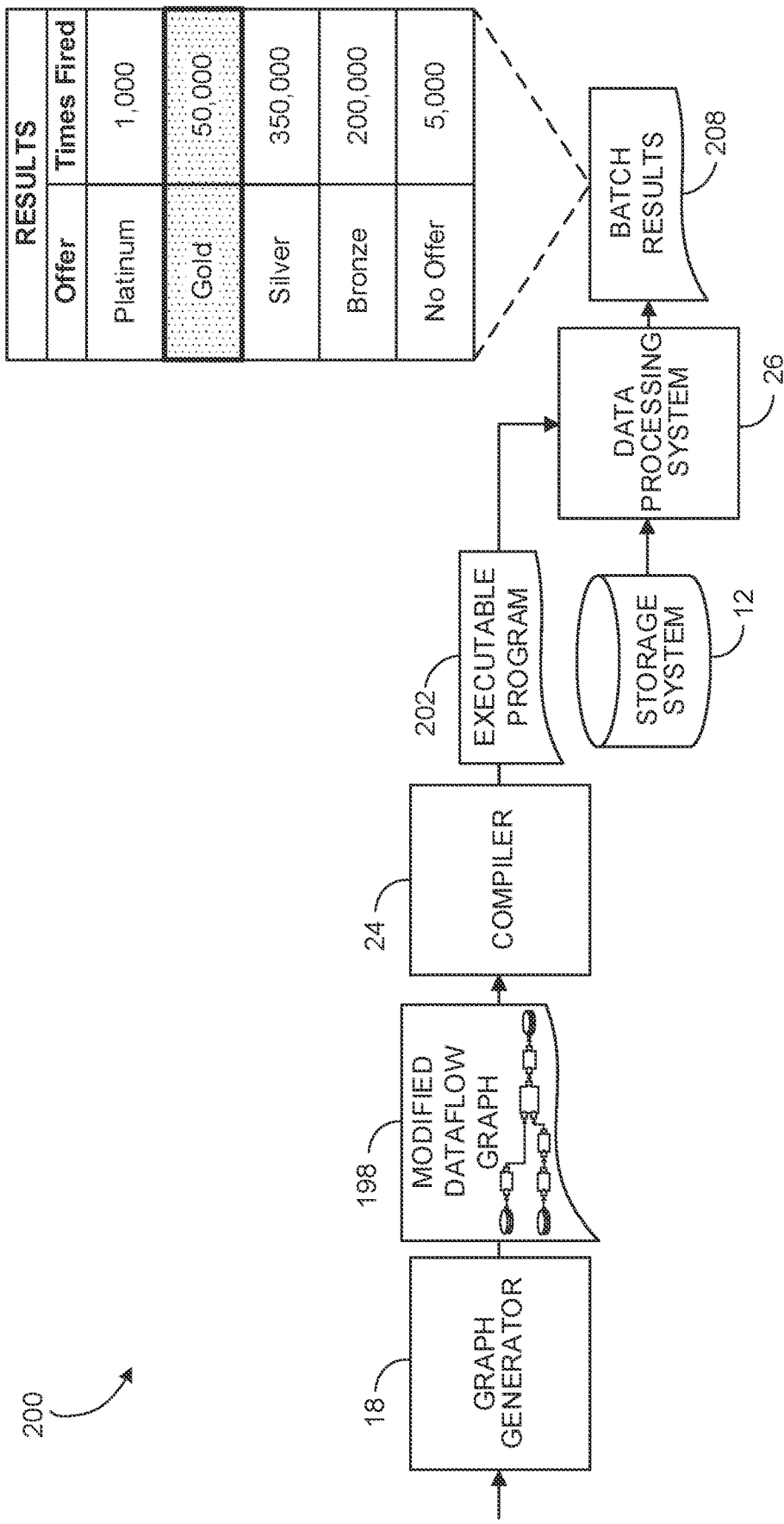

Having confirmed that the modified rule cases and dataflow graph are working as intended, a batch test can be executed as shown in FIG. 5Q. To do so, the data processing system 26 receives records from the storage system 12 and executes the executable program 202 in a batch mode to produce batch results 208. The batch results 208 show that the number of gold offers has significantly reduced relative to the batch results 184 before modification shown in FIG. 5J.

Figure 6A:
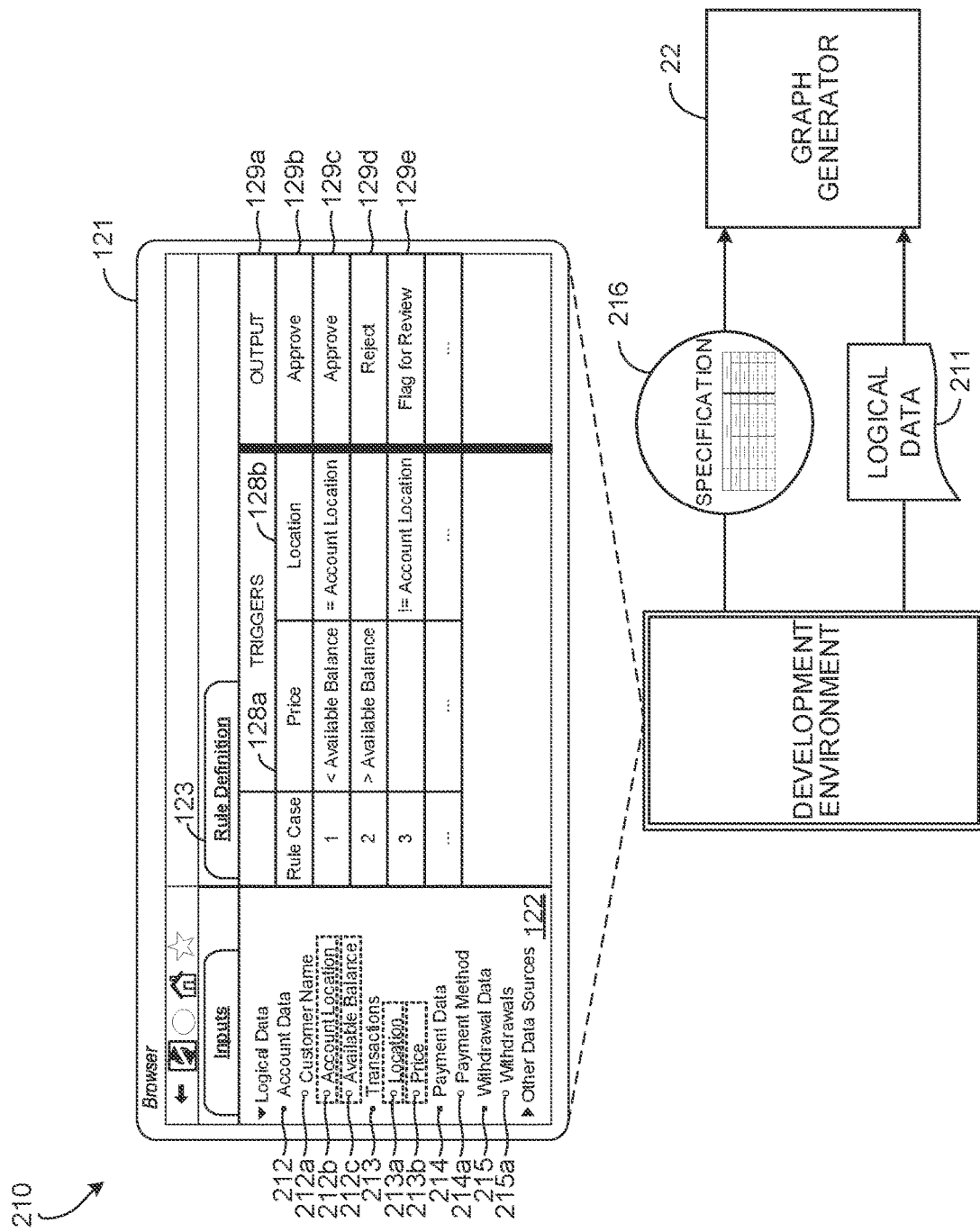
FIG. 6A is a block diagram of a development environment.

Referring to FIG. 6A, an environment 210 shows another example of a business rules editor interface 121 generated by the development environment 18 for defining business rules and other logical rules. In this example, the logical data 211 includes an 'Account Data' dataset as a root node, which is related to various other datasets including a 'Transactions' dataset, a 'Payment Data' dataset, and a 'Withdrawal Data' dataset. Each of these datasets and their respective fields are visualized in the input portion 122 of the interfaces 121. In particular, the input portion 122 includes visual representations 212, 212a, 212b, and 212c of 'Account Data' and its fields, visual representations 213, 213a, and 213b of 'Transactions' and its fields, visual representations 214 and 214a of 'Payment Data' and its field, and visual representations 215 and 215a of 'Withdrawal Data' and its field.

The rule definition portion 123 includes a series of inputs and rule cases. In this example, the 'Price' and 'Location' fields are used as inputs in defining the rules, as shown in cells 128a and 128b, respectively. The 'Account Location' and 'Account Balance' fields are used as part of an expression in defining the rule cases specified in the rule definition portion 120. If a rule case applies, an output is generated based on an output column 129a. As shown in this column, the output for each of the rule cases 129c, 129d, 129e relate to approving, rejection, or flagging certain transactions for review based on specified triggering criteria. Upon completion of defining a rule by specifying inputs for the cells in the rule definition portion 123, the development environment 18 generates a rule specification 216 that specifies the rule cases and which fields will need to be accessed to implement a rule. The development environment 18 transmits the rule specification 216 to the graph generator 22. The development environment 18 also transmits the logical data 211 to the graph generator 22.

Figure 6B:
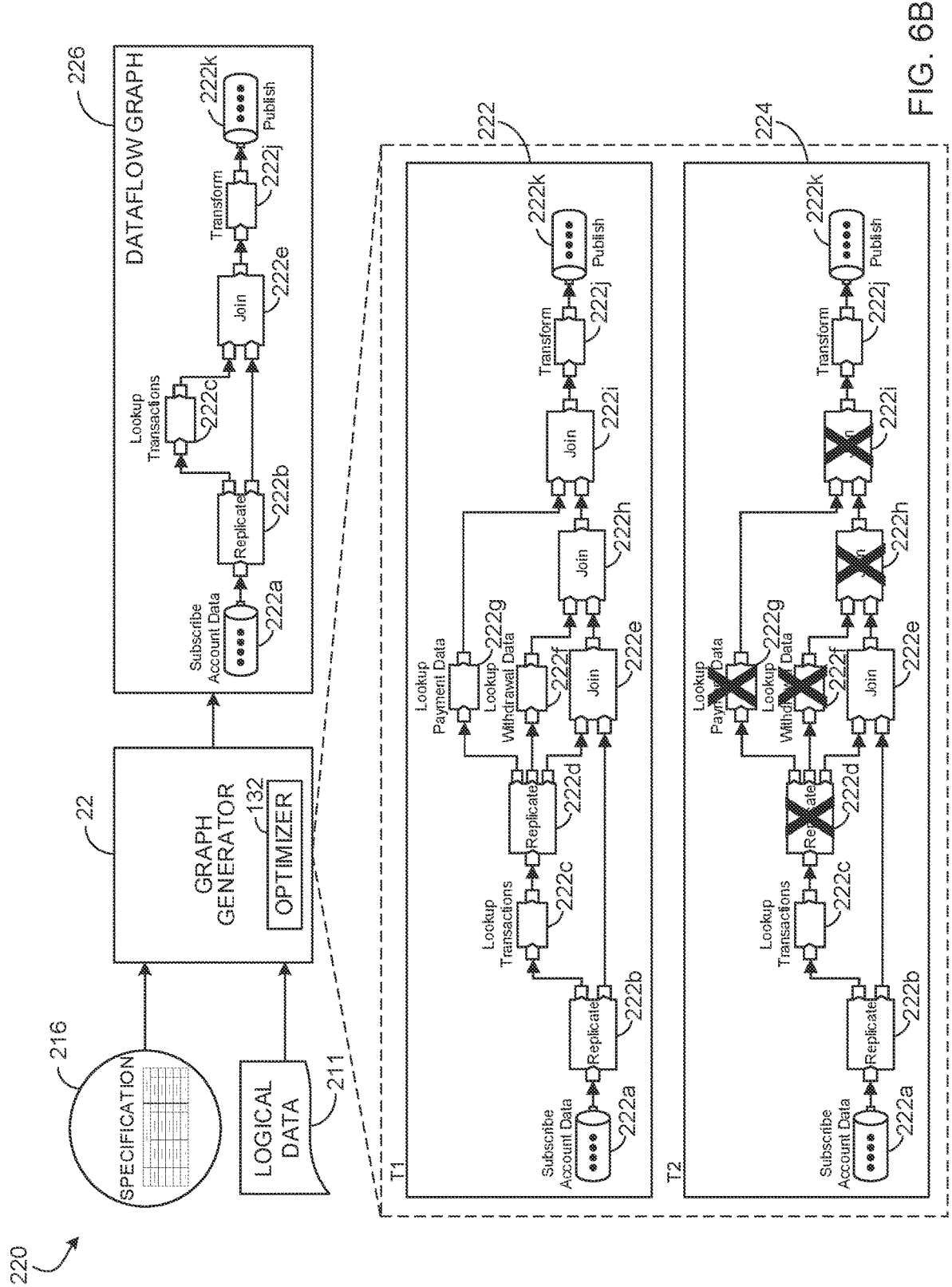
FIG. 6B is a block diagram of a system for generating a computer program.

Referring to FIG. 6B, an environment 220 shows an example of generating and optimizing a dataflow graph configured for continuous operation from the rule specification 216 and the logical data 211. The graph generator 22 receives the rule specification 216 and the logical data 211. Similar to the batch or non-continuous setting, the graph generator 22 initially generates the dataflow graph 222 configured to access the datasets and fields included in the logical data 211 as data sources based on, for example, the instructions, parameters, or other information for accessing the datasets specified in the logical data 211. However, the components of the dataflow graph 222 and the manner in which data is accessed and processed is different in the continuous setting. In this example, a subscribe component 222a is used to subscribe to a flow of data from 'Account Data,' the root node. Each incoming flow unit (or a portion thereof) from the root node is then replicated through a replicate component 222b for use in subsequent lookup of related records as defined in the logical data 211 using, for example, a lookup component 222c.

After generating an initial dataflow graph 222, the graph generator 22 applies the optimizer 132 to the dataflow graph 222 to generate a dataflow graph 224. The optimizer 132 removes from the dataflow graph 222 components 222d, 222f, 222g, 222h, and 222i, as shown by the crossed out portions of the dataflow graph 224. The optimizer 132 determines to remove these components because these components are related to datasets that are not referenced or used by the rule specification 216. That is, the rule specification 216 does not include references to any fields included in the removed datasets. The final result of the optimization is the dataflow graph 226 which is been optimized to remove all of the datasets that are not required to execute the rules specified by rule specification 96a, as well as other components (e.g., sorts, joins, etc.) instantiated to access those datasets. Thus, the logical data described here is effective in providing logical access without physical cost and facilitating optimization regardless of whether the input data is continuous, semi-continuous, or non-continuous.

Figure 6C:
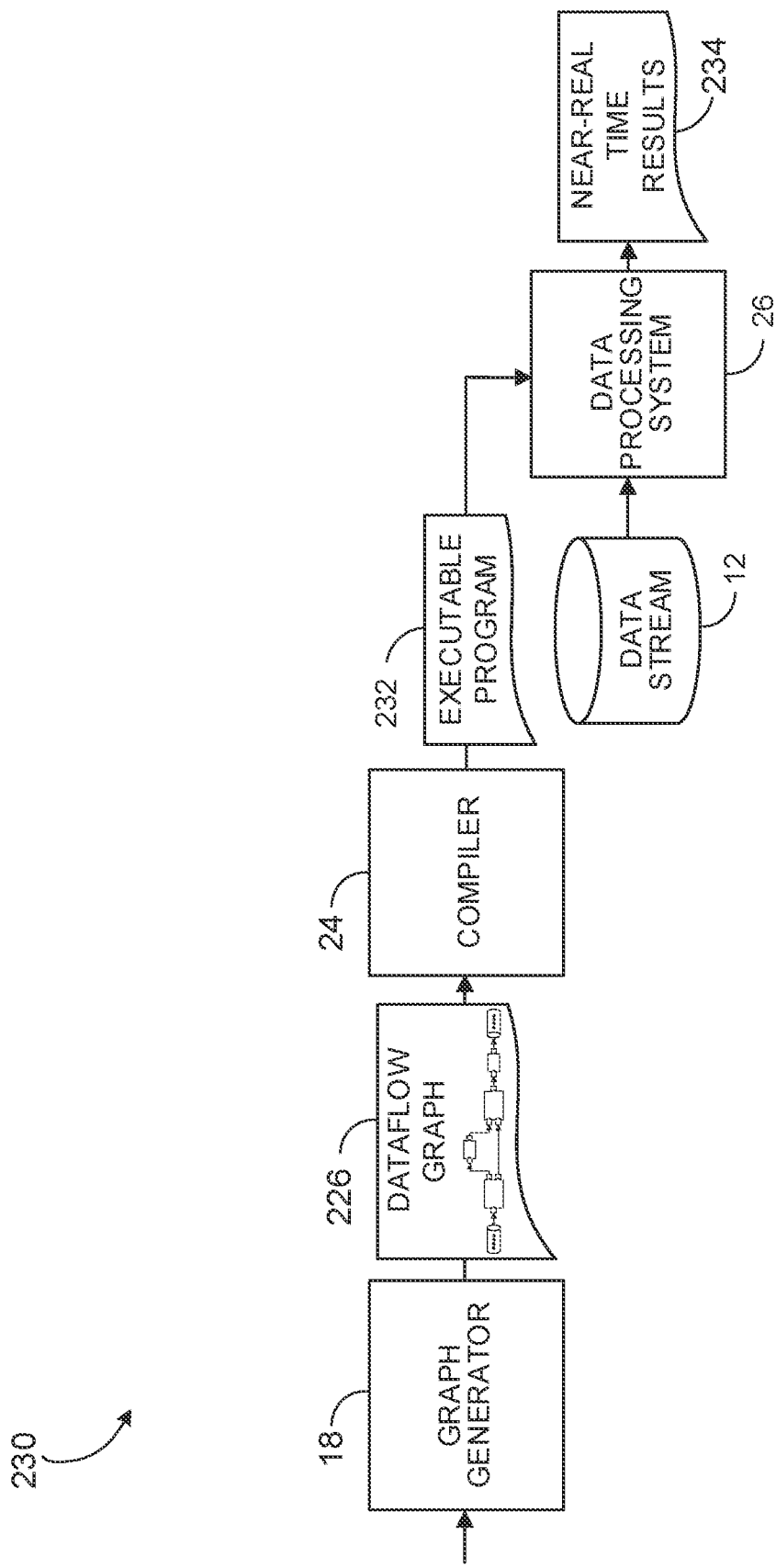
FIG. 6C is a block diagram of a system for executing a computer program.

Referring to FIG. 6C, an environment 230 shows the results of execution of the continuous dataflow graph 226. The graph generation system 18 transmits the dataflow graph 226 to the compiler 24, which compiles the dataflow graph 96a into an executable program 232 (e.g., executable dataflow graph). The compiler 23 transmits the executable program 232 to the data processing system 26. The data processing system 26 receives a data stream 12 (e.g., continuous data) and executes the executable program 232 to process the data stream and produce real-time or near-real time results 234.

Figure 7A:
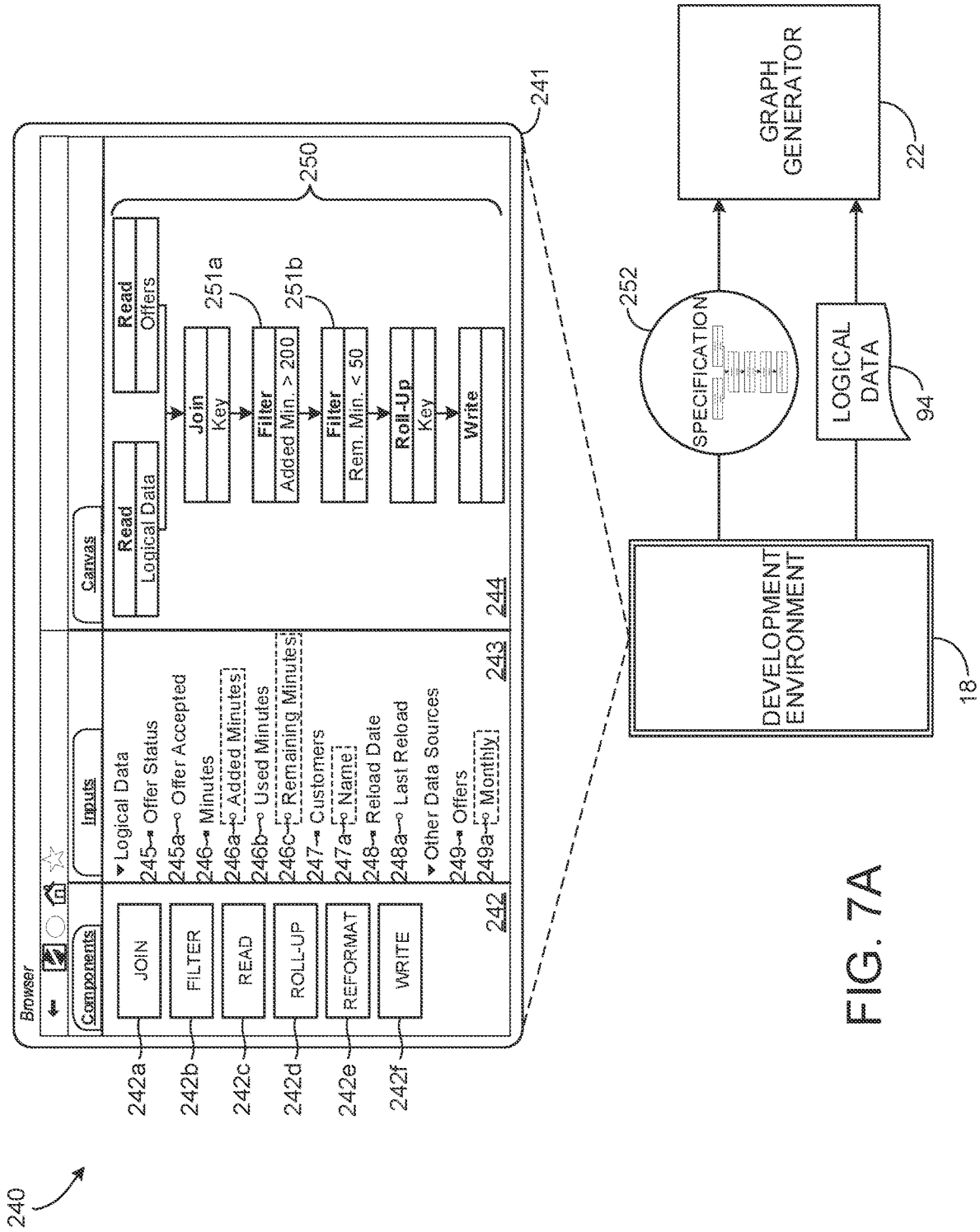
FIG. 7A is a block diagram of a development environment.

Referring to FIG. 7A, an environment 240 shows another real-world example of the development environment 18 generating a specification 252. In this example, the development environment 18 renders a graphical user interface 241 with a components portion 242, inputs portion 243, and a canvas portion 244. The components portion 242 includes visual representations 242a through 242f that represent various operations that are available for defining computational logic. The inputs portion 243 displays visual representations 245, 245a, 246, 246a, 246b, 246c, 247, 247a, 248, 248a, of datasets and fields represented in the logical data 94. The inputs portion 243 also displays visual representations 249 and 249a of datasets and fields represented in other data sources. That is, the visual representations in the inputs portion 243 represent those datasets and fields that are available for defining computational logic.

The canvas portion 244 is used for defining computation logic in the form of a dataflow graph, visually depicted as visualization 250 (and hereinafter referred to as "dataflow graph 250," for purposes of convenience and without limitation). The dataflow graph represented by the visualization 250 includes a data structure with nodes. Each of the nodes include at least one operation placeholder field and at least one data placeholder field which are populated with the operations and data specified by the user in the canvas portion 244. In this example, the dataflow graph 250 is generated by dragging and dropping one or more of the visual representations 242a through 242f from the components portion 242 onto the canvas portion 244. Each of the visual representations 242a-242f represent an operation to be performed by or on a data structure. Once the visual representations are placed on the canvas portion 244 they become icons on the canvas portion 244. Some of these icons, such as icon 251a, specify an operation (e.g., a filter operation) to perform with regard to a particular dataset or field. In this example, the icon 251a specifies a filter operation is performed on the 'Added Minutes' field represented by the visual representation 246a in the inputs portion 243. An icon 251b specifies that a filter operation is performed on the 'Remaining Minutes' field represented by the visual representation 246c in the logical data portion 243. The development environment 18 uses the computational logic visually represented by the dataflow graph 250 to generate the specification 252. The specification 252 specifies the computational logic visually depicted in the canvas portion 244. The development environment 18 transmits the specification 252 and the logical data 94 to the graph generator 22. The graph generator 22 can use the specification 252 and the logical data 94 to populate the operation and data placeholder fields for each node of the dataflow graph 250.

Figure 7B:
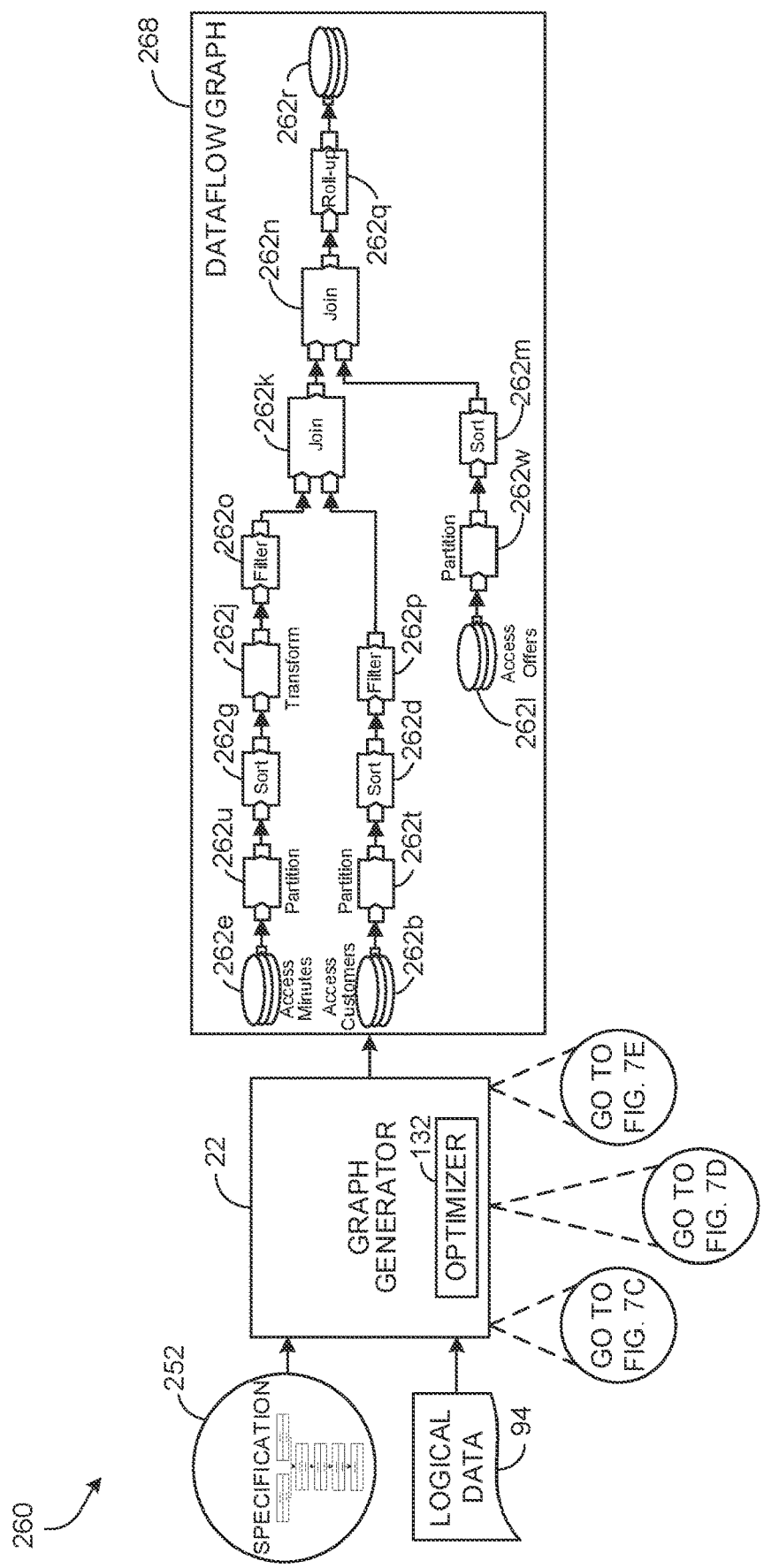
FIGS. 7B to 7E are block diagrams of a system for generating a computer program.
Figure 7C:
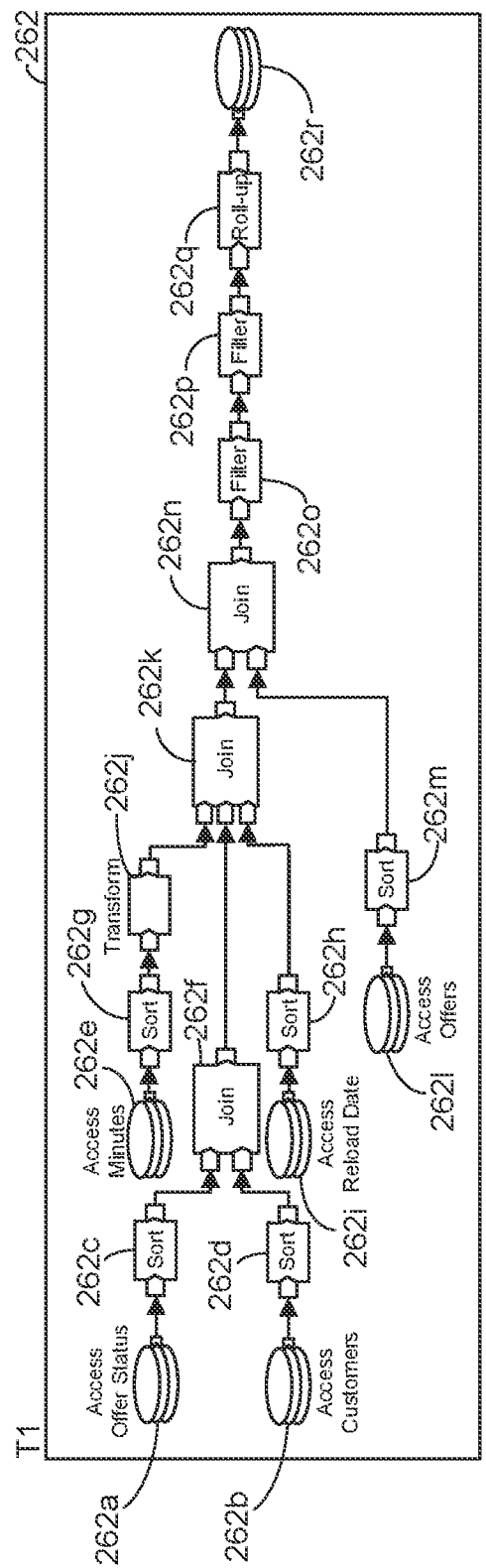

Referring to FIG. 7B, an environment 260 illustrates an example of the graph generator 22 generating an optimized dataflow graph, a visualization of which is shown by visualization 268 (referred to herein as "dataflow graph 268," for purposes of convenience and without limitation). The graph generator 22 receives the specification 252 and the logical data 94. Using the specification 252 and the logical data 94, the graph generator 22 generates a dataflow graph 262 that includes components 262a through 262r, as shown in FIG. 7C. In particular, the graph generator 22 generates the dataflow graph 262 from the specification 252 and the logical data 94 by populating the operation and data placeholder fields for each node of the dataflow graph 252 and using the previously described techniques. Unlike, for example, the dataflow graph 98a in which the specified computational logic is implemented by a transforms component 134l, the dataflow graph 262 includes separate components 262o, 262p, 262q based on the computational logic specified in the specification 252. The dataflow graph 262 represents the datasets that are represented in the logical data 94 and joined with the separate 'Offers' dataset 249 and its 'Monthly' field 249a, and also represents additional built-in functionality that is needed to generate a dataflow graph (e.g., sorts, partitions, etc.).

Figure 7D:
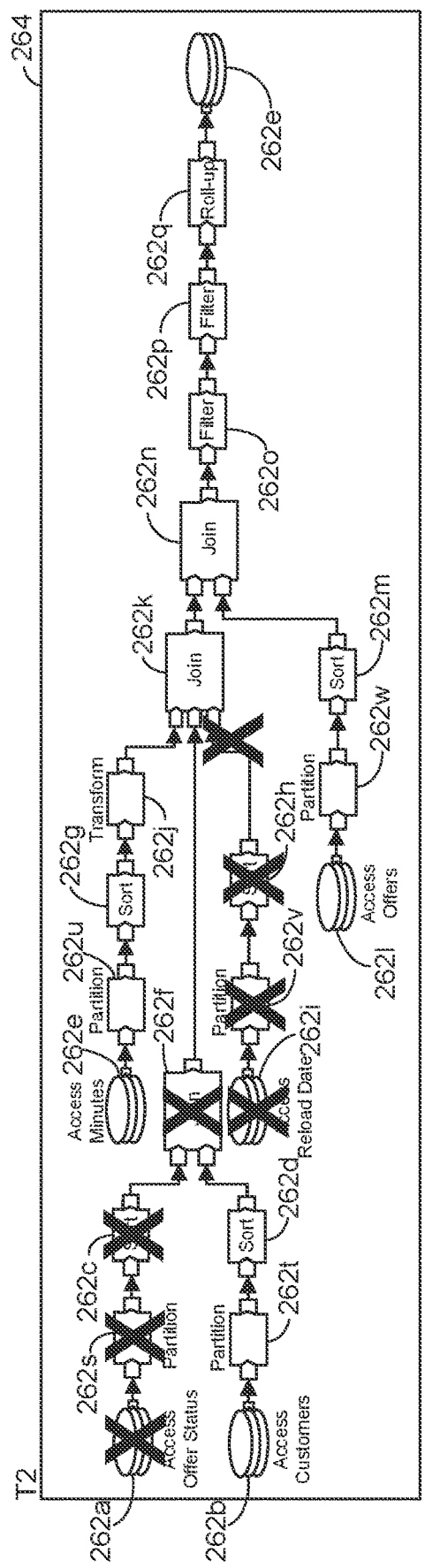

In this example, the graph generator 22 applies the optimizer 132 to the dataflow graph 262 shown in FIG. 7C to produce the optimized dataflow graph 268. Various intermediary stages of optimization shown in FIGS. 7D and 7E. The optimizer 132 analyzes the specification 252 or the logical data 94, or both, to identify those fields that are used in specification 252 and, in turn, to identify those datasets that include those fields. The optimizer 132 removes from the dataflow graph 262 those datasets that are not used or referenced by the specification 252. The optimizer 132 can also be responsible for adding partition components to the graph when necessary. In some examples, the optimizer 132 does this by minimizing select statements such that only those datasets and fields specified in the rule specification 252 and included in the logical data 94 are accessed. As shown in FIG. 7D, the optimizer 132 removes components 262a, 262s, 262c, 262f, 262i, 262v, and 262h from the dataflow graph 262 (thereby producing a dataflow graph 264 at time T2). This is because the component 262a represents the dataset 'Offer Status,' and its field 'Offer Accepted' is not referenced or used by the specification 252. Similarly, component 262c represents the dataset 'Reload Date,' and its field 'Last Reload' is not referenced or used by the specification. Removal of these input sources (i.e., those represented by components 262a and 262i) renders the remaining components unnecessary (sometimes referred to as "dead components"), and therefore these components (i.e., 262s, 262c, 262v, 262h) can be removed as well.

Figure 7E:
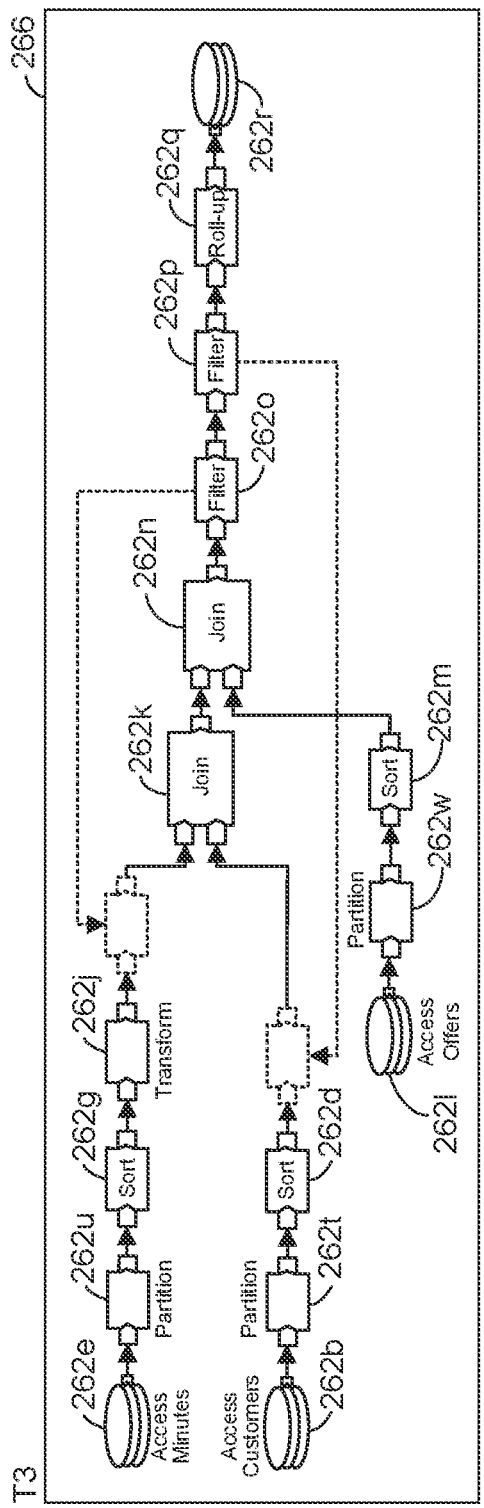

The optimizer 132 also performs a further optimization of moving the filter components 262o and 262p before the join operation specified by component 262k, thereby producing dataflow graph 266 at time T3 as shown in FIG. 7E. By doing so, the optimizer 122 produces a dataflow graph that is faster, more efficient and uses fewer computational resources because the filter operation is performed before the join operation which reduces the amount of data that needs to be joined. When the filter operation is performed after the join operation, then more compositional resources are used because the system has to join together data which is ultimately filtered out. The results of the optimization is a dataflow graph 268.

In general, the optimizer 132 performs optimizations or other transforms that may be required for processing data in accordance with one or more of the operations specified in the dataflow graph, or to improve processing data in accordance with one or more of the operations specified in the dataflow graph, relative to processing data without the optimizations or transforms, or both. For example, the optimizer adds one or more sort operations, data type operations, join operations, including join operations based on a key specified in the dataflow graph, partition operations, automatic parallelism operations, or operations to specify metadata, among others, to produce a transformed dataflow graph 268 having the desired functionality of the dataflow graph 262. In some implementations, the transformed dataflow graph 268s is (or is transformed into) an optimized dataflow graph by applying one or more dataflow graph optimization rules to the transformed dataflow graph to improve the computational efficiency of the transformed dataflow graph, relative to a computational efficiency of the transformed dataflow graph prior to applying the optimizations. The dataflow graph optimization rules can include, for example, dead or redundant component elimination, early filtering, or record narrowing, among others, as described in U.S. Patent Application No. 62/966,768, titled "Editor for Generating Computational Graphs," the entire content of which is incorporated herein by reference.

The techniques described herein use information about relationships among datasets to improve the productivity of a user (e.g., a business user) using the development environment and to enable optimized data processing. Although a user (e.g., a technical user) may initially need to define logical data to publish to the development environment (e.g., by selecting a dataset to use as a root node or defining virtual fields), a business user is then empowered to flexibly develop their own computational logic from the published logical data, and, based on that logic, a wide variety of dataflow graphs can be generated to execute the logic in an optimized manner.

The techniques described herein empower a user to quickly and powerfully go from a complex set of datasets stored in a storage system to publishing logical data to a development environment. In some examples, the technical user selects the set of datasets that they are interested in working from, and a schema definition among all of these datasets is discovered or otherwise obtained. For example, a schema can be exported from those datasets that are in a database, discovered using data discovery, semantic discovery, or other machine learning, or by receiving additional input from the technical user, or combinations of them, among others. In some examples, the technical user can generate additional calculated or virtual fields in the schema, such as aggregations from among other data elements. In some examples, the technical user is able to select the root node or perspective of the logical data.

The business user operating in the development environment can then use any of the attributes included in the logical data (which might correspond to actual physical data elements or the logical data elements that the technical user had defined) to develop computational logic applicable to their business needs. In some examples, the business user is able to see outputs and test the logic (e.g., rules) they have written in the development environment.

Once the business user is satisfied with the computational logic they have developed (and optionally tested), an optimized dataflow graph can be generated by the graph generator that processes just the datasets that are needed for that dataflow graph. For example, the business user may have access when developing the computational logic to numerous datasets that turned out to be unnecessary. Because the graph generator and optimizer have detailed information about the datasets from the logical data, the dataflow graph it generates can be dramatically optimized.

Once the optimized dataflow graph has been generated, it can be executed by, for example, a data processing system. In some examples, the dataflow graph can be executed in two different modes: batch or real-time. In some examples, if the business user were interested in a different set of rules relying on a different set of data, the business user could generate the desired dataflow graph and that dataflow graph could be optimized as well, without any need for the technical user to be involved.

Figure 8:
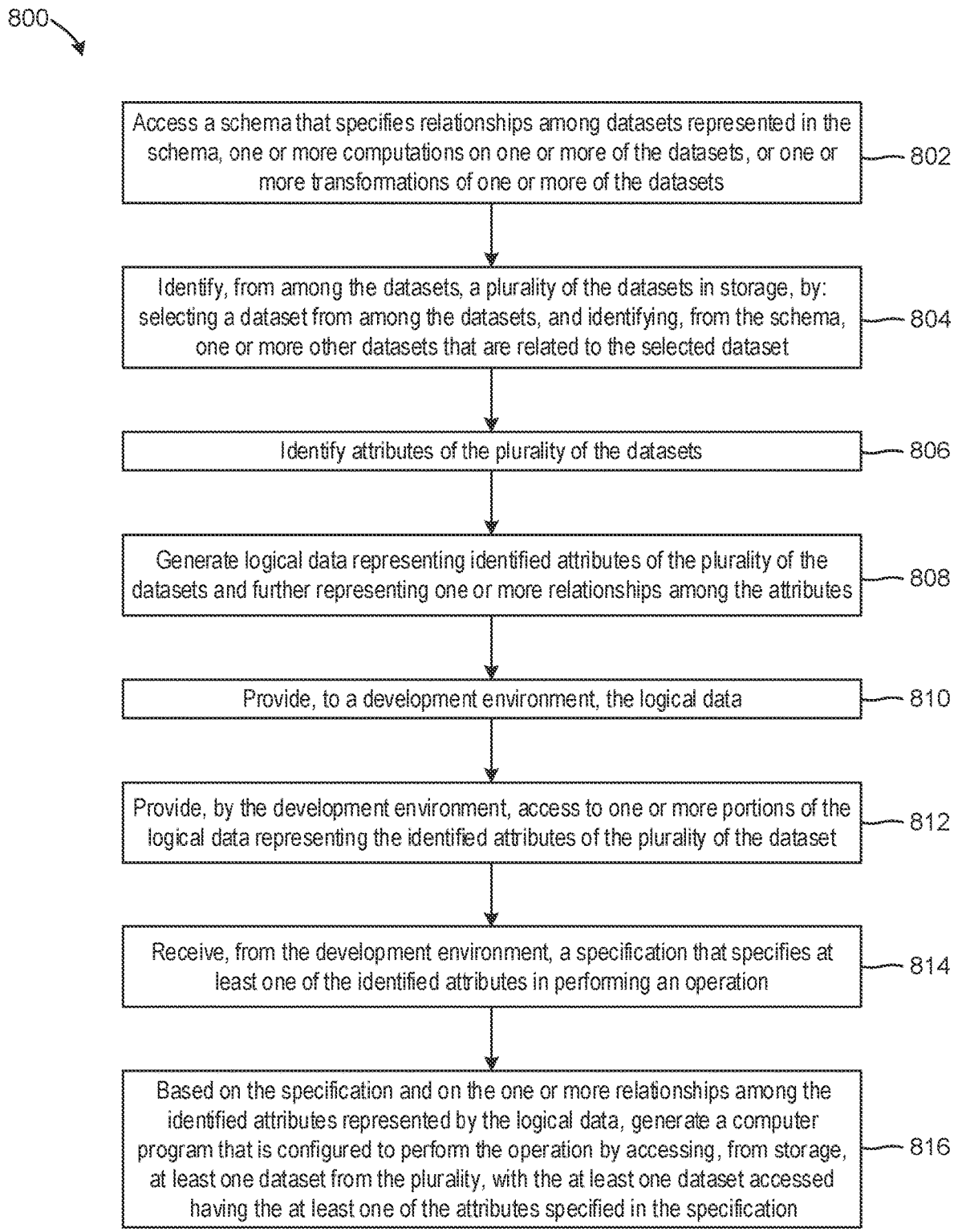
FIG. 8 is a flowchart of a process for producing logical data and generating a computer program using the logical data.

FIG. 8 illustrates a flowchart of an example process 800 for producing logical data and generating a computer program using the logical data. The process 800 can be implemented by one or more of the systems and components described herein, including one or more computing systems configured to implement the technology described with reference to FIGS. 1-7.

Operations of the process 800 include accessing (802) a schema that specifies relationships among datasets represented in the schema, one or more computations on one or more of the datasets, or one or more transformations of one or more of the datasets. In an example, the schema is a database schema. In an example, the one or more computations on one or more of the datasets or one or more transformations of one or more of the datasets define logical, virtual, or calculated fields for at least one of the plurality of the datasets.

A plurality of datasets from among the datasets in storage are identified (802) by: selecting a dataset from among the datasets, and identifying, from the schema, one or more other datasets that are related to the selected dataset. In an example, the selected dataset is a root node of the logical data, and at least one of the one or more other datasets are joined to the selected dataset. In an example, selection data specifying the selected dataset is received from a client device. In an example, one or more parameters, such as one or more keys, for joining the selected dataset and the one or more other datasets are identified from the schema.

Attributes of the plurality of datasets are identified (806). In an example, one or more attributes include field names of the plurality of the datasets. In an example, one or more attributes include information for accessing the plurality of the datasets. Logical data representing the identified attributes of the plurality of datasets and further representing one or more relationships among the attributes is generated (808).

The logical data is provided (810) to a development environment. The development environment provides (812) access to one or more portions of the logical data representing the identified attributes of the plurality of the datasets. In an example, the development environment provides access to the one or more portions of the logical data without accessing the plurality of datasets from storage. In an example, the development environment reads the logical data as a data source.

A specification that specifies at least one of the identified attributes in performing an operation is received (814) from the development environment. Based on the specification and on the one or more relationships among the identified attributes represented by the logical data, a computer program is generated (816) that is configured to perform the operation by accessing, from storage, at least one dataset from the plurality, with the at least one dataset accessed having the at least one of the attributes specified in the specification. In an example, the computer program is executed using the at least one dataset accessed from storage. In an example, the operations include identifying a dataset from the plurality of datasets including the at least one of the attributes specified in the specification, and accessing, from storage, the identified dataset.

In an example, the computer program is optimized to produce an optimized computer program that is configured to perform the operation by accessing, from storage, only those datasets in the plurality of datasets having the at least one of the attributes specified in the specification. In an example, an operation to access, from storage, at least one dataset in the plurality of datasets that does not include the at least one of the attributes specified in the specification is removed from the computer program. In an example, the computer program is configured to access, from storage, at least some data from the plurality by a select statement, wherein the select statement is minimized to select only the at least one of the attributes specified in the specification. In an example, the operations include generating, based on the specification and on the one or more relationships among the identified attributes represented by the logical data, an executable dataflow graph that is configured to perform the operation, wherein the executable dataflow graph includes at least one of the one or more attributes as an input.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data including, by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that provides an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

Implementations of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network (LAN) and a wide area network (WAN), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementations or of what may be claimed, but rather as descriptions of features specific to particular implementations. Certain features that are described in this specification in the context of separate implementations can also be implemented in combination in a single implementation. Conversely, various features that are described in the context of a single embodiment can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Other implementations are within the scope of the following claims.

What is claimed is:

1. A method implemented by a data processing system for providing one or more interfaces and storage that stores datasets having one or more attributes, and with the one or more interfaces providing access to the one or more attributes of the datasets, including:
   accessing a schema associated with datasets;
   wherein, for a given dataset of the datasets, the schema is further associated with one or more attributes of the given dataset and one or more features of at least one of:
      one or more others of the datasets that are related to the given dataset;
      one or more computations on the given dataset; or
      one or more transformations to the given dataset;
   based on the schema, identifying the one or more attributes of the given dataset and the one or more features;
   generating a representation of the identified one or more attributes of the given dataset and the identified one or more features, wherein:
      the representation specifies one or more relationships among the attributes or one or more relationships specified by the schema; or
      the representation is generated independent of accessing the plurality of the datasets;
   providing, through one or more interfaces, access to one or more portions of the representation of the identified one or more attributes of the given dataset and the identified one or more features;
   receiving, from the one or more interfaces, a specification that specifies at least one of the one or more attributes or the one or more features included in the representation and an operation to be performed; and
   based on the representation and the specification that specifies the at least one of the one or more attributes or the one or more features included in the representation, generating a computer program that is configured to:
      access, from storage, at least one dataset, from the datasets, associated with the specified at least one of the one or more attributes or the one or more features included in the representation; and
      perform the operation on the at least one dataset accessed having the specified at least one of the one or more attributes or one or more features included in the representation.

2. The method of claim 1, including:
   identifying a dataset from the of datasets including the at least one of the one or more attributes or the one or more features specified in the specification; and
   accessing, from storage, the identified dataset.

3. The method of claim 1, including executing the computer program using the at least one dataset accessed from storage.

4. The method of claim 1, including optimizing the computer program to produce an optimized computer program that is configured to perform the operation by accessing, from storage, only those datasets of the datasets associated with the at least one of the one or more attributes or one or more features specified in the specification.

5. The method of claim 1, wherein the one or more attributes include field names of the given dataset.

6. The method of claim 1, wherein the one or more attributes include information for accessing the given dataset in storage.

7. The method of claim 1, including:
   identifying the given dataset from among the datasets associated with the schema; identifying, from the schema, the one or more others of the datasets that are related to the given dataset; and
   wherein the representation includes the one or more attributes of the given dataset and one or more features of the one or more others of the datasets that are related to the given dataset.

8. The method of claim 7, including identifying, from the schema, one or more parameters for joining the given dataset and the one or more others of the datasets.

9. The method of claim 8, wherein the one or more parameters include a key for joining the given dataset and at least one of the one or more others of the datasets.

10. The method of claim 7, including receiving, from a client device, data specifying the given dataset.

11. The method of claim 7, wherein the given dataset comprises a root node, and wherein at least one of the one or more others of the datasets are joined to the given dataset.

12. The method of claim 1, wherein the one or more computations on the given dataset or one or more transformations of the given dataset define a virtual field for at least one of the datasets.

13. The method of claim 1, including generating, based on the specification, an executable dataflow graph that is configured to perform the operation, wherein the executable dataflow graph includes at least one of the one or more attributes or one or more features as an input.

14. The method of claim 1, including removing from the computer program an operation to access, from storage, at least one dataset of the datasets that does not include the at least one of the one or more attributes or one or more features specified in the specification.

15. The method of claim 1, wherein the computer program is configured to access, from storage, the at least one dataset by a select statement, wherein the select statement is minimized to select only the at least one of the one or more attributes or the one or more features specified in the specification.

16. The method of claim 1, wherein the representation is read as a data source.

17. The method of claim 1, including:
   providing a development environment that includes one or more graphical user interfaces for viewing the one or more portions of the representation and further for defining the specification that specifies at least one of the one or more attributes or one or more features in performing the operation.

18. The method of claim 1, wherein providing, through the one or more interfaces, access to the one or more portions of the representation includes providing data for displaying, through the one or more interfaces, one or more visualizations of the identified one or more attributes of the given dataset and the identified one or more features.

19. A system for providing one or more interfaces and storage that stores datasets having one or more attributes, and with the one or more interfaces providing access to the one or more attributes of the datasets, including:
one or more processors and one or more storage devices storing instructions that are operable, when executed by the one or more processors, to cause the one or more processors to perform operations including:
accessing a schema associated with datasets;
wherein, for a given dataset of the datasets, the schema is further associated with one or more attributes of the given dataset and one or more features of at least one of:
one or more others of the datasets that are related to the given dataset;
one or more computations on the given dataset; or
one or more transformations to the given dataset;
based on the schema, identifying the one or more attributes of the given dataset and the one or more features;
generating a representation of the identified one or more attributes of the given dataset and the identified one or more features, wherein:
the representation specifies one or more relationships among attributes or one or more relationships specified by the schema; or
the representation is generated independent of accessing the datasets;
providing, through one or more interfaces, access to one or more portions of the representation of the identified one or more attributes of the given dataset and the identified one or more features;
receiving, from the one or more interfaces, a specification that specifies at least one of the one or more attributes or one or more features included in the representation and an operation to be performed; and
based on the representation and the specification that specifies the at least one of the one or more attributes or the one or more features included in the representation, generating a computer program that is configured to:
access, from storage, at least one dataset, from the datasets, associated with the specified at least one of the one or more attributes or the one or more features included in the representation; and
perform the operation on the at least one dataset accessed having the specified at least one of the one or more attributes or one or more features included in the representation.

20. A non-transitory computer-readable storage medium storing instructions for causing a computing system to perform operations including:
accessing a schema associated with datasets;
wherein, for a given dataset of the datasets, the schema is further associated with one or more attributes of the given dataset and one or more features of at least one of:
one or more others of the datasets that are related to the given dataset;
one or more computations on the given dataset; or
one or more transformations to the given dataset;
based on the schema, identifying the one or more attributes of the given dataset and the one or more features;
generating a representation of the identified one or more attributes of the given dataset and the identified one or more features, wherein:
the representation specifies one or more relationships among attributes or one or more relationships specified by the schema; or
the representation is generated independent of accessing the datasets;
providing, through one or more interfaces, access to one or more portions of the representation of the identified one or more attributes of the given dataset and the identified one or more features;
receiving, from the one or more interfaces, a specification that specifies at least one of the one or more attributes or one or more features included in the representation and an operation to be performed; and
based on the representation and the specification that specifies the at least one of the one or more attributes or the one or more features included in the representation, generating a computer program that is configured to:
access, from storage, at least one dataset, from the datasets, associated with the specified at least one of the one or more attributes or the one or more features included in the representation; and
perform the operation on the at least one dataset accessed having the specified at least one of the one or more attributes or one or more features included in the representation.

\* \* \* \* \*

UNITED STATES PATENT AND TRADEMARK OFFICE
CERTIFICATE OF CORRECTION

PATENT NO. : 12,346,312 B2
APPLICATION NO. : 18/345852
DATED : July 1, 2025
INVENTOR(S) : Jonah Egenolf, Marshall A. Isman and Ian Schechter It is certified that error appears in the above-identified patent and that said Letters Patent is hereby corrected as shown below:

In the Claims

Column 33, Line 43, Claim 1, after "among", delete "the"

Column 33, Line 46, Claim 1, before "the" delete "the plurality of"

Column 34, Line 2, Claim 2, after "from the", delete "of"

Column 34, Lines 21-23, Claim 7, delete "identifying, from the schema, the one or more others of the datasets that are related to the given dataset; and" and insert the same on Line 22, as a new sub-point Signed and Sealed this
Twenty-sixth Day of August, 2025

Coke Morgan Stewart
*Acting Director of the United States Patent and Trademark Office*